(12) United States Patent
Nakata et al.

(10) Patent No.: US 8,887,492 B2
(45) Date of Patent: Nov. 18, 2014

(54) EXHAUST GAS PURIFICATION APPARATUS OF AN INTERNAL COMBUSTION ENGINE

(75) Inventors: Yuka Nakata, Susono (JP); Hiromasa Nishioka, Susono (JP); Hiroshi Otsuki, Susono (JP); Kohei Yoshida, Gotenba (JP); Takamitsu Asanuma, Mishima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1112 days.

(21) Appl. No.: 12/920,975

(22) PCT Filed: Feb. 26, 2009

(86) PCT No.: PCT/JP2009/053585
§ 371 (c)(1),
(2), (4) Date: Nov. 19, 2010

(87) PCT Pub. No.: WO2009/110373
PCT Pub. Date: Sep. 11, 2009

(65) Prior Publication Data
US 2011/0056190 A1    Mar. 10, 2011

(30) Foreign Application Priority Data

Mar. 3, 2008  (JP) ................. 2008-052422
Mar. 27, 2008 (JP) ................. 2008-083894

(51) Int. Cl.
*F01N 3/00*  (2006.01)
*F01N 3/02*  (2006.01)
(Continued)

(52) U.S. Cl.
CPC ............ *F01N 3/0878* (2013.01); *F01N 3/0807* (2013.01); *F01N 2570/22* (2013.01);
(Continued)

(58) Field of Classification Search
USPC ............................ 60/277, 285–288, 297, 311
See application file for complete search history.

(56) References Cited

U.S. PATENT DOCUMENTS 5,296,198 A    3/1994  Abe et al.
5,538,698 A    7/1996  Abe et al.
(Continued)

FOREIGN PATENT DOCUMENTS

EP    1 612 379 A2    1/2006
JP    2 173312       7/1990
(Continued)

OTHER PUBLICATIONS

International Search Report issued Jun. 2, 2009 in PCT/JP09/53585 filed Feb. 26, 2009.

(Continued)

*Primary Examiner* — Thomas Denion
*Assistant Examiner* — Diem Tran
(74) *Attorney, Agent, or Firm* — Oblon, Spivak, McClelland, Maier & Neustadt, L.L.P.

(57) ABSTRACT

In an exhaust gas purification apparatus of an internal combustion engine, there is provided a technique capable of suppressing a reduction in exhaust gas purification performance. The apparatus includes: an exhaust gas purification catalyst (6) that is arranged in an exhaust passage of the internal combustion engine for purifying an exhaust gas; an adsorption device (5) that is arranged at an upstream side of the exhaust gas purification catalyst, rises in temperature up to an upper limit temperature due to heat generated by adsorption thereto of an incoming first component, and falls in temperature after its temperature has reached said upper limit temperature; and a heat generating component supply unit (10) that supplies a second component which generates reaction heat in the exhaust gas purification catalyst, before the temperature of the adsorption device begins to fall.

19 Claims, 26 Drawing Sheets

(51) Int. Cl.
  *F01N 3/08* (2006.01)
  *F02D 41/02* (2006.01)
  *F01N 13/02* (2010.01)
  *F01N 3/20* (2006.01)

(52) U.S. Cl.
  CPC .......... *F01N 2410/03* (2013.01); *F01N 3/2033* (2013.01); *F02D 41/025* (2013.01); *Y02T 10/26* (2013.01); *F02D 41/0275* (2013.01); *F01N 13/02* (2013.01); *F01N 2240/36* (2013.01); *F01N 2550/03* (2013.01); *F01N 3/0814* (2013.01); *F02D 41/0245* (2013.01); *F01N 2560/06* (2013.01); *F01N 2560/14* (2013.01); *F01N 2240/18* (2013.01)
  USPC .................. 60/286; 60/277; 60/287; 60/288; 60/297; 60/311

(56) References Cited

U.S. PATENT DOCUMENTS

| | | | | |
|---|---|---|---|---|
| 5,657,625 | A | * | 8/1997 | Koga et al. .................. 60/274 |
| 5,804,148 | A | * | 9/1998 | Kanesaka et al. ............ 422/174 |
| 6,012,284 | A | * | 1/2000 | Tanaka et al. ................. 60/297 |
| 6,883,307 | B2 | * | 4/2005 | Iihoshi et al. ................. 60/277 |
| 7,127,883 | B1 | | 10/2006 | Kaneko et al. |
| 2001/0011455 | A1 | | 8/2001 | Harima et al. |
| 2002/0053201 | A1 | | 5/2002 | Hotta et al. |
| 2003/0125194 | A1 | | 7/2003 | Abe et al. |
| 2006/0153761 | A1 | | 7/2006 | Bandl-Konrad et al. |
| 2007/0175208 | A1 | | 8/2007 | Bandl-Konrad et al. |

FOREIGN PATENT DOCUMENTS

| | | |
|---|---|---|
| JP | 5 31359 | 2/1993 |
| JP | 8 14035 | 1/1996 |
| JP | 8 93548 | 4/1996 |
| JP | 10 159543 | 6/1998 |
| JP | 10 184345 | 7/1998 |
| JP | 11 193713 | 7/1999 |
| JP | 2000 345829 | 12/2000 |
| JP | 2001 214734 | 8/2001 |
| JP | 2002 89240 | 3/2002 |
| JP | 2002 138824 | 5/2002 |
| JP | 2002 155736 | 5/2002 |
| JP | 2002 295246 | 10/2002 |
| JP | 2002 349247 | 12/2002 |
| JP | 2003-311154 | 11/2003 |
| JP | 2006 29216 | 2/2006 |
| JP | 2006 512529 | 4/2006 |

OTHER PUBLICATIONS

IPRP issued Mar. 3, 2010 in PCT/JP09/53585 filed Feb. 26, 2009.
Office Action issued Jul. 24, 2012 in Japanese Application No. 2008-083894 (With English Translation).

* cited by examiner

EXHAUST GAS PURIFICATION APPARATUS OF AN INTERNAL COMBUSTION ENGINE

TECHNICAL FIELD

This application is the national phase application under 35 U.S.C. §371 of PCT international application No. PCT/JP2009/053585 filed on 26 Feb. 2009, which claims priority to Japanese patent application No. 2008-052422 filed on 3 Mar. 2008 and Japanese patent application No. 2008-083894 filed on 27 Mar. 2008, the contents of which are incorporated herein by reference.

The present invention relates to an exhaust gas purification apparatus of an internal combustion engine.

BACKGROUND ART

There has been known a technique in which an adsorbent to adsorb water contained in an exhaust gas is arranged at a location upstream of an oxidation catalyst so that the temperature of the oxidation catalyst is caused to rise due to the generation of heat at the time when the water is adsorbed by the adsorbent (for example, see a first patent document).

Incidentally, there exists a limitation on the amount of water which can be adsorbed by the adsorbent. In addition, as the temperature of the adsorbent becomes higher, the amount of water which can be adsorbed by the adsorbent decreases. Accordingly, as the temperature of the adsorbent becomes higher, the water which has been adsorbed by the adsorbent will desorb. Thus, when the water is desorbed from the adsorbent, heat is deprived from the exhaust gas, and hence the temperature of the exhaust gas falls. As a result of this, there is a possibility that the temperature of the catalyst at the downstream side of the adsorbent may fall. When the temperature of the catalyst at the downstream side falls in this manner, purification performance for the exhaust gas decreases.

In addition, a plurality of catalysts may be arranged in an exhaust passage. Then, these catalysts may be arranged under the floor of a vehicle due to the restrictions on the installation thereof to the vehicle, etc. However, the distances from the adsorbent to the catalysts become long, so the temperature rise of catalysts at the downstream side becomes slow. In addition, as the heat is consumed by the temperature rise of the catalysts at the upstream side, the heat supplied to the catalysts at the downstream side will decrease, so the temperature rise of the catalysts at the downstream side becomes slow. When the temperature rise of the catalysts at the downstream side becomes slow in this manner, there will be a possibility that purification performance for the exhaust gas may be reduced. Moreover, depending on the kind of the catalysts, it is possible to enhance purification performance for the exhaust gas according to the manner of arrangement of the catalysts.

[First Patent Document] Japanese patent application laid-open No. 2002-138824

[Second Patent Document] Japanese patent application laid-open No. 8-93548

[Third Patent Document] Japanese patent application laid-open No. 10-159543

[Fourth Patent Document] Japanese translation of PCT international application No. 2006-512529

[Fifth Patent Document] Japanese patent application laid-open No. 5-31359

[Sixth Patent Document] Japanese patent application laid-open No. 2002-89240

DISCLOSURE OF THE INVENTION

Problems to be Solved by the Invention

The present invention has been made in view of the above-mentioned problems, and has for its object to provide a technique which is capable of suppressing a reduction in the purification performance for an exhaust gas, in an exhaust gas purification apparatus of an internal combustion engine.

Means for Solving the Problems

In order to achieve the above-mentioned object, an exhaust gas purification apparatus of an internal combustion engine according to the present invention adopts the following units. That is, an exhaust gas purification apparatus of an internal combustion engine according to the present invention comprises:

an exhaust gas purification catalyst that is arranged in an exhaust passage of the internal combustion engine for purifying an exhaust gas;

an adsorption device that is arranged at an upstream side of said exhaust gas purification catalyst, rises in temperature up to an upper limit temperature due to heat generated by adsorption thereto of an incoming first component, and falls in temperature after its temperature has reached said upper limit temperature; and a heat generating component supply unit that supplies a second component which generates reaction heat in said exhaust gas purification catalyst, before the temperature of said adsorption device begins to fall.

The exhaust gas purification catalyst can not purify harmful substances in the exhaust gas unless the temperature thereof becomes high to a certain extent. For example, at the time of or immediately after starting of the internal combustion engine, the temperature of the exhaust gas purification catalyst is low. Here, when the first component is adsorbed to the adsorption device, heat is generated therein, and hence the heat is provided to the exhaust gas. As a result of this, the temperature of the exhaust gas is raised, and the temperature of the exhaust gas purification catalyst is raised by the exhaust gas passing through the exhaust gas purification catalyst.

The first component adsorbed to the adsorption device may be a component which is originally contained in the exhaust gas from the internal combustion engine, or may be a component which is supplied into the exhaust gas from the outside. Here, it is construed that in cases where "the component contained in the exhaust gas" is referred to in the following, both the component originally contained in the exhaust gas from the internal combustion engine and the component supplied into the exhaust gas from the outside are included. Also, the second component supplied by the heat generating component supply unit may be a component which is originally contained in the exhaust gas from the internal combustion engine, or may be a component which is supplied into the exhaust gas from the outside. Further, the second component may be supplied from an upstream side of the adsorption device, or may be supplied from a location which is at a downstream side of the adsorption device and at an upstream side of the exhaust gas purification catalyst.

The adsorption device may be one which adsorbs components contained in the exhaust gas, and for example, zeolite can be mentioned. In addition, the adsorption device has an upper limit on the temperature rise due to adsorption, unlike the catalyst, etc. The adsorption device generates heat due to adsorption of the first component until this upper limit temperature, but when the upper limit temperature is passed, the adsorption device absorbs heat due to desorption of the first component that has been adsorbed therein. In other words, when the temperature of the adsorption device passes this upper limit temperature, there is a possibility that the temperature of the adsorption device may fall. Here, note that the upper limit temperature referred to herein is an upper limit temperature as a result of the adsorption of the first component, but the temperature of the adsorption device can exceed the upper limit temperature due to a temperature rise of the exhaust gas from the internal combustion engine.

The heat generating component supply unit supplies the second component which is to be reacted in said exhaust gas purification catalyst, and the time to start this supply is set to be before the temperature of the adsorption device begins to fall. In other words, when the temperature of the adsorption device is equal to or lower than the upper limit temperature, the supply of the second component is started. This is to start the supply of the second component during the time when the temperature of the adsorption device is rising due to the adsorption of the first component, or at the time when the temperature of the adsorption device is the upper limit temperature. By doing in this manner, even if absorption of heat thereafter occurs in the adsorption device, an amount of heat more than that is generated in the exhaust gas purification catalyst, so it is possible to suppress the temperature fall of said exhaust gas purification catalyst.

Here, note that the temperature of the adsorption device can be seen as the entire adsorption device. In other words, even in cases where an endothermic reaction and an exothermic reaction occur at the same time in the adsorption device, it needs only to look at the influence of which is greater as a whole. In addition, for example, provision is made for a temperature detection unit, and the temperature of the adsorption device can be obtained by means of the temperature detection unit.

In addition, an exhaust gas purification apparatus of an internal combustion engine according to the present invention may comprise:

an exhaust gas purification catalyst that is arranged in an exhaust passage of the internal combustion engine for purifying an exhaust gas;

an adsorption device that is arranged at an upstream side of said exhaust gas purification catalyst, adsorbs an incoming first component up to an upper limit temperature, and desorbs said first component after its temperature has reached said upper limit temperature; and a heat generating component supply unit that supplies a second component, which generates reaction heat in said exhaust gas purification catalyst, to said exhaust gas purification catalyst before said first component which has been adsorbed in said adsorption device begins to desorb.

During the time when the first component is adsorbed to the adsorption device, the generation of heat occurs in said adsorption device, so it is possible to raise the temperatures of the adsorption device and the exhaust gas purification catalyst. In addition, if the first component is not desorbed from the adsorption device, the temperature fall of the adsorption device and the exhaust gas purification catalyst due to the desorption of the first component from the adsorption device does not occur. It can be said that these periods of time are before the desorption of the first component from the adsorption device begins. Then, by supplying the second component in these periods of time, it is possible to raise the temperature of the exhaust gas purification catalyst before the temperature of said exhaust gas purification catalyst falls. In a similar manner, the second component may be supplied before the amount of the first component adsorbed in the adsorption device decreases.

Here, note that whether it is before the desorption of the first component from the adsorption device begins can be determined by looking at the amount of adsorption as a whole of the adsorption device. In other words, even in cases where the adsorption and desorption of the first component occur at the same time in the adsorption device, a determination as to whether the first component is adsorbed or desorbed can be made according to which of the amount of adsorption or the amount of desorption is larger as the entire adsorption device. In addition, for example, provision is made for a unit to detect the desorption of the first component, and whether it is before the desorption of the first component from the adsorption device begins can be determined by means of that unit.

Here, note that said heat generating component supply unit can supply said second component to said exhaust gas purification catalyst when the temperature of said exhaust gas purification catalyst is equal to or higher than a lower limit value of its activation temperature.

In other words, if the exhaust gas purification catalyst becomes equal to or more than the activation temperature thereof, the second component supplied by the heat generating component supply unit performs an exothermic reaction immediately when it reaches the exhaust gas purification catalyst, so the temperature of the exhaust gas purification catalyst can be raised quickly. This activation temperature may also be a lower limit value of a temperature at which the second component supplied by the heat generating component supply unit performs an exothermic reaction in the exhaust gas purification catalyst.

Moreover, an exhaust gas purification apparatus of an internal combustion engine according to the present invention may comprise:

an exhaust gas purification catalyst that is arranged in an exhaust passage of the internal combustion engine for purifying an exhaust gas;

an adsorption device that is arranged at an upstream side of said exhaust gas purification catalyst, rises in temperature up to an upper limit temperature due to heat generated by adsorption thereto of an incoming first component, and falls in temperature after its temperature has reached said upper limit temperature; and a heat generating component supply unit that supplies a second component, which generates reaction heat in said exhaust gas purification catalyst, to said exhaust gas purification catalyst when the temperature of said exhaust gas purification catalyst is equal to or higher than a lower limit value of its activation temperature after the temperature of said adsorption device becomes said upper limit temperature.

In other words, even when the temperature of the adsorption device begins to fall, if the temperature of the exhaust gas purification catalyst is equal to or higher than the activation temperature thereof, the second component can cause an exothermic reaction in the exhaust gas purification catalyst. That is, even in such a time, when the second component is supplied to the exhaust gas purification catalyst, the temperature of the exhaust gas purification catalyst can be raised.

Further, an exhaust gas purification apparatus of an internal combustion engine according to the present invention may comprise:

an exhaust gas purification catalyst that is arranged in an exhaust passage of the internal combustion engine for purifying an exhaust gas;

an adsorption device that is arranged at an upstream side of said exhaust gas purification catalyst, adsorbs an incoming first component up to an upper limit temperature, and desorbs said first component after its temperature has reached said upper limit temperature; and a heat generating component supply unit that supplies a second component, which generates reaction heat in said exhaust gas purification catalyst, to said exhaust gas purification catalyst when the temperature of said exhaust gas purification catalyst is equal to or higher than a lower limit value of its activation temperature after said first component adsorbed in said adsorption device begins to desorb.

In other words, even when the first component begins to desorb from the adsorption device, if the temperature of the exhaust gas purification catalyst is equal to or higher than the lower limit value of the activation temperature thereof, the second component can cause an exothermic reaction in the exhaust gas purification catalyst. That is, even in such a time, if the second component is supplied to the exhaust gas purification catalyst, the temperature of the exhaust gas purification catalyst can be raised.

In a similar manner, even if the amount of adsorption of the first component in the adsorption device begins to decrease, when the temperature of the exhaust gas purification catalyst is equal to or higher than the lower limit value of the activation temperature, the second component will cause an exothermic reaction in the exhaust gas purification catalyst. Therefore, if the second component is supplied to the exhaust gas purification catalyst, the temperature of the exhaust gas purification catalyst can be raised.

Then, said second component is a component which passes through said adsorption device without being adsorbed thereto, and said heat generating component supply unit can supply said second component from an upstream side of said adsorption device.

In cases where the second component supplied by the heat generating component supply unit is supplied from the upstream side of the adsorption device, if the second component is adsorbed by the adsorption device, the amount of heat generated in the exhaust gas purification catalyst becomes small, so the temperature rise of the exhaust gas purification catalyst becomes slow. In contrast to this, if the second component passes through without being adsorbed in the adsorption device and an exothermic reaction occurs in the exhaust gas purification catalyst, the temperature of the exhaust gas purification catalyst can be raised quickly.

In addition, in the present invention, said upper limit temperature can be set in the vicinity of the lower limit value of the activation temperature of said exhaust gas purification catalyst.

Here, when the temperature of the adsorption device exceeds the upper limit temperature, the adsorption device becomes unable to retain the first component adsorbed therein, so the first component desorbs from the adsorption device. At this time, the exhaust gas purification catalyst is in the vicinity of the lower limit value of the activation temperature thereof, so if the second component is supplied to the exhaust gas purification catalyst, the temperature of the exhaust gas purification catalyst is raised. In other words, if the temperature of the exhaust gas purification catalyst rises to the lower limit value of the activation temperature thereof, it becomes unnecessary to raise the temperature of the exhaust gas purification catalyst by means of the adsorption device.

When the upper limit temperature is set in this manner, the temperature of the adsorption device is raised due to the heat of the exhaust gas during the operation of the internal combustion engine, so that the first component desorbs from the adsorption device. Therefore, if the internal combustion engine is stopped and the temperature of the adsorption device falls, the first component can be again adsorbed by the adsorption device at the time of the next starting of the internal combustion engine. As a result of this, at the time of the next starting of the internal combustion engine, too, it is possible to raise the temperature of the exhaust gas purification catalyst in a quick manner.

Moreover, in the present invention, when the temperature of said exhaust gas purification catalyst is not caused to rise, it is possible to make the amount of adsorption of the first component in said adsorption device equal to or less than a specified value.

The time when the temperature of the exhaust gas purification catalyst is not caused to rise is, for example, a time when the temperature of the exhaust gas purification catalyst is high to a sufficient extent, or when the temperature of the exhaust gas purification catalyst is too low so that the effect of the temperature rise by the adsorption device can not be substantially obtained. This may also be a time when it is not necessary to raise the temperature of the exhaust gas purification catalyst. In such a case, if the amount of adsorption of the first component in the adsorption device is made equal to or less than the specified value, it becomes possible for the first component to be adsorbed to the adsorption device when the temperature of the exhaust gas purification catalyst is raised next time. As a result, the temperature of the exhaust gas purification catalyst can be caused to rise in a quick manner. Here, note that the specified value referred to herein is an remaining amount of the first component in the adsorption device, and can be set to such an remaining amount at the time when the temperature of the exhaust gas purification catalyst can be thereafter raised, for example, to the lower limit value of the activation temperature thereof. The specified value is set in such a manner that when the first component has been adsorbed from the specified value until it is saturated, the temperature of the exhaust gas purification catalyst rises to the lower limit value of the activation temperature thereof.

Further, in the present invention, the amount of adsorption of the first component in said adsorption device can be decreased immediately before the stop of said internal combustion engine.

By doing so, at the time of the next starting of the internal combustion engine, it is possible to cause the first component contained in the exhaust gas to be adsorbed to the adsorption device, so the temperature of the exhaust gas purification apparatus can be raised in a quick manner. The time of immediately before the stop of the internal combustion engine may be a time when the stop of the internal combustion engine is expected, for example.

In this case, when the amount of adsorption of the first component in said adsorption device is more than the specified value, the amount of adsorption may be decreased.

In other words, by desorbing the first component only when it is necessary to desorb the first component adsorbed in the adsorption device, the energy required for the desorption of the first component can be saved. In addition, in cases where the temperature of the exhaust gas from the internal combustion engine is raised to desorb the first component from the adsorption device, the amount of harmful components in the exhaust gas may be increased, but it is possible to decrease the amount of harmful components in the exhaust gas by causing the temperature rise of the exhaust gas only at the time of need.

In addition, in the present invention, provision is made for a temperature raising unit that raises the temperature of said adsorption device, and by raising the temperature of said adsorption device, the first component is caused to desorb from said adsorption device thereby to decrease said amount of adsorption.

In other words, the higher the temperature of the adsorption device, the smaller the maximum amount of the first component which can be adsorbed to the adsorption device becomes, so by making the temperature of the adsorption device higher, it becomes possible to desorb the first component. As a result of this, the amount of adsorption of the first component in the adsorption device can be decreased. In addition, when the temperature of the adsorption device exceeds the upper limit temperature, it becomes impossible for the adsorption device to adsorb the first component, and the first component desorbs therefrom. By making the temperature of the adsorption device equal to or higher than this upper limit temperature, the amount of adsorption of the first component in the adsorption device can be decreased to a further extent. The temperature raising unit can raise the temperature of the adsorption device by raising the temperature of the exhaust gas of the internal combustion engine, or by directly heating the adsorption device by means of a heater, etc.

Moreover, in the present invention, provision can be made for a purification degree determination unit that determines whether the degree of purification of the exhaust gas in said exhaust gas purification catalyst becomes high by supplying said second component, and a prohibition unit that prohibits the supply of said second component by said heat generating component supply unit when a determination is made by said purification degree determination unit that the degree of purification of the exhaust gas in said exhaust gas purification catalyst does not become high.

In other words, the temperature of the exhaust gas becomes sufficiently high or the amount of the first component in the exhaust gas becomes sufficiently large, depending on the operating state of the internal combustion engine, so the temperature of the exhaust gas purification catalyst goes up to such a extent that the purification of the exhaust gas can be made. In such a case, it is not necessary to purposely supply the first component and the second component so as to raise the temperature of the exhaust gas purification catalyst. In addition, at very low temperatures, the effect of the temperature rise due to the adsorption device is low, so the temperature rise of the exhaust gas purification catalyst due to the adsorption device may be stopped. Thus, in cases where the temperature of the exhaust gas purification catalyst rises according to the development of the situation, or in cases where the degree of purification of the exhaust air does not become high, it is not necessary to actively supply the first component or the second component. In such a case, the control for supplying a larger amount of the first component to the adsorption device, or the supply of the second component, is stopped. As a result of this, the saving of energy can be done.

Further, in the present invention, said adsorption device is provided with a plurality of fine pores for causing the first component to be adsorbed, and the diameter of the fine pores can be set to be equal to or more than the diameter of the first component, and smaller than the diameter of the second component.

In other words, most of the first component is adsorbed by going into the fine pores of the adsorption device, but the second component can not enter the fine pores of the adsorption device, so that it passes through the adsorption device, without being mostly adsorbed thereto. In this manner, the second component can be suppressed from being adsorbed to the adsorption device, so a larger amount of the second component can be supplied to the exhaust gas purification catalyst. Here, the second component does not necessarily generate heat in the adsorption device. In other words, when the second component is adsorbed to the adsorption device, a corresponding amount of the first component becomes unable to be adsorbed, and hence there is a possibility that the temperature rise of the adsorption device may be suppressed. As a result of this, there is a possibility that the temperature rise of the exhaust gas purification catalyst may also be suppressed. In contrast to this, by suppressing the second component from entering the fine pores, it is possible to promote the temperature rise of the exhaust gas purification catalyst.

Furthermore, in the present invention, the lower limit value of the activation temperature of said exhaust gas purification catalyst can be set lower in an upstream part thereof including at least an upstream end of said exhaust gas purification catalyst than in a part thereof downstream of said upstream part.

By doing in this manner, the reaction of the second component can be made earlier at the upstream side of the exhaust gas purification catalyst. Then, when the temperature of the exhaust gas is raised due to the exothermic reaction occurring at the upstream side, the temperature of the exhaust gas purification catalyst at the downstream side is also raised as the exhaust gas of which the temperature has become high flows to the downstream side of the exhaust gas purification catalyst. In other words, the temperature of the exhaust gas purification catalyst as a whole can be quickly raised by setting the lower limit value of the activation temperature thereof lower at the upstream side than at the downstream side. In addition, because the activation temperature is made low only at the upstream side, an amount of precious metal used can be decreased, for example. Further, the amount of the first component required can also be decreased.

In addition, in the present invention, when the temperature of said exhaust gas purification catalyst is raised by causing said first component to be adsorbed in said adsorption device, the amount of the first component flowing into said adsorption device can be increased more than when the temperature of said exhaust gas purification catalyst is not raised.

That is, the more the amount of the first component contained in the exhaust gas, the more the amount of heat per unit time generated in the adsorption device can be made. By doing so, the temperature of the exhaust gas purification catalyst can be raised in a quick manner. For example, in cases where water in the exhaust gas is adsorbed to the adsorption device, the load of the internal combustion engine is caused to increase so that more water can be discharged from the internal combustion engine. As a result, the amount of fuel to be injected increases, so that more water comes to be discharged and more water is adsorbed in the adsorption device, as a consequence of which the amount of generated heat can be increased.

Also, in the present invention, correction is carried out in control for raising the temperature of said exhaust gas purification catalyst, by making a comparison between an amount of adsorption obtained by calculation at the time when the temperature of said adsorption device becomes said upper limit temperature, and an actual amount of adsorption.

Here, the actual amount of adsorption at the time when the temperature of the adsorption device reaches the upper limit temperature can change due to the aged deterioration of the adsorption device. Therefore, the optimal time to supply the second component can also change. In addition, the amount of the first component in the exhaust gas of the internal combustion engine changes with the aging of the internal combustion engine. Accordingly, the optimal time to supply the second component can also change. Here, if correction is made in the control for raising the temperature of the exhaust gas purification catalyst, an optimal amount of generated heat can be obtained, thus making it possible to ensure exhaust air purification performance. Here, note that there is a correlation between the amount of generated heat in the adsorption device, and the amount of the first component adsorbed in the adsorption device, so the actual amount of adsorption in the adsorption device can be obtained by calculating the amount of generated heat in the adsorption device.

In this case, a parameter used in the process of calculating said amount of adsorption can be corrected.

Here, by making a comparison between the amount of adsorption obtained by calculation and the actual amount of adsorption, correction is carried out in such a manner as that the difference between them becomes small. By using the parameter corrected in this manner, the amount of adsorption of the first component in the adsorption device can be calculated with sufficient accuracy, so an appropriate amount of generated heat can be obtained at the time of the temperature rise of the exhaust gas purification catalyst.

In addition, the amount of the first component flowing into said adsorption device can be corrected.

In other words, when the amount of the first component contained in the exhaust gas changes with the aging of the internal combustion engine, etc., the amount of the first component adsorbed by the adsorption device per unit time changes. For this reason, the degree of temperature rise of the adsorption device changes, so the optimal time to supply the second component also changes. In contrast to this, if the amount of the first component adsorbed to the adsorption device is adjusted by adjusting the amount of the first component flowing into the adsorption device, the amount of generated heat in the adsorption device can be kept constant. In other words, it is possible not to change the optimal time to supply the second component.

Also, the time to supply said second component can be corrected.

When the amount of the first component adsorbed in the adsorption device is decreased, for example, due to the deterioration of the adsorption device, etc., the temperature rise of the adsorption device becomes slow, so the time to supply the second component has to be delayed. In other words, by delaying the time to supply the second component, it becomes possible to supply the second component at an appropriate time.

In addition, the load of said internal combustion engine can be corrected.

When the amount of the first component adsorbed in the adsorption device is decreased, for example, due to the deterioration of the adsorption device, etc., the temperature rise of the adsorption device becomes slow. In contrast to this, if the temperature of the exhaust gas is raised by making the load of the internal combustion engine high, the temperature rise of the adsorption device can be compensated, so it becomes possible to supply the second component to the exhaust gas purification catalyst at an earlier time. Here, note that the load of the internal combustion engine may be adjusted in such a manner that the degree of temperature rise of the exhaust gas purification catalyst becomes constant.

Moreover, in the present invention, provision can be made for a temperature measurement unit can be provided that measures a difference between the temperature of the exhaust gas flowing into said adsorption device and the temperature of the exhaust gas flowing out of said adsorption device, and further provision can be made for a deterioration determination unit that estimates an amount of generated heat in said adsorption device based on the difference in temperature measured by said temperature measurement unit, and determines the degree of deterioration of said adsorption device by making a comparison between said amount of generated heat and a threshold for said amount of generated heat.

The difference in temperature between the downstream side and the upstream side of the adsorption device has a correlation to the amount of generated heat in the adsorption device. In other words, the amount of generated heat in the adsorption device can be estimated based on the difference in temperature measured by the temperature measurement unit. Here, note that when the amount of generated heat is estimated, the operating state of the internal combustion engine may be taken into consideration. Here, as the deterioration of the adsorption device progresses, the amount of generated heat in the adsorption device decreases. In other words, the amount of generated heat estimated based on said difference in temperature becomes smaller in accordance with the progress of deterioration of the adsorption device. Then, when the amount of generated heat thus estimated is smaller than a threshold, a determination can be made that the adsorption device is deteriorated. In addition, it can also be determined that the smaller than the threshold becomes the estimated amount of generated heat, the higher is the degree of deterioration.

In addition, in the present invention, further provision can be made for a deterioration determination unit that determines the degree of deterioration of said adsorption device, by comparing said upper limit temperature at the time when the temperature of said adsorption device becomes said upper limit temperature due to the generation of heat in said adsorption device, with a threshold for said upper limit temperature.

As the deterioration of the adsorption device progresses, the upper limit temperature of said adsorption device accordingly becomes lower. In other words, when this upper limit temperature becomes lower than the threshold, a determination can be made that the adsorption device has deteriorated. In addition, it can also be determined that the lower this upper limit temperature, the higher is the degree of deterioration. Here, note that even in cases where the supply of the second component is started during the time when the temperature of the adsorption device is rising, the determination of deterioration of the adsorption device can be made by measuring the upper limit temperature of the adsorption device after that time. Further, the upper limit temperature of the adsorption device may be measured only for the purpose of carrying out the determination of deterioration of the adsorption device.

Moreover, in the present invention, further provision can be made for a deterioration determination unit that determines the degree of deterioration of said adsorption device based on a time to start the supply of the second component by said heat generating component supply unit.

As the deterioration of the adsorption device progresses, the time when the temperature of the adsorption device becomes the upper limit temperature thereof accordingly changes. In cases where the second component is supplied at this time, the time to supply the second component will change according to the degree of deterioration of the adsorption device. In other words, the degree of deterioration of the adsorption device can be determined based on the time to supply the second component.

Also, in the present invention, further provision can be made for a deterioration determination unit that determines the degree of deterioration of said adsorption device based on an amount of correction in said correction.

In other words, the larger the difference between the calculated amount of adsorption in the adsorption device at the time when the temperature of the adsorption device becomes the upper limit temperature thereof due to the generation of heat in the adsorption device, and the actual amount of adsorption, the larger is the degree of deterioration of the adsorption device. Therefore, the amount of correction is large. In other words, there is a relation that the larger the amount of correction, the more the deterioration of the adsorption device progresses, and hence, the degree of deterioration can be determined based on the amount of correction.

Further, in the present invention, said upper limit temperature can be set in the vicinity of an upper limit value of the temperature at which the exhaust gas can be purified in said exhaust gas purification catalyst.

The exhaust gas purification catalyst has a temperature range in which the exhaust gas can be purified. When the temperature of the exhaust gas purification catalyst becomes higher than this temperature range, it becomes almost impossible for the exhaust gas purification catalyst to purify harmful substances in the exhaust gas. On the other hand, in the adsorption device, when the upper limit temperature at which the first component can be retained therein is exceeded, heat is absorbed due to the desorption of the first component which has been adsorbed therein. As a result, the temperature of the exhaust gas falls, so the temperature of the exhaust gas purification catalyst can be caused to fall. In other words, by desorbing the first component from the adsorption device at the time when the upper limit value of the temperature at which the exhaust gas can be purified in the exhaust gas purification catalyst is reached, the temperature of the exhaust gas purification catalyst can be caused to fall, as a consequence of which it is possible to maintain the temperature of the exhaust gas purification catalyst at the temperature at which the exhaust gas therein can be purified. In addition, at this time, the temperature of the exhaust gas purification catalyst is sufficiently high, so it is not necessary to cause the first component to be adsorbed to the adsorption device.

Here, note that in the exhaust gas purification catalyst, the upper limit value of the temperature at which the exhaust gas can be purified may be an upper limit value of a purification window of the exhaust gas purification catalyst, or in an occlusion reduction type NOx catalyst, it may also be an upper limit value of the temperature at which NOx can be occluded or reduced. In addition, overheating of the exhaust gas purification catalyst can also be suppressed by setting the upper limit temperature thereof, at which the adsorption device can retain the first component adsorbed therein, to a temperature at which there is a possibility that the exhaust gas purification catalyst may be overheated.

Furthermore, in the present invention, a plurality of said adsorption devices are provided and arranged in series with the exhaust passage, and at the more upstream side said adsorption devices are arranged, the higher the upper limit temperature at which the adsorption devices can retain the first component adsorbed therein can be made.

By doing in this manner, it is possible to raise the temperature of the exhaust gas purification catalyst up to the activation temperature thereof in a quick manner, and to suppress the temperature of the exhaust gas purification catalyst from exceeding the upper limit value of the purification window. In other words, in cases where the temperature of the exhaust gas purification catalyst is lower than the activation temperature thereof, the temperature of the exhaust gas purification catalyst can be quickly raised by means of the plurality of adsorption devices. Here, even if the upstream side adsorption device(s) become(s) unable to raise the temperature of the exhaust gas to a temperature exceeding the upper limit temperature thereof, the temperature of the exhaust gas can be raised by means of the downstream side adsorption device(s). In addition, in cases where the downstream side adsorption device(s) also exceed(s) the upper limit temperature thereof, the temperature of the exhaust gas can be caused to fall due to the absorption of heat, so it is possible to suppress an excessive rise in temperature of the exhaust gas purification catalyst.

In addition, in the present invention, provision can be made for a bypass passage that connects between a portion of the exhaust passage at an upstream side of said adsorption device and a portion of the exhaust passage at a downstream side of said adsorption device and at an upstream side of said exhaust gas purification catalyst, and a changeover valve that passes the exhaust gas to either one of said adsorption device and said bypass passage.

By doing in this manner, only when it is necessary to pass the exhaust gas to the adsorption device, the exhaust gas can be passed to the adsorption device. In other words, only in cases where the temperature of the exhaust gas purification catalyst is wanted to be raised due to an exothermic reaction in the adsorption device, or only in cases where the temperature of the exhaust gas purification catalyst is wanted to be dropped due to an endothermic reaction in the adsorption device, the exhaust gas can be caused to flow into the adsorption device. In addition, the second component does not flow into the adsorption device, so it is possible to suppress the second component from being adsorbed to the adsorption device. As a result of this, a component which is easily adsorbed to the adsorption device can be used as the second component.

Moreover, in the present invention, said exhaust gas purification catalyst may comprise one or more underfloor catalysts arranged in a portion of the exhaust passage of said internal combustion engine which passes under a floor of a vehicle on which said internal combustion engine is installed, said adsorption device may be arranged at an immediately upstream side of at least one of said underfloor catalysts, and a pre-stage catalyst may be provided which is arranged in a portion of the exhaust passage of said internal combustion engine upstream of that portion of the exhaust passage which passes under the floor of said vehicle.

The expression "under the floor of the vehicle" referred to herein means below a bottom surface of an interior space (may also be a passenger compartment and a luggage space) of the vehicle. It may also be simply below a passenger compartment.

In addition, the expression "a portion of the exhaust passage upstream of that portion of the exhaust passage which passes under the floor of the vehicle" means a portion from the internal combustion engine to immediately before an underfloor of the vehicle, or may also be the interior of an engine room. Also, it may be an exhaust manifold.

By arranging the adsorption device at an immediately upstream side of at least one of the underfloor catalysts, the temperature of the corresponding underfloor catalyst can be raised. That is, even if the distance of the underfloor catalyst from the pre-stage catalyst is long, heat is supplied to the underfloor catalyst from the adsorption device at the immediately upstream side of the underfloor catalyst, so the temperature of the underfloor catalyst can be raised quickly. In other words, the expression "at an immediately upstream side" means a range in which the temperature of the underfloor catalyst can be raised at a sufficient speed or rate due to the heat generated in the adsorption device. The adsorption device may be arranged upstream of and adjacent to the underfloor catalyst.

In the present invention, said pre-stage catalyst may be a monolithic catalyst. Here, in cases where the first component is contained in the exhaust gas flows through the upstream side of the pre-stage catalyst, there is a possibility that the first component may adhere to the pre-stage catalyst. Then, it will take time until the first component reaches the adsorption device. Accordingly, there is a possibility that the temperature rise of the underfloor catalyst may become slow. On the other hand, in cases where the pre-stage catalyst is a monolithic catalyst, it will become difficult for the first component in the exhaust gas to adhere to the pre-stage catalyst, so that the first component will be easy to pass through the pre-stage catalyst. In other words, it is possible to cause a larger amount of first component to reach the adsorption device in a swift manner, the temperature of the underfloor catalyst can be raised quickly.

In the present invention, said underfloor catalyst may be an occlusion reduction type NOx catalyst, and said pre-stage catalyst may be a catalyst having an oxidation function and may have an oxidation capacity higher than that of said underfloor catalyst.

The occlusion reduction type NOx catalyst has a function of occluding NOx in an incoming exhaust gas when the oxygen concentration of the exhaust gas is high, and of reducing the occluded NOx when the oxygen concentration of the incoming exhaust gas is low and when a reducing agent exists. In this occlusion reduction type NOx catalyst, it is known that $NO_2$ is occluded more easily than NO. In other words, the purification capacity of NOx in the occlusion reduction type NOx catalyst can be enhanced by making high the $NO_2$ concentration in the exhaust gas. Here, NO contained in the exhaust gas can be converted to $NO_2$ by making high the oxidation performance of the pre-stage catalyst. As a result, it becomes possible for more NOx to be occluded in the underfloor catalyst.

In addition, in cases where the adsorption device has a function of adsorbing water contained in the exhaust gas, the water contained in the exhaust gas will be removed at the upstream side of the occlusion reduction type NOx catalyst. Here, it is known that the occlusion capacity of NOx decreases when water adheres to the occlusion reduction type NOx catalyst. In other words, by removing the water by means of the adsorption device at the upstream side of the occlusion reduction type NOx catalyst, the NOx occlusion capacity in the occlusion reduction type NOx catalyst can be kept high.

In the present invention, said pre-stage catalyst and said underfloor catalyst may each be an occlusion reduction type NOx catalyst.

The underfloor catalyst is raised in temperature more quickly than the adsorption device, and hence becomes possible to occlude NOx earlier than the pre-stage catalyst. Therefore, even if NOx flows out of the pre-stage catalyst, the NOx can be occluded by the underfloor catalyst at the downstream side thereof.

In the present invention, an adsorption device having the same function as that of said adsorption device can be provided at an immediately upstream side of said pre-stage catalyst.

By doing in this manner, the adsorption device thus provided can be raised to a temperature at which the exhaust gas can be purified more quickly than the pre-stage catalyst, so the purification capacity for the exhaust gas can be enhanced to a further extent.

In the present invention, the adsorption device arranged at the immediately upstream side of said underfloor catalyst may be able to adsorb a larger amount of first component than the adsorption device arranged at the immediately upstream side of said pre-stage catalyst.

Here, the exhaust gas from the internal combustion engine first passes through the pre-stage catalyst, so the temperature of the pre-stage catalyst is first raised due to the heat of the exhaust gas. Accordingly, the underfloor catalyst is more difficult to rise in temperature than the pre-stage catalyst. In contrast to this, by making it possible to adsorb a larger amount of first component in the adsorption device arranged at the immediately upstream side of the underfloor catalyst, more heat can be generated therein, so that the temperature of the underfloor catalyst can be raised quickly. As a result of this, the temperatures of the pre-stage catalyst and the underfloor catalyst can also be raised at the same time to the lower limit value of the activation temperature thereof.

In addition, at this time, if the pre-stage catalyst is a monolithic catalyst, the first component desorbed from the adsorption device which is arranged at the immediately upstream side of the pre-stage catalyst can be caused to be quickly adsorbed by the adsorption device which is arranged at the immediately upstream side of the underfloor catalyst. In other words, the first component can be reused. As a result, the temperature of the underfloor catalyst can be raised in a quick manner.

In the present invention, the upper limit temperature of the adsorption device arranged at the immediately upstream side of said underfloor catalyst can be set in the vicinity of the lower limit value of the activation temperature of said pre-stage catalyst.

Here, the adsorption device has an upper limit on the temperature rise thereof due to adsorption, unlike catalysts, etc. The adsorption device generates heat due to adsorption of the first component until this upper limit temperature, but when the upper limit temperature is passed, the adsorption device absorbs heat due to desorption of the first component that has been adsorbed therein. In other words, when this upper limit temperature is passed, the temperature of the adsorption device falls. As a result, there is a possibility that the purification capacity for the exhaust gas in the underfloor catalyst may decrease.

However, if the temperature of the pre-stage catalyst has reached the lower limit value of the activation temperature thereof at this time, purification of the exhaust gas will be able to be carried out in the pre-stage catalyst, so even if the purification capacity for the exhaust gas in the underfloor catalyst decreases, it will cause almost no problem. In other words, in cases where the temperature of the pre-stage catalyst rises to the lower limit value of the activation temperature thereof, the first component may be made to desorb from the adsorption device.

Incidentally, there exists a limitation on the amount of first component which can be adsorbed by the adsorption device. In other words, in a state where a large amount of first component is adsorbed in the adsorption device, even if the temperature of the underfloor catalyst is to be raised, no heat will be generated, so it becomes difficult to raise the temperature of the underfloor catalyst. In contrast to this, if the first component is caused to desorb from the adsorption device when the supply of heat from the adsorption device is not necessary, the first component will be able to be adsorbed to the adsorption device at the time when the temperature of the underfloor catalyst is required to be raised next time. In addition, it becomes unnecessary to desorb the first component from the adsorption device separately.

Effect of the Invention

An exhaust gas purification device of an internal combustion engine according to the present invention can suppress a reduction in the purification performance for an exhaust gas.

EXPLANATION OF REFERENCE NUMERALS AND CHARACTERS

Figure 1:
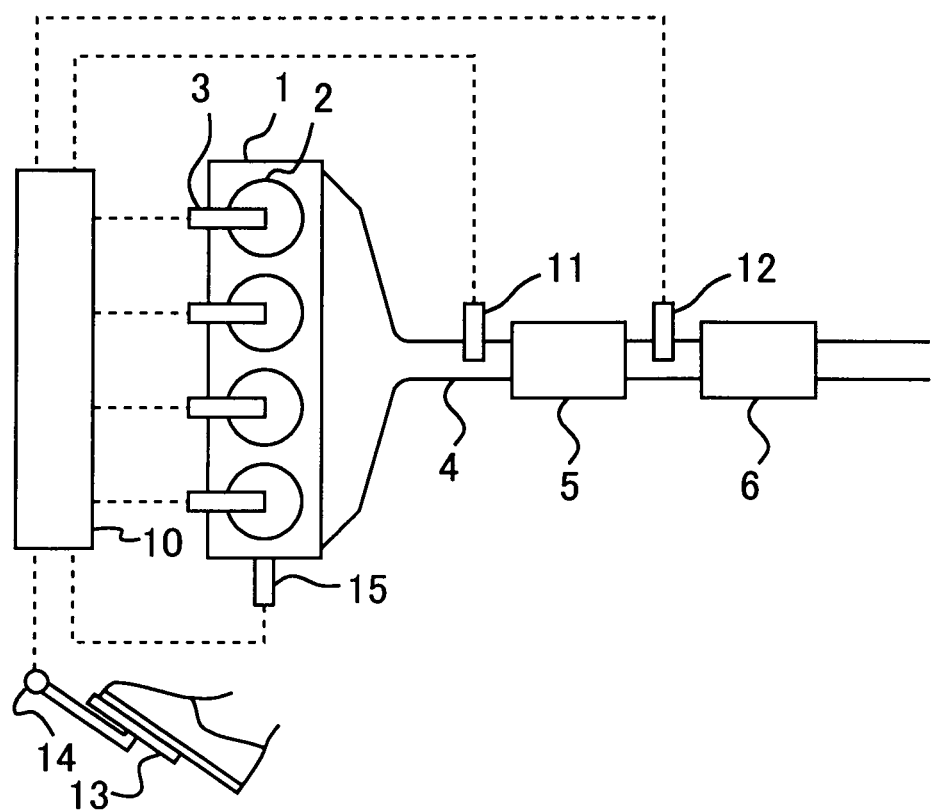
[FIG. 1] is a view showing the schematic construction of an internal combustion engine and its exhaust system to which an exhaust gas purification apparatus of an internal combustion engine according to a first embodiment of the present invention is applied.

1 Internal combustion engine
2 Cylinders
3 Fuel injection valves
4 Exhaust passage
5 Adsorbent
6 Exhaust gas purification catalyst
10 ECU
11 Incoming gas temperature sensor
12 Outgoing gas temperature sensor
13 Accelerator pedal
14 Accelerator opening sensor 15 Crank position sensor
41 Bypass passage
42 Changeover valve
51 First adsorbent
52 Second adsorbent
61 Upstream side portion
62 Downstream side portion
100 Vehicle
101 Floor
104 Exhaust passage
105 Underfloor adsorbent
106 Underfloor catalyst
107 Pre-stage catalyst
108 Pre-stage adsorbent
421 First changeover valve
422 Second changeover valve

BEST MODE FOR CARRYING OUT THE INVENTION

Hereinafter, reference will be made to specific embodiments of an exhaust gas purification apparatus of an internal combustion engine according to the present invention based on the attached drawings.
First Embodiment FIG. 1 is a view showing the schematic construction of an internal combustion engine and its exhaust system to which an exhaust gas purification apparatus of an internal combustion engine according to this embodiment of the present invention is applied. The internal combustion engine 1 shown in FIG. 1 is a four-cycle diesel engine of a water cooled type having four cylinders 2.

On each of the cylinders 2, there is mounted a fuel injection valve 3 for injecting fuel into a corresponding cylinder 2.

In addition, an exhaust passage 4 is connected to the internal combustion engine 1. In the middle of the exhaust passage 4, there are arranged an adsorbent 5 and an exhaust gas purification catalyst 6 in order from an upstream side (i.e., from the side of the internal combustion engine 1).

The adsorbent 5 has a function to adsorb the water contained in an exhaust gas, and for example, Na/Y type zeolite or IVA type zeolite can be used as the adsorbent 5. Here, note that in this embodiment, the adsorbent 5 corresponds to an adsorption device in the present invention. In addition, although the adsorbent 5 in this embodiment adsorbs water, there can be used other substances which have a property to adsorb other components contained in the exhaust gas (including a component(s) supplied to the exhaust gas). Then, in this embodiment, water corresponds to a first component in the present invention.

Moreover, the exhaust gas purification catalyst 6 need only have a property in which its purification performance for an exhaust gas changes in accordance with the temperature thereof, and at the same time have an oxidation function as well. For example, a three-way catalyst, an oxidation catalyst, and an occlusion reduction type NOx catalyst can be used for this purpose. For example, the occlusion reduction type NOx catalyst has a function of occluding NOx in an incoming exhaust gas, when the temperature thereof is within the range of a purification window and when the oxygen concentration of the exhaust gas is high, and of reducing the occluded NOx when the oxygen concentration of the incoming exhaust gas is low and when a reducing agent exists. In addition, the occlusion reduction type NOx catalyst is raised in temperature up to a temperature within the range of the purification window by supplying components such as CO after the temperature of the occlusion reduction type NOx catalyst has risen to a lower limit value of its activation temperature.

In addition, an inlet gas temperature sensor 11 for measuring the temperature of the exhaust gas flowing into the adsorbent 5 is mounted on a portion of the exhaust passage 4 upstream of the adsorbent 5. On the other hand, an outlet gas temperature sensor 12 for measuring the temperature of the exhaust gas flowing out from the adsorbent 5 is mounted on a portion of the exhaust passage 4 which is arranged at a location downstream of the adsorbent 5 and upstream of the exhaust gas purification catalyst 6. The temperature obtained by this outlet gas temperature sensor 12 can also be set as the temperature of the adsorbent 5 or the temperature of the exhaust gas purification catalyst 6. Here, note that the temperature of the adsorbent 5 or the temperature of the exhaust gas purification catalyst 6 may be measured by a sensor which is directly mounted on each of these elements In the internal combustion engine 1 constructed as stated above, there is arranged in combination therewith an ECU 10 which is an electronic control unit for controlling the internal combustion engine 1. This ECU 10 is a unit that controls the operating state of the internal combustion engine 1 in accordance with the operating conditions of the internal combustion engine 1 and/or driver's requirements.

Further, besides the above-mentioned sensors, an accelerator opening sensor 14, which is able to detect an engine load by outputting an electrical signal corresponding to an amount by which a driver depressed an accelerator pedal 13, and a crank position sensor 15, which detects the number of revolutions per minute of the engine, are connected to the ECU 10 through electrical wiring, and the output signals of these variety of kinds of sensors are inputted to the ECU 10.

On the other hand, the fuel injection valves 3 are connected to the ECU 10 through electrical wiring, so that the timing of fuel injection and the amount of fuel injection are controlled by the ECU 10.

Then, in this embodiment, at the time of starting or the like of the internal combustion engine 1, catalyst temperature raising control is carried out for raising the temperature of the exhaust gas purification catalyst 6 in a quick manner. Here, water is contained in the exhaust gas, so the water is adsorbed to the adsorbent 5. At this time, an exothermic reaction occurs. Because the temperature of the exhaust gas is raised due to this exothermic reaction, the temperature of the exhaust gas purification catalyst 6 downstream of the adsorbent 5 can be caused to rise.

When the temperature of the downstream exhaust gas purification catalyst 6 rises up to the lower limit value of the activation temperature, oxidation reactions can be made to occur in the exhaust gas purification catalyst 6, so it becomes possible to supply CO, $H_2$ or the like, for example. Although this CO or $H_2$ can be oxidized in the exhaust gas purification catalyst 6, the temperature of the exhaust gas purification catalyst 6 is caused to rise due to the heat generated at this time. Then, if the supply of CO or $H_2$ is continued until the temperature of the exhaust gas purification catalyst 6 comes into the purification window, it becomes possible to carry out the purification of the exhaust gas in a quicker manner.

Here, note that the components such as CO, being made to react in the exhaust gas purification catalyst 6, can be caused to discharge from the internal combustion engine 1 by adjusting the load of the internal combustion engine 1. In addition, the component supplied to the exhaust gas purification catalyst 6 is hereinafter called a "reducing agent". This reducing agent may be directly supplied into the exhaust gas from the outside. Then, as the reducing agent, those substances which are difficult to be adsorbed to the adsorbent 5 are used. As a result of this, even if the reducing agent is supplied from a location upstream of the adsorbent 5, the reducing agent passes through the adsorbent to arrive at the exhaust gas purification catalyst 6. Thus, in this embodiment, the reducing agent corresponds to a second component in the present invention.

Figure 2:
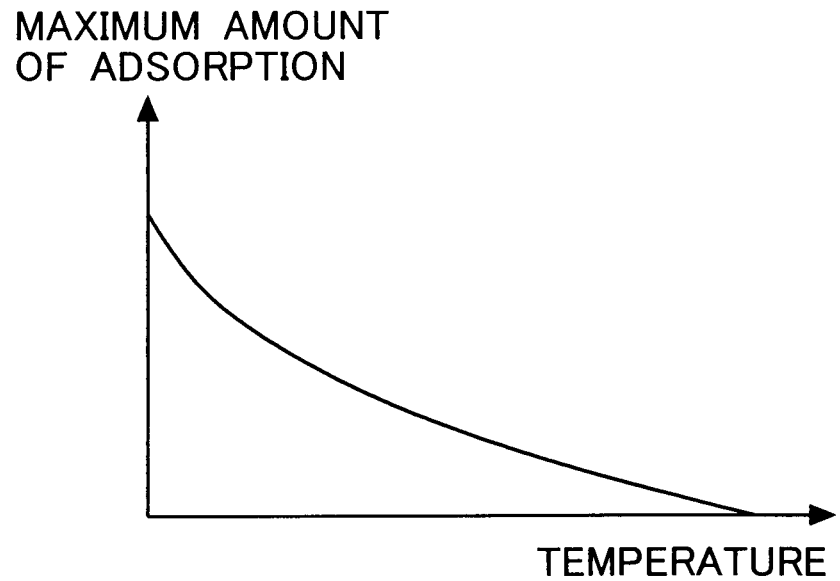
[FIG. 2] is a view showing the relation between the temperature of an adsorbent and the maximum amount of adsorption.

Incidentally, the adsorbent 5 generates heat by adsorbing water, but a maximum amount of adsorption of the adsorbent 5 decreases as the temperature thereof rises. Here, FIG. 2 is a view which shows the relation between the temperature of the adsorbent 5 and the maximum amount of water which can be adsorbed by the adsorbent 5 (hereinafter also referred to as a maximum amount of adsorption). As the temperature of the adsorbent 5 goes up, the maximum amount of adsorption decreases, and at the time when a certain temperature is reached, the maximum amount of adsorption becomes zero. That is, when the temperature of the adsorbent 5 reaches the certain temperature, it becomes impossible for the adsorbent 5 to adsorb water, so the temperature of the adsorbent 5 will not be raised due to the adsorption of water therein. Besides, because water thereafter begins to desorb from the adsorbent 5, the temperature of the adsorbent 5 falls. In other words, there is an upper limit for the temperature which is caused to rise due to the adsorption of water in the adsorbent 5. Then, as the temperature of the adsorbent 5 goes down, the temperature of the exhaust gas purification catalyst 6 also falls, so there is a possibility that even if the temperature of the exhaust gas purification catalyst 6 has once risen up to its activation temperature, it may thereafter become lower than the activation temperature.

In contrast to this, in this embodiment, before or when the adsorbent 5 reaches an upper limit temperature, the reducing agent is supplied to the exhaust gas purification catalyst 6. This may be that the reducing agent is supplied to the exhaust gas purification catalyst 6 during the time when the temperature of the adsorbent 5 is rising due to the adsorption of water therein. In other words, the supply of the reducing agent is started at a time after the temperature of the adsorbent 5 began to rise due to the adsorption of water in the adsorbent 5, and before the temperature of the adsorbent 5 begins to fall. Then, in this embodiment, the ECU 10, which supplies the reducing agent by adjusting the load of the internal combustion engine 1, corresponds to a heat generating component supply unit in the present invention.

Figure 3:
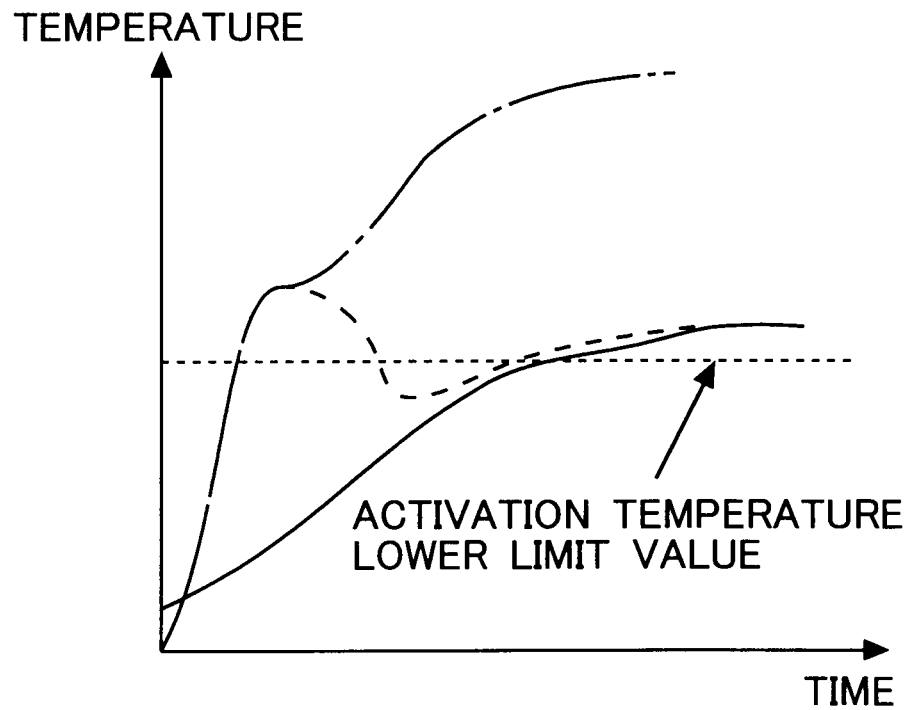
[FIG. 3] is a time chart showing the changes over time of the temperature of an exhaust gas flowing into the adsorbent, the temperature of the adsorbent, and the temperature of an exhaust gas purification catalyst.

Here, FIG. 3 is a time chart which shows the changes over time of the temperature of an exhaust gas flowing into the adsorbent 5, the temperature of the adsorbent 5, and the temperature of the exhaust gas purification catalyst 6. A solid line represents the temperature of the exhaust gas flowing into the adsorbent 5, and a broken line represents the temperature of the adsorbent 5, and an alternate long and short dash line represents the temperature of the exhaust gas purification catalyst 6, respectively.

Immediately after the starting of the internal combustion engine 1, the temperature of the exhaust gas flowing into the adsorbent 5 is the highest because the temperatures of the adsorbent 5 and the exhaust gas purification catalyst 6 are low. At this time, the temperatures of the adsorbent 5 and the exhaust gas purification catalyst 6 are equal to the ambient temperature, for example.

Then, the temperature of the adsorbent 5 rises by the water contained in the exhaust gas being adsorbed by the adsorbent 5 as the exhaust gas passes through the adsorbent 5. As a result of this, the temperature of the exhaust gas downstream of the adsorbent 5 rises, so the temperature of the exhaust gas purification catalyst 6 rises, too.

Thereafter, when the adsorbent 5 reaches the upper limit temperature, water begins to desorb from the adsorbent 5, so the temperature of the adsorbent 5 falls due to the absorption of heat at this time. However, when the desorption of water from the adsorbent 5 is completed, and in addition the temperature of the exhaust gas flowing into the adsorbent 5 rises, the temperature of the adsorbent 5 will also begin to rise again.

In addition, in this embodiment, when the temperature of the adsorbent 5 is equal to or lower than the upper limit temperature, the supply of the reducing agent is started. In other words, before the temperature of the adsorbent 5 reaches the upper limit temperature, or at the time when the temperature of the adsorbent 5 is the upper limit temperature, the supply of the reducing agent is started. As a result, the temperature of the exhaust gas purification catalyst 6 becomes higher than the temperature of the adsorbent 5. Besides, even after the temperature of the adsorbent 5 having once reached the upper limit temperature has begun to fall, the temperature of the exhaust gas purification catalyst 6 continues to rise. In this manner, the temperature of the exhaust gas purification catalyst 6 can be raised in a quick manner.

Here, note that the adsorbent 5 reaches the upper limit temperature at the time when water begins to desorb from the adsorbent 5, so the supply of the reducing agent may be started at the time when water begins to desorb from the adsorbent 5.

Moreover, the time to supply the reducing agent may be at the time when the temperature of the exhaust gas purification catalyst 6 becomes equal to or higher than the lower limit value of the activation temperature. In other words, if the temperature of the exhaust gas purification catalyst 6 becomes equal to or higher than the lower limit value of the activation temperature, the supplied reducing agent will react quickly so that the temperature of the exhaust gas purification catalyst 6 will rise, as a result of which it is possible to decrease the amount of consumption of the reducing agent. Also, it is possible to suppress the reducing agent from passing through the exhaust gas purification catalyst 6.

Further, as long as the temperature of the exhaust gas purification catalyst 6 is equal to or higher than the lower limit value of the activation temperature, the supply of the reducing agent may be started even after the temperature of the adsorbent 5 has reached the upper limit temperature. In other words, even if the temperature of the adsorbent 5 is falling, but when the temperature of the exhaust gas purification catalyst 6 is equal to or higher than the lower limit value of the activation temperature, it is possible to raise the temperature of the exhaust gas purification catalyst 6 by oxidizing the reducing agent. Here, note that in this embodiment, the ECU 10, which supplies the reducing agent in this manner, also corresponds to a heat generating component supply unit in the present invention.

Figure 4:
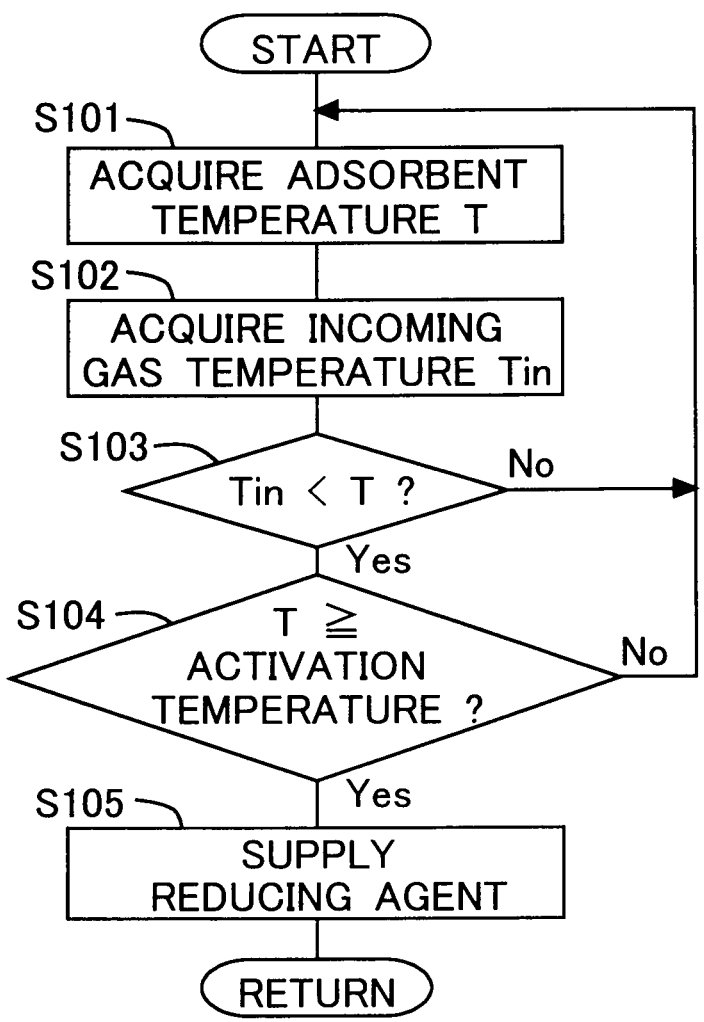
[FIG. 4] is a flow chart showing a flow for temperature raising control on an exhaust gas purification catalyst according to the first embodiment.

Next, FIG. 4 is a flow chart that shows a flow or routine for temperature raising control on the exhaust gas purification catalyst 6 according to this first embodiment. This routine is executed at the time when a request has been made for raising the temperature of the exhaust gas purification catalyst 6. This request is made, for example, at the time of the cold starting of the internal combustion engine 1.

In step S101, the temperature T of the adsorbent 5 is acquired. This may also be replaced by the temperature of the exhaust gas which flows out of the adsorbent 5. That is, an output signal from the outlet gas temperature sensor 12 is acquired.

In step S102, the temperature Tin of the exhaust gas flowing into the adsorbent 5 is acquired. That is, an output signal from the inlet gas temperature sensor 11 is acquired.

In step S103, it is determined whether the temperature T of the adsorbent 5 is higher than the temperature Tin of the exhaust gas flowing into the adsorbent 5. In other words, it is determined whether the temperature of the adsorbent 5 is raised due to the water having been adsorbed to the adsorbent 5.

In cases where an affirmative determination is made in step S103, the routine advances to step S104, whereas in cases where a negative determination is made, the routine returns to step S101.

In step S104, it is determined whether the temperature T of the adsorbent 5 is equal to or higher than the lower limit value of the activation temperature of the exhaust gas purification catalyst 6. Here, the temperature T of the adsorbent 5 is treated as being equal to the temperature of the exhaust gas purification catalyst 6, and when the temperature T of the adsorbent 5 becomes equal to or higher than the lower limit value of the activation temperature of the exhaust gas purification catalyst 6, the temperature of the exhaust gas purification catalyst 6 is also treated as being equal to or higher than the lower limit value of the activation temperature.

In cases where an affirmative determination is made in step S104, the routine advances to step S105, whereas in cases where a negative determination is made, the routine returns to step S101.

In step S105, the supply of the reducing agent is started.

In this manner, when the time to start the supply of the reducing agent is determined, it is possible to raise the temperature of the exhaust gas purification catalyst 6.

Incidentally, by starting the supply of the reducing agent at the time when the desorption of water from the adsorbent 5 starts, i.e., when the adsorbent 5 is at the upper limit temperature, it is possible to raise the temperature of the exhaust gas purification catalyst 6 more quickly. Accordingly, the temperature of the adsorbent 5 is measured by the outlet gas temperature sensor 12, and when the temperature of the adsorbent 5 begins to fall, it is assumed that the temperature of the adsorbent 5 has reached the upper limit temperature, so the supply of the reducing agent may be started.

Figure 5:
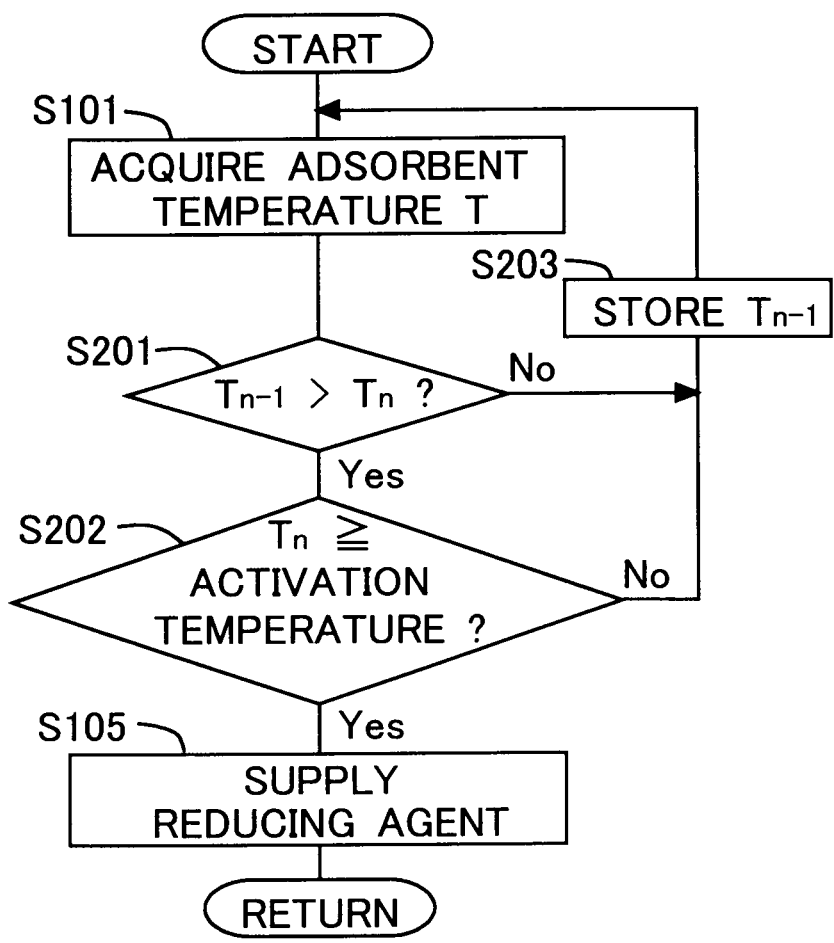
[FIG. 5] is a flow chart showing a flow for temperature raising control on the exhaust gas purification catalyst in cases where the supply of a reducing agent is started at the time when the adsorbent is at an upper limit temperature.

FIG. 5 is a flow chart which shows a flow or routine of temperature raising control on the exhaust gas purification catalyst 6 in cases where the supply of the reducing agent is started at the time when the adsorbent 5 is at the upper limit temperature. This routine is executed at the time when a request has been made for raising the temperature of the exhaust gas purification catalyst 6. This request is made, for example, at the time of cold starting of the internal combustion engine 1. Here, note that for those steps in which the same processing as in the above-mentioned flow is carried out, the same symbols are attached and an explanation thereof is omitted.

In step S201, it is determined whether the temperature $T_n$ of the adsorbent 5 acquired at this time is lower than the temperature $T_{n-1}$ of the adsorbent 5 that was acquired the last time. In other words, it is determined whether the temperature of the adsorbent 5 is falling.

In cases where an affirmative determination is made in step S201, the routine advances to step S202, whereas in cases where a negative determination is made, the routine goes to step S203.

In step S202, it is determined whether the temperature $T_n$ of the adsorbent 5 acquired at this time is equal to or higher than the lower limit value of the activation temperature of the exhaust gas purification catalyst 6. In this step, the same processing as that in the above-mentioned step S104 is carried out.

In cases where an affirmative determination is made in step S202, the routine advances to step S105, whereas in cases where a negative determination is made, the routine advances to step S203.

In step S203, the temperature $T_n$ of the adsorbent 5 acquired at this time is stored as the temperature $T_{n-1}$ of the adsorbent 5 acquired the last time. This value becomes a comparison object which is compared, in the next step S201, as the temperature $T_{n-1}$ of the adsorbent 5 acquired the last time. After that, the routine returns to step S101.

Thus, by determining the time to start the supply of the reducing agent, the heat of adsorption generated in the adsorbent 5 can be used to the utmost extent, so it is possible to raise the temperature of the exhaust gas purification catalyst 6 in a quick manner.

Here, note that in this embodiment, the time to supply the reducing agent is determined based on the temperature of the adsorbent 5, but the time to supply the reducing agent may instead be determined based on the amount of adsorption of water in the adsorbent 5. Here, the time when the temperature of the adsorbent 5 is rising is a time in which water continues to be adsorbed in the adsorbent 5. In addition, the reason that the temperature of the adsorbent 5 reaches the upper limit temperature and thereafter begins to fall is due to the fact that water begins to desorb from the adsorbent 5.

In other words, the temperature of the adsorbent 5 in the above-mentioned explanation can be replaced by the amount of adsorption of water in the adsorbent 5. For example, the supply of the reducing agent may be started before water begins to desorb from the adsorbent 5 or at the time when water begins to desorb. Also, the supply of the reducing agent may be started after the desorption of water from the adsorbent 5 starts, and at the same time when the temperature of the exhaust gas purification catalyst 6 is equal to or higher than the lower limit value of the activation temperature. Here, note that in this embodiment, the ECU 10, which supplies the reducing agent in this manner, also corresponds to a heat generating component supply unit in the present invention.

In addition, in this embodiment, only in cases where the degree of purification of the exhaust gas in the exhaust gas purification catalyst 6 becomes higher by executing catalyst temperature raising control, the reducing agent can be supplied. For example, in cases where the temperature of the exhaust gas purification catalyst 6 rises to a sufficient extent depending on the operating state of the internal combustion engine 1, catalyst temperature raising control is not carried out. This includes a case where the temperature of the exhaust gas from the internal combustion engine 1 is high, and a case where a lot of heat is generated in the adsorbent 5 due to the fact that much water is contained in the exhaust gas from the internal combustion engine 1.

Moreover, at the time of very low temperatures, even if water is adsorbed in the adsorbent 5 to generate heat, the temperature of the exhaust gas purification catalyst 6 may not rise. In this case, too, catalyst temperature raising control is not carried out.

Further, in cases where the temperature of the exhaust gas purification catalyst 6 is within the purification window, or in cases where there is a possibility that the exhaust gas purification catalyst 6 may overheat, it is not necessary to supply the reducing agent, so catalyst temperature raising control is not carried out.

A determination as to whether catalyst temperature raising control is to be carried out can also be made, for example, based on the operating state of the internal combustion engine 1. For example, an operating state capable of raising the temperature of the exhaust gas purification catalyst 6 up to the purification window is beforehand calculated through experiments, etc. Then, when the actual operating state of the internal combustion engine 1 is the state which has been calculated beforehand, catalyst temperature raising control is prohibited. This is to determine whether the degree of purification of the exhaust gas in the exhaust gas purification catalyst 6 becomes higher.

In addition, a determination as to whether catalyst temperature raising control is to be carried out may be made based on the temperature of the exhaust gas purification catalyst 6 or the temperature of the internal combustion engine 1. Then, only when this temperature is within a predetermined temperature range, catalyst bed temperature control is performed. This predetermined temperature range has beforehand been calculated through experiments, etc., as temperatures which can raise the temperature of the exhaust gas purification catalyst 6 up to the lower limit value of the activation temperature. Here, the temperature of the internal combustion engine 1 may also be a cooling water temperature or a lubricating oil temperature, for example.

Here, note that in this embodiment, the ECU 10, which determines whether catalyst temperature raising control is to be carried out, corresponds to a purification degree determination unit in the present invention. Also, in this embodiment, the ECU 10, which prohibits catalyst temperature raising control according to this determination, corresponds to a prohibition unit in the present invention.

As described above, according to this embodiment, the temperature of the exhaust gas purification catalyst 6 can be raised by making use of the heat of adsorption in the adsorbent 5. In addition, the temperature of the exhaust gas purification catalyst 6 can be quickly raised by starting the supply of the reducing agent, at the time when the temperature of the adsorbent 5 is higher than the temperature of the exhaust gas, or when the adsorbent 5 is at the upper limit temperature.

Second Embodiment

In this embodiment, the upper limit temperature of the adsorbent 5 is set in such a manner that the upper limit temperature at which the adsorbent 5 can adsorb water becomes in the vicinity of the lower limit value of the activation temperature of the exhaust gas purification catalyst 6. The other devices, parts, control, and so on are the same as those in the first embodiment, so an explanation thereof is omitted.

Figure 6:
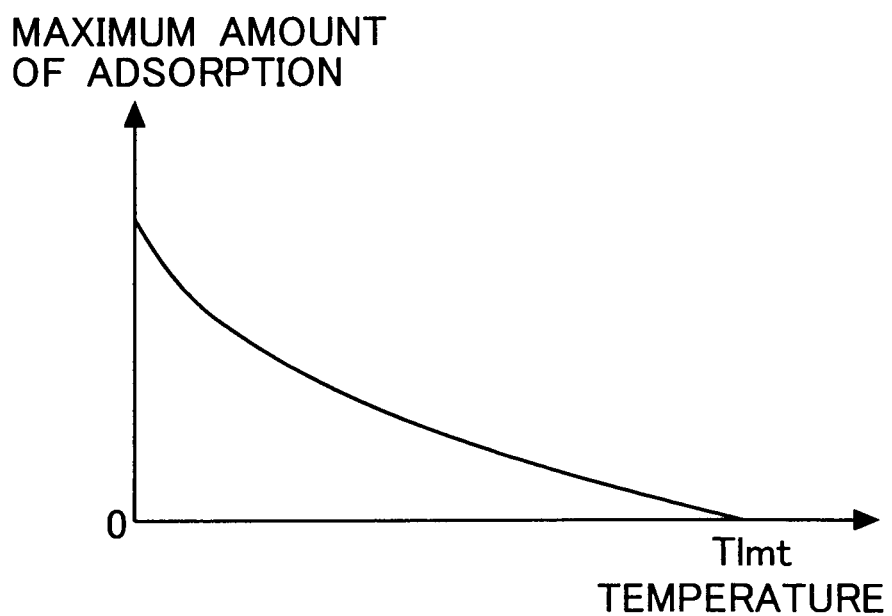
[FIG. 6] is a view showing the relation among the temperature of an adsorbent, the maximum amount of adsorption, and the lower limit value of the activation temperature of the exhaust gas purification catalyst.

Here, FIG. 6 is a view which shows the relation among the temperature of the adsorbent 5, the maximum amount of water which can be adsorbed by the adsorption 5 (hereinafter also referred to as a maximum amount of adsorption), and the lower limit value of the activation temperature of the exhaust gas purification catalyst 6. As the temperature of the adsorbent 5 goes up, the maximum amount of adsorption decreases, and at the time when a certain temperature Tlmt is reached, the maximum amount of adsorption becomes zero. The temperature of the exhaust gas purification catalyst 6 is made to be the lower limit value of the activation temperature in the vicinity of the temperature Tlmt at which the maximum amount of adsorption becomes zero. Here, note that the term "in the vicinity of the temperature in which the maximum amount of adsorption becomes zero" is assumed to also include the temperature at which the maximum amount of adsorption becomes zero.

By doing in this manner, the desorption of water from the adsorbent 5 is started at the same time as the temperature of the exhaust gas purification catalyst 6 reaches the activation temperature. Here, after the temperature of the exhaust gas purification catalyst 6 has reached the activation temperature, the temperature of the exhaust gas purification catalyst 6 can be raised by the supply of the reducing agent, and hence it is unnecessary to raise the temperature of the exhaust gas purification catalyst 6 by means of the adsorbent 5. In other words, when the exhaust gas purification catalyst 6 reaches the activation temperature, the desorption of water from the adsorbent 5 can be started without any problem. On the other hand, the amount of water adsorbed in the adsorbent 5 can be decreased by desorbing the water from the adsorbent 5. There is a limitation on the amount of water which can be adsorbed to the adsorbent 5, and hence, by desorbing water from the adsorbent 5, it becomes possible for the adsorbent 5 to adsorb water in cases where the temperature of the exhaust gas purification catalyst 6 is required to be raised in the next time.

In this manner, by setting the upper limit temperature of the adsorbent 5 in the vicinity of the lower limit value of the activation temperature of the exhaust gas purification catalyst 6, it becomes possible to raise the temperature of the exhaust gas purification catalyst 6 in a quick manner.

Third Embodiment

In this embodiment, when it is not necessary to raise the temperature of the exhaust gas purification catalyst 6, the amount of water adsorbed in the adsorbent 5 is maintained below a specified value. Here, the specified value is determined in such a manner that when water is further caused to be adsorbed to the adsorbent 5 from the state in which the specified amount of water has been adsorbed in the adsorbent 5, the temperature of the exhaust gas purification catalyst 6 can be raised up to the lower limit value of the activation temperature. In addition, the case in which it is not necessary to raise the temperature of the exhaust gas purification catalyst 6 rise means, for example, a case in which the exhaust gas purification catalyst 6 is at the activation temperature, or a case in which it is difficult to perform the temperature rise of the exhaust gas purification catalyst 6. The other devices, parts, control, and so on are the same as those in the first embodiment, so an explanation thereof is omitted.

Then, in this embodiment, for the purpose of decreasing the amount of water adsorbed in the adsorbent 5, the temperature of the adsorbent 5 is raised. Here, as shown in FIG. 2, as the temperature of the adsorbent 5 rises, the maximum amount of adsorption thereof decreases. That is, in cases where an amount of water more than the maximum amount of adsorption is adsorbed in the adsorbent 5, an amount of water in excess of the maximum amount of adsorption desorbs from the adsorbent 5. Thus, by maintaining the temperature of the adsorbent 5 equal to or higher than a temperature (hereinafter also referred to as a specified temperature) at which the maximum amount of adsorption becomes the specified value, it is possible to maintain the amount of water adsorbed in the adsorbent 5 equal to or less than the specified value.

Figure 7:
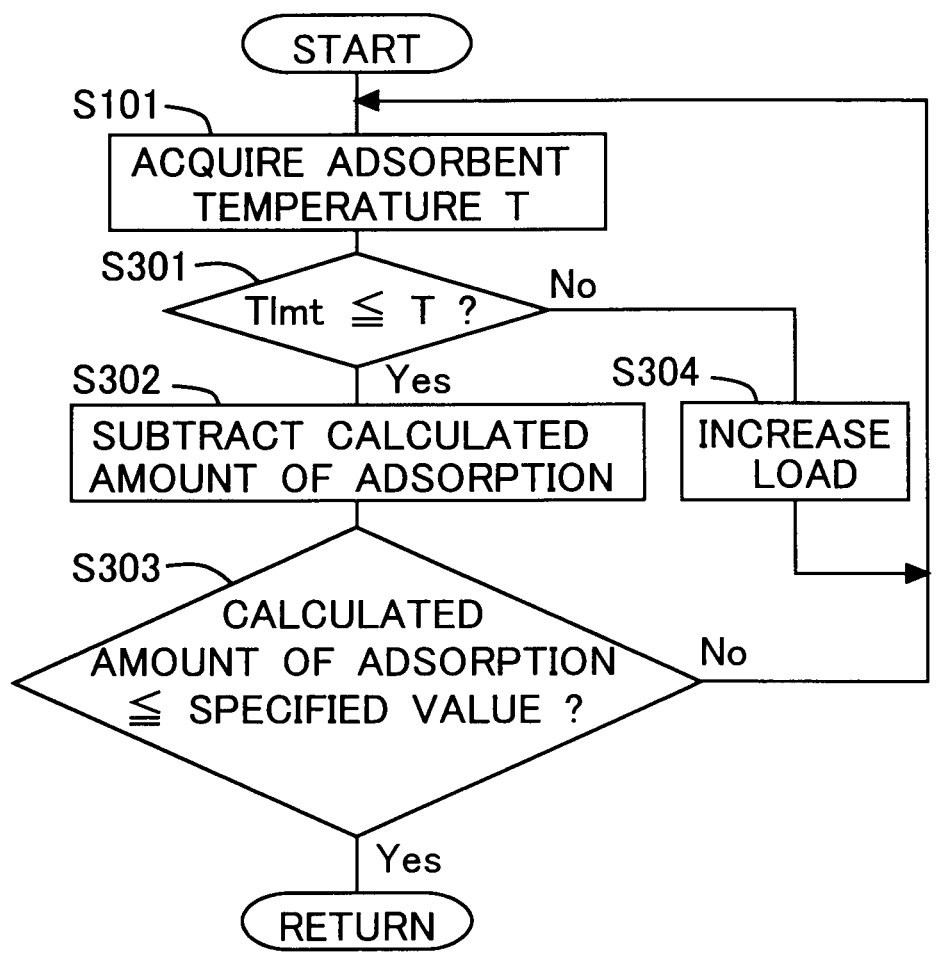
[FIG. 7] is a flow chart showing a flow for desorbing water from the adsorbent.

FIG. 7 is a flow chart which shows a flow or routine for desorbing water from the adsorbent 5. This routine is executed in a repeated manner at the time when it is not necessary to raise the temperature of the exhaust gas purification catalyst 6. Here, note that for those steps in which the same processing as in the above-mentioned flow is carried out, the same symbols are attached and an explanation thereof is omitted.

In step S301, it is determined whether the temperature T of the adsorbent 5 is equal to or higher than the specified temperature Tlmt. In other words, it is determined whether the amount of water adsorbed in the adsorbent 5 is equal to or less than the specified value.

In cases where an affirmative determination is made in step S301, the routine advances to step S302, whereas in cases where a negative determination is made, the routine advances to step S304.

In step S302, a calculated amount of adsorption is subtracted. The calculated amount of adsorption is an amount of adsorption obtained by calculation, and can be obtained according to a flow shown in FIG. 10 to be described later. In addition, the relation among the amount of water adsorbed by the adsorbent 5, the temperature of the adsorbent 5, and the amount of water desorbed from the adsorbent 5 has beforehand been obtained through experiments, etc., and stored as a map. The amount of water desorbed from the adsorbent 5 is calculated by substituting the calculated amount of adsorption and the temperature of the adsorbent 5 into this map. A new calculated amount of adsorption is obtained by subtracting the amount of desorption from the calculated amount of adsorption.

In step S303, it is determined whether the calculated amount of adsorption is equal to or less than the specified value. In other words, it is determined whether the adsorbent 5 has an availability (i.e., available capacity) to such an extent that the temperature of the exhaust gas purification catalyst 6 can be raised up to the lower limit value of the activation temperature.

In cases where an affirmative determination is made in step S303, the routine is once ended, whereas in cases where a negative determination is made, the routine returns to step S101.

In step S304, the load of the internal combustion engine 1 is increased. As a result of this, the temperature of the exhaust gas rises, and hence the temperature of the adsorbent 5 also rises. For example, the amount of fuel injection may be increased, while delaying the injection timing of fuel injected from the fuel injection valves 3. Here, note that in this embodiment, the ECU 10, which performs the processing of step S304, corresponds to a temperature raising unit in the present invention.

Here, note that depending on the operating state of the internal combustion engine 1, the engine load may not be able to be increased in step S304. In such a case, just before stopping the internal combustion engine 1, the temperature of the adsorbent 5 may be raised to the specified temperature or higher. For example, even if the driver turns off a key switch so as to stop the internal combustion engine 1, the temperature of the exhaust gas is caused to rise without immediately stopping the internal combustion engine 1. Then, when the calculated amount of adsorption becomes equal to or less than the specified value, the internal combustion engine 1 is stopped.

By doing in this manner, even if the internal combustion engine 1 is stopped at any time, it is possible to cause water to be adsorbed to the adsorbent 5 at the time of the next starting of the internal combustion engine 1. As a result, the temperature of the exhaust gas purification catalyst 6 can be caused to rise in a quick manner.

In addition, raising the temperature of the exhaust gas in this manner may be limited to the time when the amount of adsorption of water in the adsorbent 5 is more than the specified value. As a result of this, the amount of fuel required to raise the temperature of the exhaust gas can be saved or decreased.

Fourth Embodiment

In this embodiment, the exhaust gas purification catalyst 6 is produced so that the lower limit value of the activation temperature of an upstream side portion of the exhaust gas purification catalyst 6 becomes lower than the lower limit value of the activation temperature of a downstream side portion thereof. Specifically, the amount of precious metal, which is carried by the upstream side portion of the exhaust gas purification catalyst 6, is increased. The other devices, parts, control, and so on are the same as those in the first embodiment, so an explanation thereof is omitted.

Figure 8:
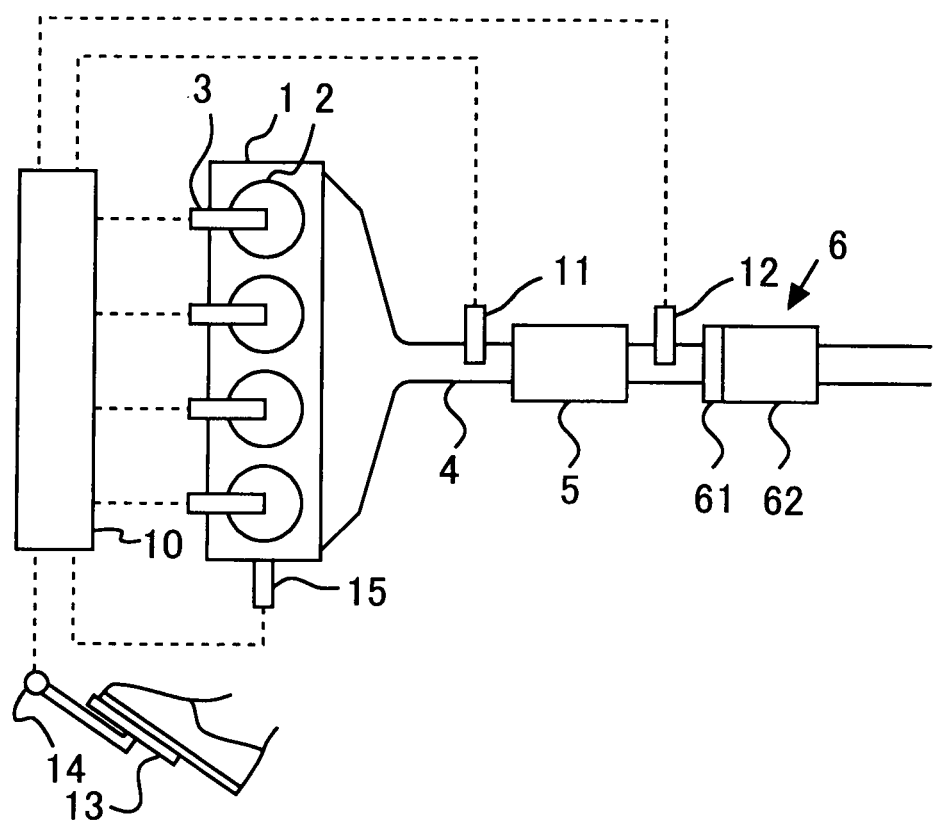
[FIG. 8] is a view showing the schematic construction of an internal combustion engine and its exhaust system to which an exhaust gas purification apparatus of an internal combustion engine according to a fourth embodiment of the present invention is applied.

FIG. 8 is a view that shows the schematic construction of an internal combustion engine and its exhaust system to which an exhaust gas purification apparatus of an internal combustion engine according to this embodiment of the present invention is applied. As compared with FIG. 1, only the exhaust gas purification catalyst 6 differs.

The exhaust gas purification catalyst 6 is constructed to include an upstream side portion 61 in which a lower limit value of its activation temperature is low, and a downstream side portion 62 in which a lower limit value of its activation temperature is higher than that of the upstream portion 61. Here, note that the upstream side portion 61 indicates an upstream side portion of the exhaust gas purification catalyst 6 in the case where the exhaust gas purification catalyst 6 is assumed to have two portions arranged in a flow direction of an exhaust gas, and it includes an upstream side end thereof. The size of the upstream side portion 61 may be determined based on the temperature raising capability of the exhaust gas purification catalyst 6 by means of the adsorbent 5, etc., or optimum values for the size of the upstream side portion 61 may be obtained through experiments, etc.

This exhaust gas purification catalyst 6 can be produced first by dipping an entire carrier in a catalyst solution, and then by dipping only the upstream side portion 61 in a high-concentration catalyst solution.

With such a construction, even in cases where it is difficult to raise the temperature of the entire exhaust gas purification catalyst 6 to the lower limit value of the activation temperature by means of the heat generated in the adsorbent 5, only the upstream side portion 61 of the exhaust gas purification catalyst 6 is raised to the lower limit value of the activation temperature. Then, when the temperature of the upstream side portion 61 rises up to the lower limit value of the activation temperature, the reducing agent can be made to react to generate heat in the upstream side portion 61, as a result of which the temperature of the entire exhaust gas purification catalyst 6 can be raised. In other words, the lower limit value of the activation temperature of the upstream side portion 61 of the exhaust gas purification catalyst 6 is low, so the upstream side portion 61 is activated quickly. Then, by supplying the reducing agent to this upstream side portion 61 currently activated, heat is generated in the upstream side portion 61. This heat raises the temperature of the exhaust gas. Thus, during the time when the exhaust gas having its temperature thus raised passes through the downstream side portion 62 of the exhaust gas purification catalyst 6, the temperature of the downstream side portion 62 is raised.

Thus, even in cases where there is a small amount of heat generated in the adsorbent 5, the temperature of the exhaust gas purification catalyst 6 can be raised. In addition, the reducing agent can be supplied to the exhaust gas purification catalyst 6 from a state in which the temperature of the adsorbent 5 is lower than usual. Therefore, the temperature of the exhaust gas purification catalyst 6 can be raised in a quick manner, so that the exhaust gas can be purified at an early stage. Moreover, only the upstream side portion 61 of the exhaust gas purification catalyst 6 needs to be activated, so the volume of the adsorbent 5 can also be made small.

Fifth Embodiment

In this embodiment, when it is necessary to raise the temperature of the exhaust gas purification catalyst 6, the amount of the water contained in the exhaust gas is caused to increase. The other devices, parts, control, and so on are the same as those in the first embodiment, so an explanation thereof is omitted.

Here, an increase in the amount of the water contained in the exhaust gas is made possible by increasing the amount of fuel injected from the fuel injection valves 3. For example, by retarding the fuel injection timing while at the same time increasing the amount of fuel injected from the fuel injection valves 3, the increase in the torque generated by the internal combustion engine 1 can be suppressed even if the amount of the water contained in the exhaust gas is increased.

By increasing the amount of the water contained in the exhaust gas in this manner, a larger amount of water can be adsorbed to the adsorbent 5, and hence it becomes possible to raise the temperature of the exhaust gas purification catalyst 6 in a quicker manner. Here, note that there exists a limitation on the amount of water per unit time which can be adsorbed by the adsorbent 5, and hence, the amount of fuel injection may be adjusted so that the amount of water per unit time which can be adsorbed by the adsorbent 5 is discharged.

Figure 9:
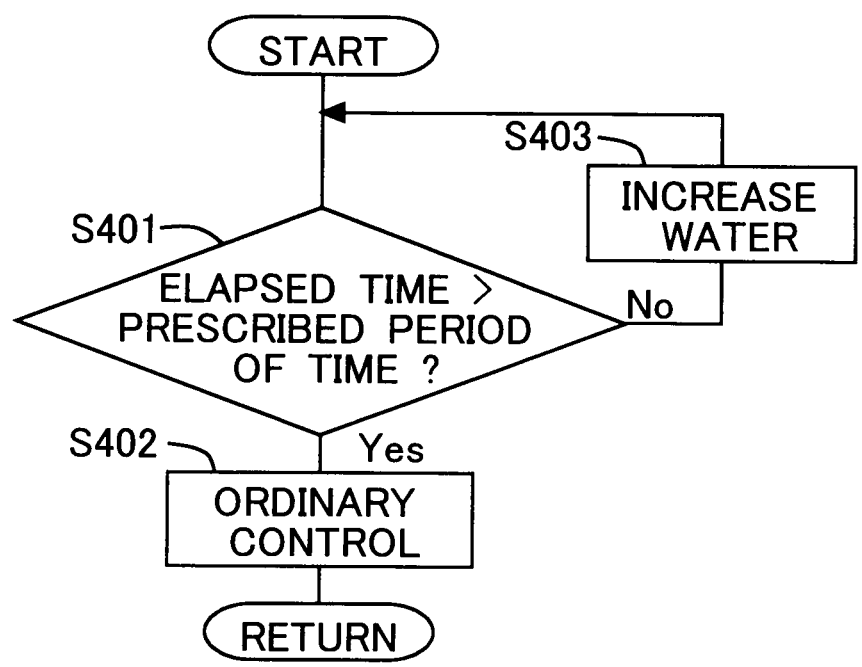
[FIG. 9] is a flow chart showing a flow for temperature raising control on an exhaust gas purification catalyst according to a fifth embodiment.

FIG. 9 is a flow chart which shows a flow or routine for temperature raising control on an exhaust gas purification catalyst according to this fifth embodiment. This routine is executed in a repeated manner at the time when it is necessary to raise the temperature of the exhaust gas purification catalyst 6.

In step S401, it is determined whether the time elapsed from the beginning of the starting of the internal combustion engine 1 is longer than a prescribed period of time. This prescribed period of time has beforehand been obtained through experiments, etc., and set as an upper limit value of the time corresponding immediately after the starting of the internal combustion engine 1.

In cases where an affirmative determination is made in step S401, the routine advances to step S402, whereas in cases where a negative determination is made, the routine advances to step S403.

In step S402, ordinary control is executed. The ordinary control is control which raises the temperature of the exhaust gas purification catalyst 6 without increasing the amount of the water contained in the exhaust gas, and it is the control which is executed in the above-mentioned embodiments.

In step S403, the amount of the water contained in the exhaust gas is increased. In other words, the load of the internal combustion engine 1 is increased. After that, the routine returns to step S401.

Thus, the amount of the water contained in the exhaust gas is increased at the time of starting of the internal combustion engine 1, so it is possible to cause a larger amount of water to be adsorbed by the adsorbent 5. As a result of this, a larger amount of adsorption heat is generated, so that the temperature of the exhaust gas purification catalyst 6 can be raised in a shorter period of time.

Here, note that, as stated above, in a state where the degree of purification of the exhaust gas in the exhaust gas purification catalyst 6 does not become high even if the amount of the water contained in the exhaust gas is increased, i.e., in cases where the temperature of the exhaust gas purification catalyst 6 is low, or in cases where the amount of the water contained in the exhaust gas is originally large, or further, in cases where the temperature of the exhaust gas purification catalyst 6 is high, etc., it is not necessary to perform the control in this embodiment.

Sixth Embodiment

In this embodiment, by making a comparison between the amount of adsorption of water (hereinafter referred to as the calculated amount of adsorption), which is obtained by calculation at the time when the temperature of the adsorbent 5 is raised to the upper limit temperature due to the adsorption of water, and an actual amount of adsorption, a correction coefficient used when obtaining the calculated amount of adsorption is corrected. The other devices, parts, control, and so on are the same as those in the first embodiment, so an explanation thereof is omitted.

The calculated amount of adsorption is used, for example, in the third embodiment to determine whether the amount of water adsorbed in the adsorbent 5 has become equal to or less than the specified value. Also, the calculated amount of adsorption may be used at the time when the reducing agent is supplied to the exhaust gas purification catalyst 6, or when the load of the internal combustion engine 1 is changed, etc. Here, the maximum amount of adsorption of the water in the adsorbent 5 changes due to deterioration of the adsorbent 5, etc. Therefore, it is also necessary to change the calculated amount of adsorption according to this.

Figure 10:
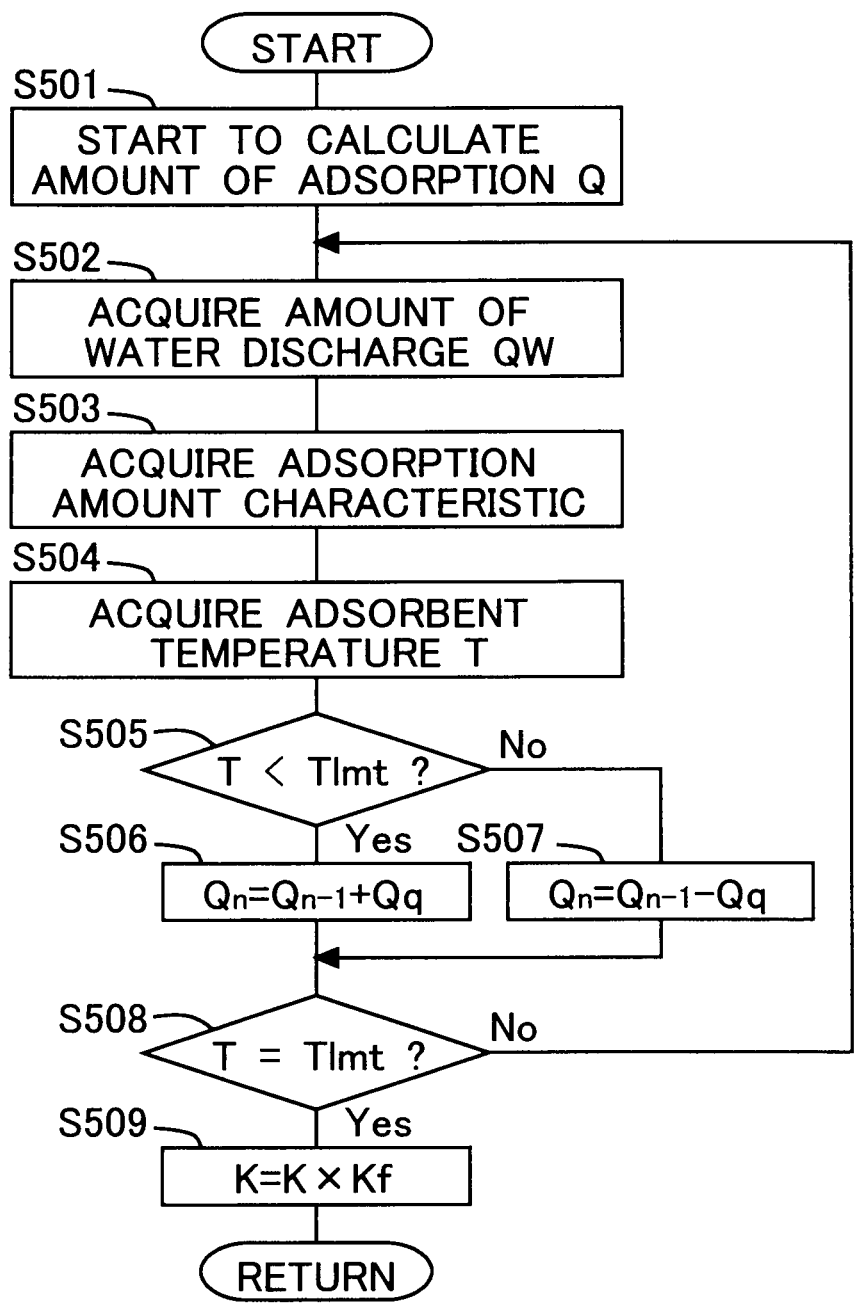
[FIG. 10] is a flow chart showing a flow for calculating a calculated amount of adsorption according to a sixth embodiment.

FIG. 10 is a flow chart that shows a flow or routine for calculating the calculated amount of adsorption according to this sixth embodiment. This routine is executed after the water adsorbed in the adsorbent 5 has been desorbed. In other words, for the purpose of calculating the amount of adsorption of water in an accurate manner, this routine is started from a state in which water is not adsorbed in the adsorbent 5.

In step S501, the calculation of the amount of adsorption Q of the water in the adsorbent 5 is started. Here, an initial value is 0.

In step S502, the amount of discharge QW of water per unit time (g/s) from the internal combustion engine 1 is acquired. This amount of discharge QW of water has a correlation with the number of engine revolutions per minute and the amount of fuel injection, so the relation among the amount of discharge QW of water, the number of engine revolutions per minute, and the amount of fuel injection has beforehand been obtained through experiments, etc., and made into a map. In addition, the amount of water discharge QW can change due to the secular change (aging), etc., of the internal combustion engine 1, so in this embodiment, it becomes an object to be corrected.

In step S503, the relation among the temperature of the adsorbent 5, the rate of adsorption QAD (g/s) of water to the adsorbent 5, and the rate of desorption QRL (g/s) of water from the adsorbent 5 are acquired.

Figure 11:
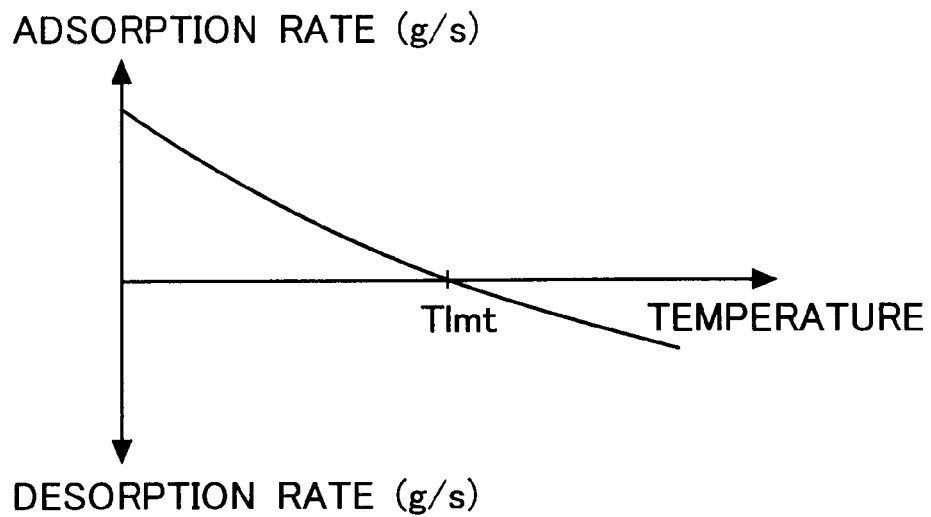
[FIG. 11] is a view showing the relation between the rate of adsorption of water into an adsorbent and the rate of desorption of water from the adsorbent 5.

FIG. 11 is a view which shows the relation between the temperature of the adsorbent 5, the rate of adsorption (g/s) of water to the adsorbent 5, and the rate of desorption (g/s) of water from the adsorbent 5. These may instead be the amount of adsorption per unit time or the amount of desorption per unit time. When the temperature of the adsorbent 5 is lower than the specified temperature Tlmt, water is adsorbed, and the lower the temperature, the faster the rate of adsorption becomes. On the other hand, when the temperature of the adsorbent 5 is higher than the specified temperature Tlmt, water is desorbed, and the higher the temperature, the faster the rate of desorption becomes. These relations have beforehand been obtained through experiments, etc., and made into a map. In addition, the rate of adsorption (g/s) of water to the adsorbent 5 and the rate of desorption (g/s) of water from the adsorbent 5 can change due to the deterioration of the adsorbent, etc., so in this embodiment, they become objects to be corrected.

In step S504, the temperature T of the adsorbent 5 is acquired. This is obtained by the outlet gas temperature sensor 12.

In step S505, it is determined whether the temperature T of the adsorbent 5 is lower than the specified temperature Tlmt. In other words, it is determined whether water is adsorbed to the adsorbent 5. By this, it is determined whether the amount of adsorption Q is added or subtracted by its amount of change. In cases where an affirmative determination is made in step S505, the routine advances to step S506, whereas in cases where a negative determination is made, the routine advances to step S507.

In step S506, the amount of adsorption Q of the water in the adsorbent 5 is calculated. In this step, the amount of adsorption $Q_n$ of water at the time of the current routine is calculated by adding a changed portion Qq of the amount of adsorption from the last routine to the current routine to the amount of adsorption $Q_{n-1}$ at the time of the last routine.

The changed portion Qq of the amount of adsorption can be obtained by the following equation.

$$Qq = MIN(QW, QAD) \times K$$

Here, for MIN (QW, QAD), there is adopted the value of the smaller one of the amount of discharge QW of water from the internal combustion engine 1 and the rate of adsorption QAD of water to the adsorbent 5. In other words, in cases where the amount of discharge QW of water from the internal combustion engine 1 is less than the rate of adsorption QAD of water to the adsorbent 5, what is adsorbed to the adsorbent 5 is only the amount of discharge QW of water from the internal combustion engine 1. On the other hand, however, no matter how large the amount of discharge QW of water from the internal combustion engine 1 is, what is more than the rate of adsorption QAD of water to the adsorbent 5 can not be adsorbed by the adsorbent 5, and hence, what is adsorbed to the adsorbent 5 becomes the rate of adsorption QAD of water to the adsorbent 5. In addition, K is a correction coefficient, and is set based on FIG. 12.

Figure 12:
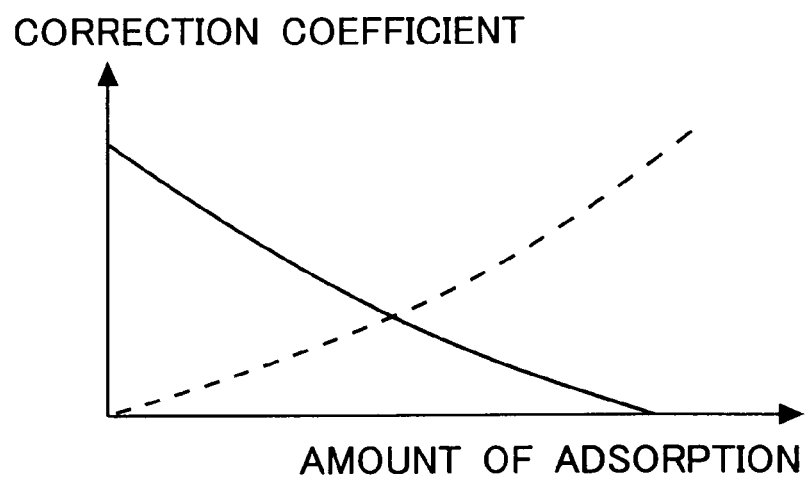
[FIG. 12] is a view showing the relation between the amount of adsorption of water in the adsorbent 5 and a correction coefficient.

Here, FIG. 12 is a view which shows the relation between the amount of water adsorption G in the adsorbent 5 and the correction coefficient K. A solid line indicates the correction coefficient at the time of adsorption, and a broken line indicates the correction coefficient at the time of desorption. Here, the more the amount of adsorption in the adsorbent 5, more difficult the adsorption of water to the adsorbent 5 becomes, but on the other hand, the easier the desorption of water from the adsorbent 5 becomes, so the correction coefficient K is set so as to make this correction. In other words, during the time when the adsorbent 5 is adsorbing water, the more the amount of adsorption Q, the smaller the correction coefficient K becomes. On the other hand, during the time when water is desorbing from the adsorbent 5, the more the amount of adsorption Q, the larger the correction coefficient K becomes.

Then, the amount of adsorption $Q_n$ of the water in the adsorbent 5 can be obtained by the following equation.

$$Q_n = Q_{n-1} + Qq$$

In step S507, the amount of adsorption Q of the water in the adsorbent 5 is calculated. In this step, the amount of adsorption $Q_n$ of water at the time of the current routine is calculated by subtracting a changed portion Qq of the amount of adsorption from the last routine to the current routine from the amount of adsorption $Q_{n-1}$ at the time of the last routine.

The changed portion Qq of the amount of adsorption can be obtained by the following equation.

$$Qq = QRL \times K,$$

where K is the correction coefficient, and is set based on FIG. 12.

Then, the amount of adsorption $Q_n$ of the water in the adsorbent 5 can be obtained by the following equation.

$$Q_n = Q_{n-1} - Qq$$

In cases where the amount of adsorption $Q_n$ calculated at this time becomes a negative value, the value of 0 is substituted instead of $Q_n$.

In step S508, it is determined whether the temperature T of the adsorbent 5 becomes the specified temperature Tlmt. In other words, it is determined whether the adsorbent 5 is in a state in which the adsorption of water and the desorption of water do not occur. In cases where an affirmative determination is made in step S508, the routine advances to step S509, whereas in cases where a negative determination is made, the routine returns to step S502.

In step S509, the correction coefficient is corrected. First, a deviation coefficient Kf is obtained by the following equation.

$$Kf = Q_n / Q_{id},$$

where $Q_{id}$ is the theoretical value of the amount of adsorption of water when the temperature T of the adsorbent 5 is the specified temperature Tlmt. In other words, the deviation coefficient Kf is a value which indicates how large the calculated amount of adsorption $Q_n$ is with respect to the actual or measured amount of adsorption $Q_{id}$.

Here, the actual amount of adsorption $Q_{id}$ may also be the theoretical value of the amount of adsorption. This actual amount of adsorption $Q_{id}$ has a correlation with the amount of generated heat in the adsorbent 5, and hence can be obtained based on the amount of generated heat. Then, the amount of generated heat can be obtained based on the difference between the temperature of the exhaust gas obtained by the outlet gas temperature sensor 12 and the temperature of the exhaust gas obtained by the inlet gas temperature sensor 11, and the heat capacity of the adsorbent 5.

Then, the correction coefficient K at the time of the current routine is obtained by multiplying the correction coefficient K at the time of the last routine by the deviation coefficient Kf. In other words, the correction coefficient K is corrected by the following equation.

$$K = K \times Kf$$

The changed portion Qq of the amount of adsorption is corrected by the use of the correction coefficient K obtained in this manner, in the next step S506 and step S507.

As a result of this, the amount of discharge QW of water, the rate of adsorption (g/s) of water to the adsorbent 5, or the rate of desorption (g/s) of water from the adsorbent 5 are corrected. Here, note that in this embodiment, the correction coefficient K, the adsorption rate of the water to the adsorbent 5, or the rate of desorption of water from the adsorbent 5 corresponds to a parameter in the present invention.

As described above, according to this embodiment, the calculated amount of adsorption can be obtained in an accurate manner, so the amount of generated heat obtained from the calculated amount of adsorption can also be obtained in a more accurate manner.

Seventh Embodiment

In this embodiment, the amount of discharge QW of water per unit time from the internal combustion engine 1 is corrected. This is equivalent to correcting the amount of water which flows into the adsorbent 5. The other devices, parts, control, and so on are the same as those in the first embodiment, so an explanation thereof is omitted.

Here, the amount of water discharged from the internal combustion engine 1 changes due to the secular change or aging of the internal combustion engine 1. Therefore, the amount of water adsorbed to the adsorbent 5 also changes. Accordingly, by taking into consideration the change of the amount of water discharged from the internal combustion engine 1 upon calculating the amount of adsorption, a more accurate amount of adsorption can be obtained.

Figure 13:
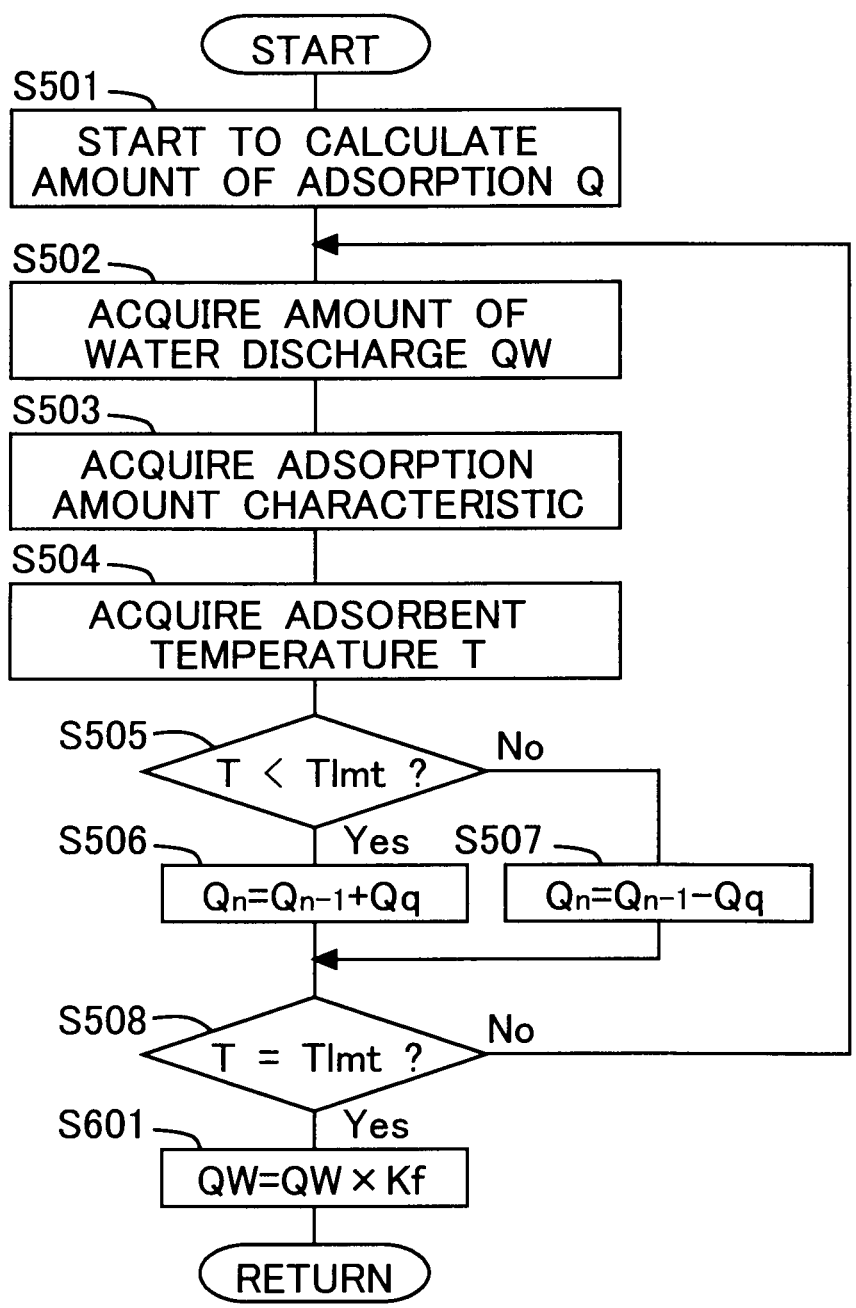
[FIG. 13] is a flow chart showing a flow for calculating a calculated amount of adsorption according to a seventh embodiment.

FIG. 13 is a flow chart which shows a flow or routine for calculating the calculated amount of adsorption according to this embodiment. This routine is executed after the water adsorbed in the adsorbent 5 has been desorbed. Here, note that for those steps in which the same processing as in the above-mentioned flow is carried out, the same symbols are attached and an explanation thereof is omitted.

In step S601, the amount of discharge QW of water from the internal combustion engine 1 is corrected. First, the deviation coefficient Kf is obtained by the following equation, similar to the above-mentioned flow.

$$Kf=Q_n/Q_{id}$$

Then, the amount of discharge QW of water at the time of the current routine is obtained by multiplying the amount of discharge QW of water at the time of the last routine by the deviation coefficient Kf. In other words, the amount of discharge QW of water from the internal combustion engine 1 is corrected by the following equation.

$$QW=QW \times Kf$$

The calculated amount of adsorption is calculated by the use of the amount of discharge QW obtained in this manner, in the next step S506 and step S507. As a result, the calculated amount of adsorption can be obtained in an accurate manner, so the amount of generated heat obtained from the calculated amount of adsorption can also be obtained in a more accurate manner.

Eighth Embodiment

In this embodiment, the time to supply the reducing agent is corrected in consideration of the change of the maximum amount of adsorption of the water in the adsorbent 5. This change of the maximum amount of adsorption can take place owing to the deterioration of the adsorbent 5. The other devices, parts, control, and so on are the same as those in the first embodiment, so an explanation thereof is omitted.

Here, the maximum amount of adsorption of the water in the adsorbent 5 decreases due to the deterioration of the adsorbent 5. As a result of this, the amount of heat generated in the adsorbent 5 changes, so the degree of temperature rise of the exhaust gas purification catalyst 6 changes, too. In other words, the upper limit temperature of the adsorbent 5 becomes lower as the deterioration of the adsorbent 5 advances, and hence, according to this, the supply of the reducing agent is started at a lower temperature. Thus, the time to supply the reducing agent is changed.

Figure 14:
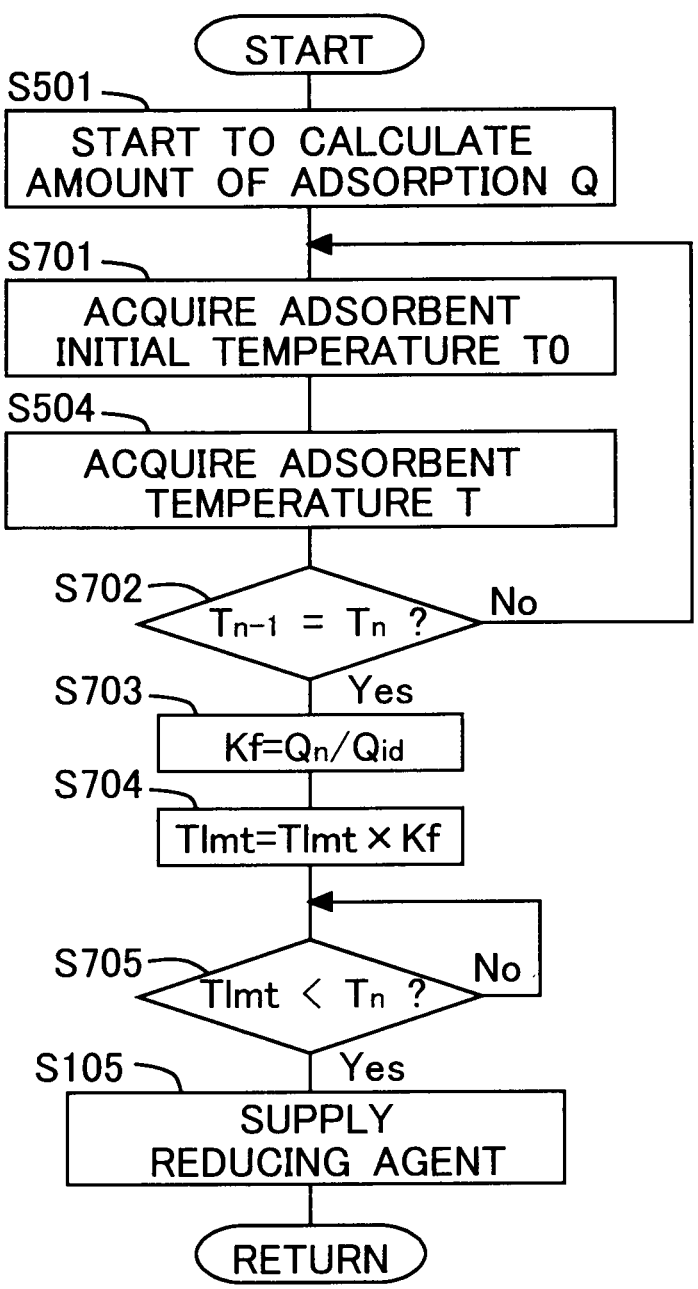
[FIG. 14] is a flow chart showing a flow for temperature raising control on an exhaust gas purification catalyst according to an eighth embodiment.

FIG. 14 is a flow chart which shows a flow or routine for temperature raising control on the exhaust gas purification catalyst 6 according to this embodiment. Here, note that for those steps in which the same processing as in the above-mentioned flow is carried out, the same symbols are attached and an explanation thereof is omitted.

In step S701, the initial temperature T0 of the adsorbent 5 is acquired. This adsorbent initial temperature T0 is the temperature before raising the temperature of the adsorbent 5, and for example, can be the temperature of the adsorbent 5 at the time of starting of the internal combustion engine 1. In addition, it may also be the ambient temperature, for example.

In step S702, it is determined whether the temperature $T_n$ of the adsorbent 5 acquired at the time of the current routine is equal to the temperature $T_{n-1}$ of the adsorbent 5 acquired at the time of the last routine. In other words, it is determined whether the temperature of the adsorbent 5 is in an unchanged state. In cases where an affirmative determination is made in step S702, the routine advances to step S703, whereas in cases where a negative determination is made, the routine returns to step S701.

In step S703, the deviation coefficient Kf is calculated by the following equation.

$$Kf=Q_n/Q_{id},$$

where $Q_{id}$ is the actual or measured amount of adsorption when the temperature T of the adsorbent 5 is the specified temperature Tlmt. In addition, $Q_n$ is the calculated amount of adsorption. These are obtained similarly to the above-mentioned flow.

In step S704, the reducing agent supply starting temperature Tlmt is corrected by the following equation. In other words, the reducing agent supply starting temperature Tlmt in the current routine is obtained by multiplying the reducing agent supply starting temperature Tlmt in the last routine by the deviation coefficient Kf.

$$Tlmt=Tlmt \times Kf$$

This reducing agent supply starting temperature Tlmt is a temperature at which the supply of the reducing agent is started. In other words, the upper limit temperature of the adsorbent 5 falls due to the deterioration of the adsorbent 5, and so, according to this, the reducing agent supply starting temperature Tlmt is decreased, too.

In step S705, it is determined whether the temperature $T_n$ of the adsorbent 5 is higher than the reducing agent supply starting temperature Tlmt. In other words, it is determined whether the temperature of the adsorbent 5 is the temperature to start the supply of the reducing agent or higher. In cases where an affirmative determination is made in step S705, the routine advances to step S105, whereas in cases where a negative determination is made, the step S705 is executed again.

In this manner, the time to supply the reducing agent can be corrected according to the deterioration degree of the adsorbent 5, so the reducing agent can be supplied at the time when reducing efficiency is higher.

Ninth Embodiment

In this embodiment, the load of the internal combustion engine 1 is corrected in consideration of the change of the maximum amount of adsorption generated due to the deterioration of the adsorbent 5. The expression "the load of the internal combustion engine 1 is corrected" here represents that the load of the internal combustion engine 1 is caused to change. The other devices, parts, control, and so on are the same as those in the first embodiment, so an explanation thereof is omitted.

Here, the maximum amount of adsorption of the water in the adsorbent 5 decreases due to the deterioration of the adsorbent 5. As a result of this, the amount of heat generated in the adsorbent 5 changes, so the degree of temperature rise of the exhaust gas purification catalyst 6 changes, too. Accordingly, the load of the internal combustion engine 1 is made higher in accordance with the deterioration of the adsorbent 5, thereby to elevate the temperature of the exhaust gas in such a manner that the rising degree of the temperature of the exhaust gas purification catalyst 6 becomes constant without regard to the deterioration of the adsorbent 5. In this case, the load of the internal combustion engine 1 may be made higher so that the temperature of the adsorbent 5 at the time of the maximum amount of adsorption becomes a predetermined value.

Figure 15:
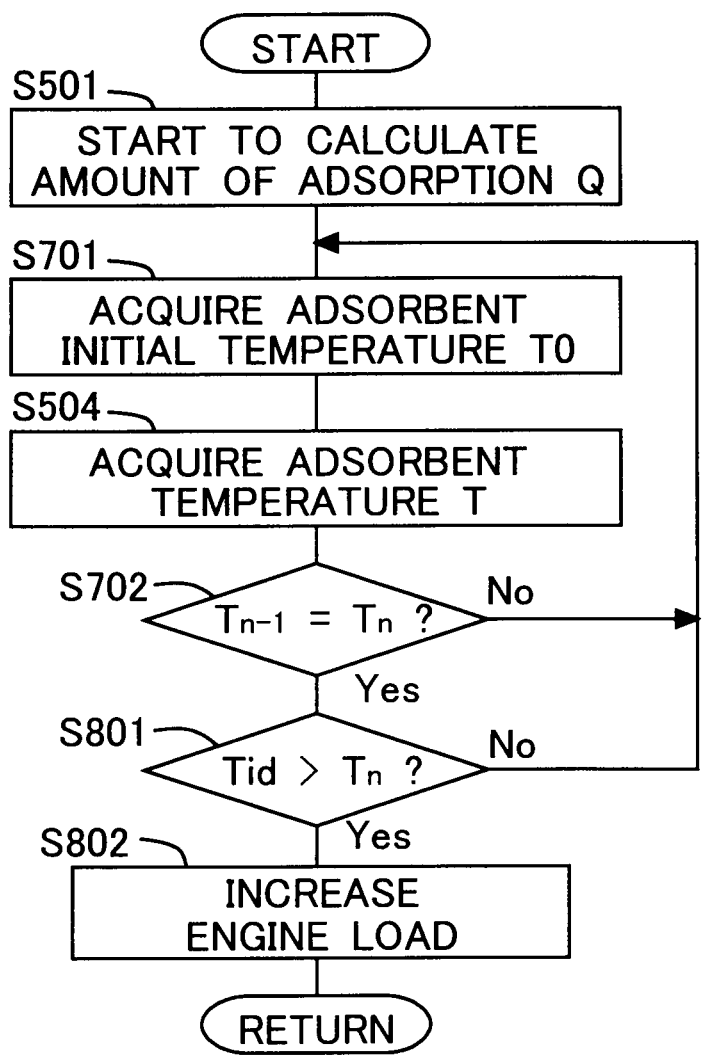
[FIG. 15] is a flow chart showing a flow for temperature raising control on an exhaust gas purification catalyst according to a ninth embodiment.

FIG. 15 is a flow chart which shows a flow or routine for temperature raising control on the exhaust gas purification catalyst 6 according to this embodiment. Here, note that for those steps in which the same processing as in the above-mentioned flow is carried out, the same symbols are attached and an explanation thereof is omitted.

In step S801, it is determined whether the temperature $T_n$ of the adsorbent 5 is lower than a theoretical value $T_{id}$. This theoretical value $T_{id}$ is the temperature of the adsorbent 5 which is obtained from the calculated amount of adsorption. Here, note that this theoretical value $T_{id}$ may beforehand be defined through experiments, etc., as a temperature which can raise the temperature of the exhaust gas purification catalyst 6 to the lower limit value of the activation temperature.

In other words, in this step, it is determined whether the temperature rise of the adsorbent 5 is insufficient. The theoretical value $T_{id}$ can be obtained from the amount of generated heat and the heat capacity of the adsorbent 5, wherein the amount of generated heat is calculated based on the calculated amount of adsorption which is obtained similarly to the above-mentioned flow. In cases where an affirmative determination is made in step S801, the routine advances to step S802, whereas in cases where a negative determination is made, the routine returns to step S701.

In step S802, the load of the internal combustion engine 1 is increased. In other words, the temperature rise of the adsorbent 5 is insufficient, so the temperature of the exhaust gas purification catalyst 6 is raised by increasing the load of the internal combustion engine 1 thereby to raise the temperature of the exhaust gas. The load of the internal combustion engine 1 may be increased by a fixed value increase, or may be increased according to the difference between the temperature $T_n$ of the adsorbent 5 and the theoretical value $T_{id}$. This amount of increase can also be calculated through experiments, etc., in advance.

In this manner, the load of the internal combustion engine 1 can be corrected according to the deterioration degree of the adsorbent 5, and hence, even if the deterioration of the adsorbent 5 advances, it is possible to raise the temperature of the exhaust gas purification catalyst 6 in a quick manner.

Tenth Embodiment

In this embodiment, a determination of the deterioration of the adsorbent 5 is made based on the amount of generated heat of the adsorbent 5. The other devices, parts, control, and so on are the same as those in the first embodiment, so an explanation thereof is omitted.

Here, as the deterioration of the adsorbent 5 advances, the amount of water which can be adsorbed by the adsorbent 5 decreases, so the amount of generated heat of the adsorbent 5 at the time of water adsorption decreases. As a result, the upper limit temperature of the adsorbent 5 becomes lower. In other words, the deterioration degree of the adsorbent 5 can be calculated based on the amount of generated heat.

Figure 16:
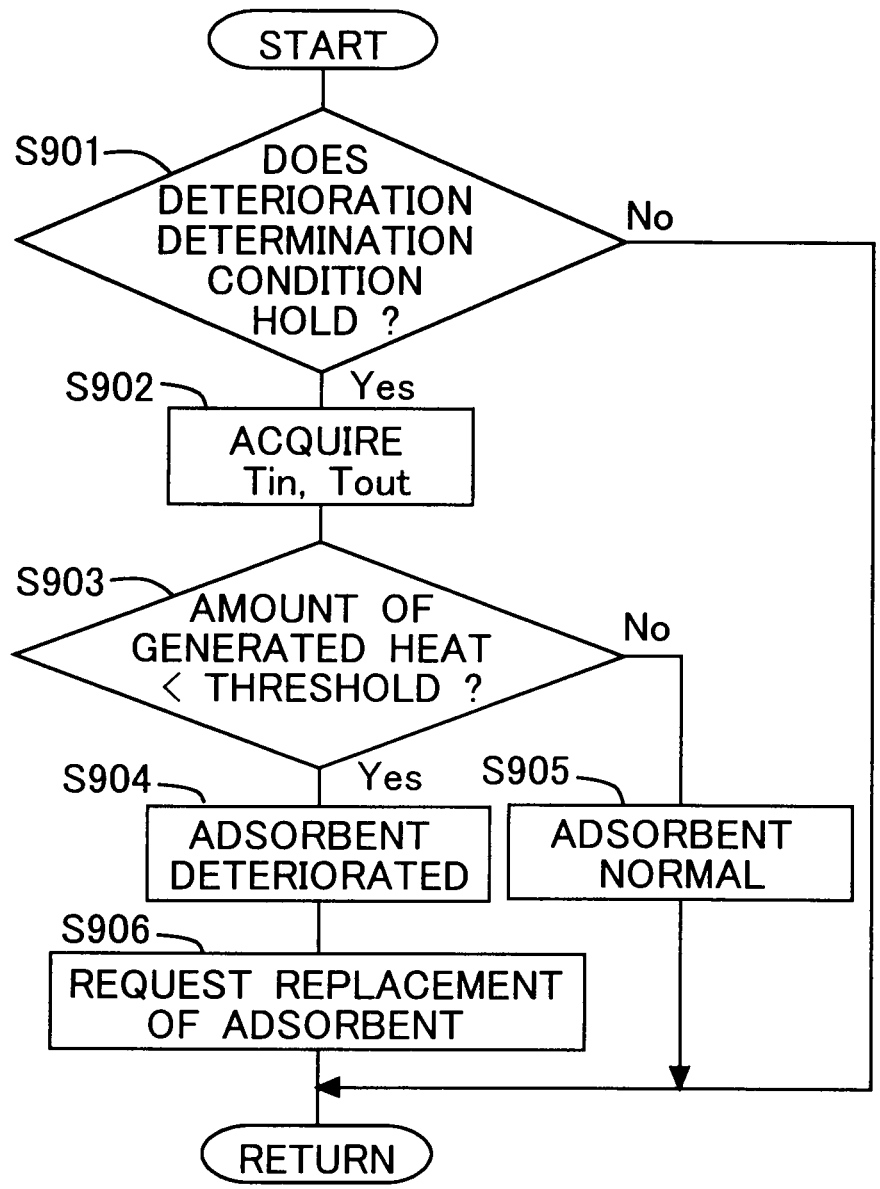
[FIG. 16] is a flow chart showing a flow for determination of the deterioration of an adsorbent 5 according to a tenth embodiment.

FIG. 16 is a flow chart which shows a flow or routine for determination of the deterioration of the adsorbent 5 according to a tenth embodiment. Here, note that for those steps in which the same processing as in the above-mentioned flow is carried out, the same symbols are attached and an explanation thereof is omitted.

In step S901, it is determined whether a deterioration determination condition is satisfied. The deterioration determination condition is a condition which is required in order to make a deterioration determination in an accurate manner.

For example, it is determined whether the desorption of water from the adsorbent 5 has been completed. In other words, in a state where water is originally adsorbed in the adsorbent 5, the amount of adsorption of water thereafter decreases, so the amount of generated heat decreases. As a result of this, there is a fear that the adsorbent 5 may be deteriorated though in actuality not deteriorated. Accordingly, the deterioration determination of the adsorbent 5 is carried out only when the desorption of water has been completed.

In addition, it is determined, for example, whether the operating state of the internal combustion engine 1 is stable in an idle state. In other words, the temperature of the adsorbent 5 changes according to the load of the internal combustion engine 1, so at the time of the determination of the deterioration of the adsorbent 5, the operating state of the internal combustion engine 1 is always made the same.

Further, it is determined, for example, whether the vehicle has traveled a prescribed distance. In other words, it is not necessary to perform a deterioration determination frequently, so a deterioration determination is carried out after the vehicle has traveled a distance which can cause deterioration.

In this manner, it is determined whether a precondition for performing the determination of the deterioration of the adsorbent 5 is satisfied. In cases where an affirmative determination is made in step S901, the routine advances to step S902, whereas in cases where a negative determination is made, this routine is once ended without making a deterioration determination.

In step S902, the temperature Tin of the exhaust gas flowing into the adsorbent 5, and the temperature Tout of the exhaust gas flowing out of the adsorbent 5 are acquired. These are obtained by the inlet gas temperature sensor 11 and the outlet gas temperature sensor 12, respectively. Here, note that in this embodiment, the inlet gas temperature sensor 11 and the outlet gas temperature sensor 12 correspond to a temperature measurement unit in the present invention.

In step S903, it is determined whether the amount of generated heat calculated based on the temperatures obtained in step S902 is smaller than a threshold. The threshold here is a lower limit value of the amount of generated heat by which a determination can be made that the adsorbent 5 has not deteriorated. In other words, in this step, it is determined whether the adsorbent 5 has deteriorated.

The amount of generated heat in the adsorbent 5 is calculated based on the difference between the temperature Tout of the exhaust gas flowing out of the adsorbent 5 and the temperature Tin of the exhaust gas flowing into the adsorbent 5, which are obtained in step S902, and the heat capacity of the adsorbent 5. Here, note that in this embodiment, the ECU 10, which performs the processing of step S903, corresponds to a deterioration determination unit in the present invention.

In cases where an affirmative determination is made in step S903, the routine advances to step S904, whereas in cases where a negative determination is made, the routine advances to step S905.

In step S904, it is stored that the adsorbent 5 has deteriorated.

In step S905, it is stored that the adsorbent 5 has not deteriorated but is normal.

In step S906, in order to prompt the driver, etc., to replace the adsorbent 5, for example, a warning lamp is caused to turn on.

Thus, the determination of the deterioration of the adsorbent 5 becomes possible. Here, note that the degree of deterioration of the adsorbent 5 may be calculated based on the amount of generated heat of the adsorbent 5. In this case, the relation between the amount of generated heat and the degree of deterioration has beforehand been obtained through experiments, etc.

Moreover, in this embodiment, the determination of the deterioration of the adsorbent 5 is made based on the upper limit temperature of the adsorbent 5. In other words, as the deterioration of the adsorbent 5 advances, the amount of water which can be adsorbed by the adsorbent 5 decreases, so the upper limit temperature of the adsorbent 5 becomes lower. Therefore, when this upper limit temperature becomes lower than a threshold, a determination can be made that the adsorbent 5 has deteriorated. In addition, the degree of deterioration of the adsorbent 5 can also be determined based on the difference between the upper limit temperature of the adsorbent 5 and a theoretical value. This deterioration determination can be carried out along with catalyst temperature raising control in the above-mentioned embodiments. In other words, in the catalyst temperature raising control, the supply of the reducing agent is started in the vicinity of the upper limit temperature of the adsorbent 5, so the upper limit temperature can be calculated. At this time, the determination of the deterioration of the adsorbent 5 can be performed. In addition, only for the purpose of making a deterioration determination, water may be caused to be adsorbed to the adsorbent 5 so that the upper limit temperature can be calculated.

Further, the determination of the deterioration of the adsorbent 5 can also be carried out based on the time to start the supply of the reducing agent. In other words, the supply of the reducing agent is started in the vicinity of the upper limit temperature of the adsorbent 5, and hence, when the upper limit temperature changes in accordance with the deterioration of the adsorbent 5, the time to start the supply of the reducing agent also changes. That is, the time to start the supply of the reducing agent and the degree of the deterioration of the adsorbent 5 have correlation with each other. Accordingly, it is possible to determine the degree of the deterioration of the adsorbent 5 based on the time to start the supply of the reducing agent. Here, note that in this embodiment, the ECU 10, which makes a deterioration determination in this manner, corresponds to a deterioration determination unit in the present invention.

In addition, the determination of the deterioration of the adsorbent 5 can also be carried out based on an amount of correction in the sixth, eighth, and ninth embodiments. That is, as the deterioration of the adsorbent 5 advances, the amount of correction becomes larger, so in cases where the amount of correction exceeds a threshold, a determination can be made that the adsorbent 5 has deteriorated.

Here, the maximum amount of adsorption of the water in the adsorbent 5 changes due to deterioration of the adsorbent 5, etc. Therefore, it is necessary to also change the calculated amount of adsorption according to this. The amount of correction for changing the calculated amount of adsorption changes in accordance with the degree of the deterioration of the adsorbent 5.

Moreover, as the deterioration of the adsorbent 5 advances, the upper limit temperature becomes lower, so in cases where the time to start the supply of the reducing agent is corrected according to this, the amount of correction of the reducing agent supply start time changes in accordance with the degree of the deterioration of the adsorbent 5.

Further, in cases where the load of the internal combustion engine 1 is made higher to raise the temperature of the exhaust gas in accordance with the increased deterioration of the adsorbent 5, the rising degree of the temperature of the exhaust gas changes in accordance with the degree of the deterioration of the adsorbent 5.

In this manner, the amount of correction and the degree of the deterioration of the adsorbent 5 have a correlation with each other, so the degree of the deterioration of the adsorbent 5 can be determined based on the amount of correction. Here, note that in this embodiment, the ECU 10, which makes a deterioration determination in this manner, corresponds to a deterioration determination unit in the present invention.

As described above, according to this embodiment, the determination of the deterioration of the adsorbent 5 becomes possible. Then, in cases where it is determined that the adsorbent 5 has deteriorated, it is possible to prompt the replacement of the adsorbent 5. In addition, by increasing the load of the internal combustion engine 1, it is also possible to compensate for the temperature rise of the exhaust gas purification catalyst 6.

Eleventh Embodiment

In this embodiment, the characteristics of the adsorbent 5 and the exhaust gas purification catalyst 6 are set in such a manner that the upper limit temperature atl which the adsorbent 5 can adsorb water, and the upper limit value of the purification window of the exhaust gas purification catalyst 6 become equal to each other. The other devices, parts, control, and so on are the same as those in the first embodiment, so an explanation thereof is omitted.

In this embodiment, when the temperature of the adsorbent 5 reaches the upper limit temperature at which the adsorbent 5 can adsorb water, the temperature of the exhaust gas purification catalyst 6 reaches the upper limit value of the purification window. When the temperature of the exhaust gas purification catalyst 6 becomes higher than the upper limit value, it becomes impossible to purify the exhaust gas in the exhaust gas purification catalyst 6. On the other hand, when the temperature of the adsorbent 5 becomes higher than the upper limit temperature, water desorbs from the adsorbent 5. At this time, heat is taken from the exhaust gas. As a result of this, the temperature of the exhaust gas purification catalyst 6 can be dropped, so the temperature of the exhaust gas purification catalyst 6 can be returned to within the range of the purification window.

Figure 17:
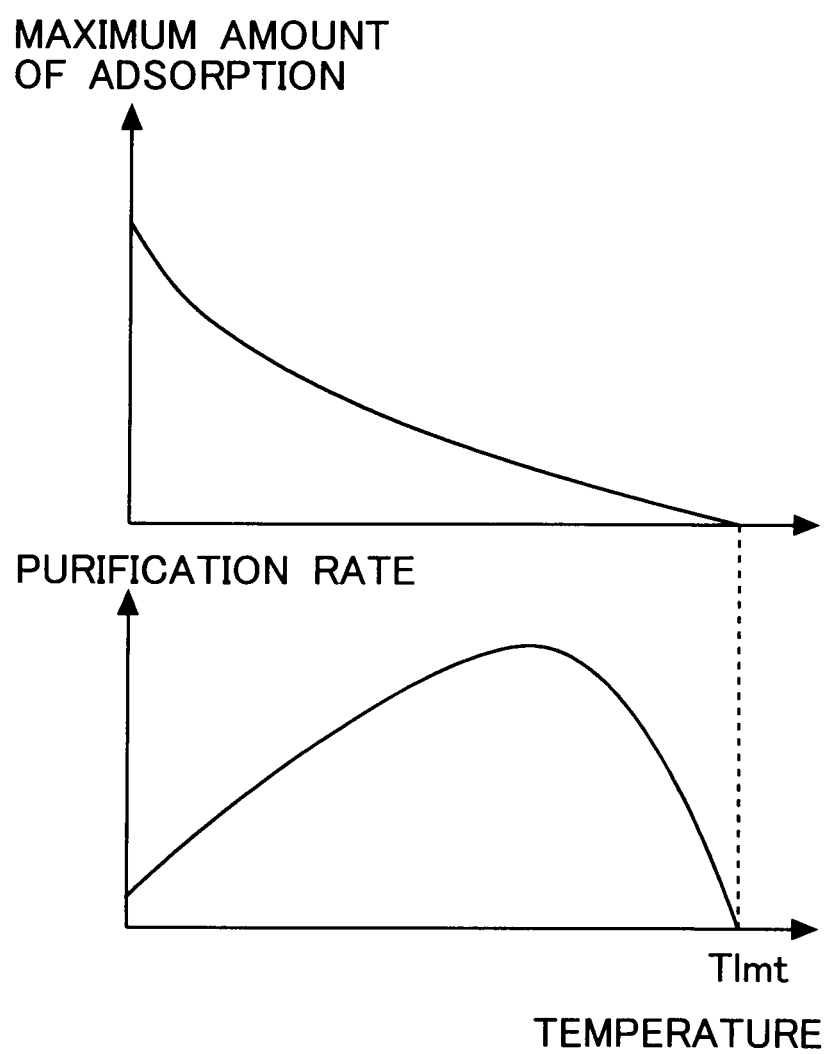
[FIG. 17] is a view showing the relation among the temperature, the maximum amount of adsorption of water in an absorber, and the rate of purification of an exhaust gas in an exhaust gas purification catalyst.

FIG. 17 is a view which shows the relation among the temperature, the maximum amount of adsorption of water in the absorber 5, and the rate of purification of the exhaust gas in the exhaust gas purification catalyst 6. When the temperature of the adsorbent 5 is Tlmt, the temperature of the adsorbent 5 becomes the upper limit temperature at which the adsorbent 5 can adsorb water, and the temperature of the exhaust gas purification catalyst 6 becomes the upper limit value of the purification window. In other words, when the temperature of the adsorbent 5 becomes Tlmt, the amount of adsorption of water in the adsorbent 5 becomes zero, and the purification rate of the exhaust gas purification catalyst 6 becomes zero.

By doing in this manner, the temperature of the exhaust gas purification catalyst 6 can be maintained equal to or less than the upper limit value of the purification window, so the exhaust gas can be purified in a more suitable manner. Here, note that the respective characteristics of the adsorbent 5 and the exhaust gas purification catalyst 6 can be set in such a manner that the upper limit temperature of the adsorbent 5 and a temperature at which the exhaust gas purification catalyst 6 may overheat become equal to each other. By doing in this manner, when the exhaust gas purification catalyst 6 is almost going to overheat, water desorbs from the adsorbent 5, thus making it possible to suppress the overheating of the exhaust gas purification catalyst 6.

Twelfth Embodiment

Figure 18:
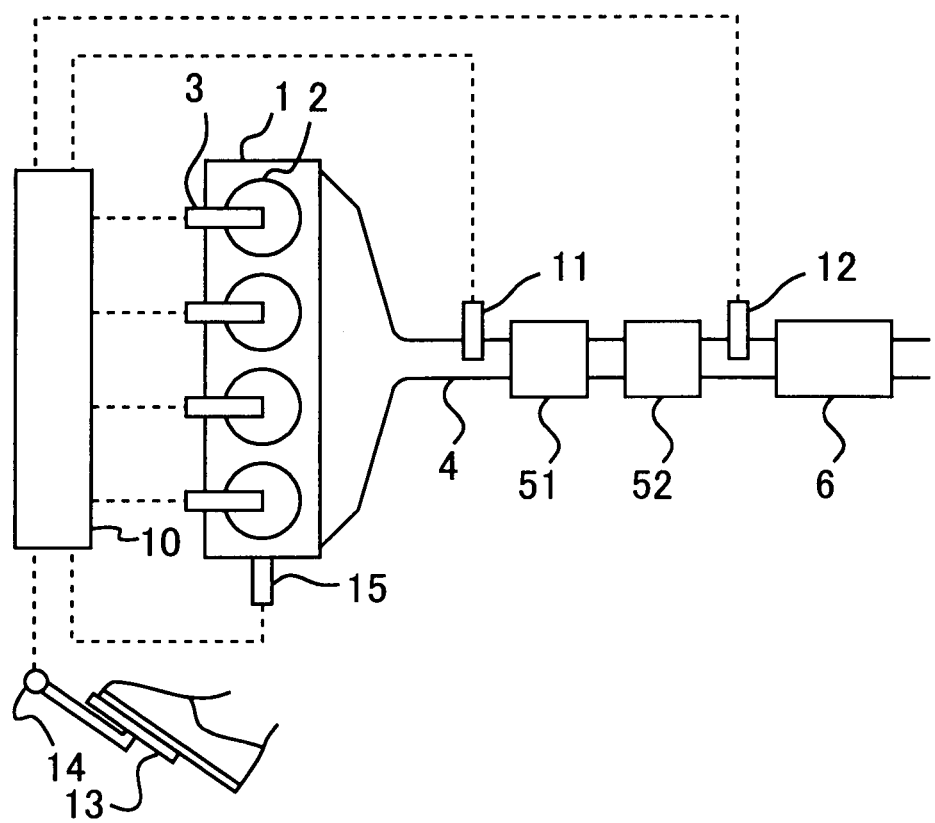
[FIG. 18] is a view showing the schematic construction of an internal combustion engine and its exhaust system to which an exhaust gas purification apparatus of an internal combustion engine according to a twelfth embodiment of the present invention is applied.

FIG. 18 is a view that shows the schematic construction of an internal combustion engine and its exhaust system to which an exhaust gas purification apparatus of an internal combustion engine according to this embodiment of the present invention is applied.

A first adsorbent 51 is provided at an upstream side and a second adsorbent 52 is provided at a downstream side. The first adsorbent 51 has an upper limit temperature set to become equal to the upper limit value of the purification window of the exhaust gas purification catalyst 6. Also, the second adsorbent 52 has an upper limit temperature set to become equal to the lower limit value of the activation temperature of the exhaust gas purification catalyst 6.

Figure 19:
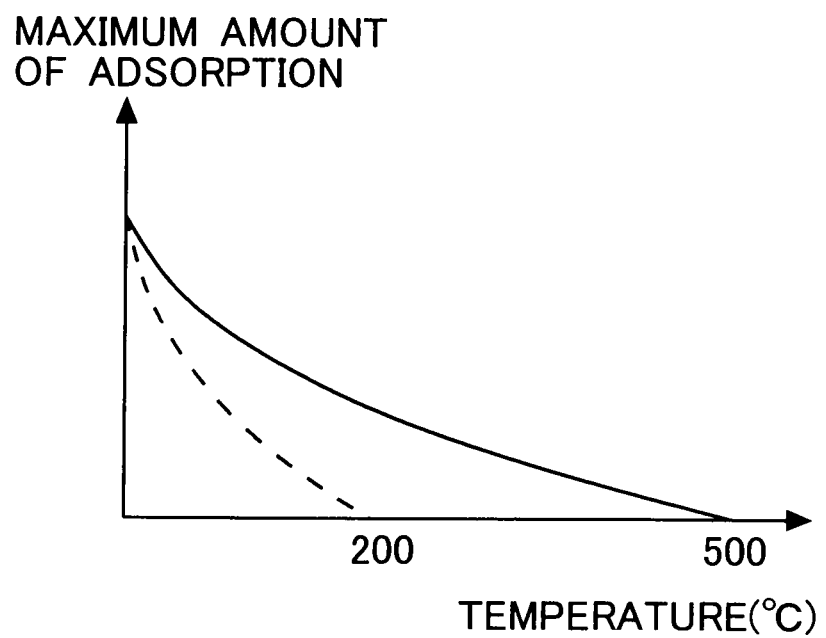
[FIG. 19] is a view showing the relation between the temperature and the maximum amount of adsorption of each of a first adsorbent and a second adsorbent.

FIG. 19 is a view which shows the relation between the temperature and the maximum amount of adsorption of each of the first adsorbent 51 and the second adsorbent 52. A solid line indicates the first adsorbent 51 and a broken line indicates the second adsorbent 52. When the temperature of the first adsorbent 51 is 500 degrees centigrade, for example, the maximum amount of adsorption of the first adsorbent 51 becomes zero. Also, when the temperature of the second adsorbent 52 is 200 degrees centigrade, for example, the maximum amount of adsorption of the second adsorbent 52 becomes zero. In other words, one of the adsorbents having a higher upper limit temperature at which water can be adsorbed is arranged at a more upstream side than the other.

According to this embodiment, in cases where the temperature of the exhaust gas purification catalyst 6 is lower than the lower limit value of the activation temperature, water is adsorbed to the first adsorbent 51 and the second adsorbent 52, so the temperature of the exhaust gas purification catalyst 6 can be raised in a quicker manner.

Then, after the temperature of the second adsorbent 52 exceeds its upper limit temperature and before the temperature of the first adsorbent 51 exceeds its upper limit temperature, the absorption of heat by the second adsorbent 51 and the generation of heat by the first adsorbent 51 offset each other, so the temperature of the exhaust gas purification catalyst 6 can be raised by supplying the reducing agent.

Further, in cases where the first adsorbent 51 also exceeds its upper limit temperature, the temperature of the exhaust gas can be caused to lower due to the absorption of heat in the first adsorbent 51 and the second adsorbent 52, so the temperature of the exhaust gas purification catalyst 6 can be maintained equal to or less than the upper limit value of the purification window.

Here, note that if the second adsorbent 52 should be arranged at the upstream side of the first adsorbent 51, the exhaust gas of which the temperature has been raised by means of the second adsorbent 52 will act to first raise the temperature of the first adsorbent 51, and thereafter raise the temperature of the exhaust gas purification catalyst 6. In this case, it takes time to raise the temperature of the exhaust gas purification catalyst 6 up to the lower limit value of the activation temperature, and hence this is not preferable.

Here, the upper limit value of the purification window of the exhaust gas purification catalyst 6 may also be set to an upper limit value of the temperature at which the occlusion and reduction of NOx can be made in an occlusion reduction type NOx catalyst.

As described above, according to this embodiment, to raise the temperature of the exhaust gas purification catalyst 6 up to the activation temperature in a quick manner, and to make the temperature of the exhaust gas purification catalyst 6 equal to or less than the upper limit value of the purification window can be made compatible with each other.

Thirteenth Embodiment

In this embodiment, the diameter of each of fine pores in the adsorbent 5 is set in such a manner that water can permeate each pore but the reducing agent cannot. The other devices, parts, control, and so on are the same as those in the first embodiment, so an explanation thereof is omitted.

Here, in cases where the reducing agent is supplied from the upstream side of the adsorbent 5, if the diameter of each of the fine pores in the adsorbent 5 is larger than the reducing agent, the reducing agent will enter or penetrate the fine pores so that the reducing agent is adsorbed to the adsorbent 5. Therefore, there is a possibility that the reducing agent may not reach the exhaust gas purification catalyst 6. In addition, if the adsorbent 5 is adsorbed to the reducing agent, the amount of adsorption of water will be decreased by the amount adsorbed. Then, if the amount of heat generated upon adsorption of the reducing agent is smaller than the amount of heat generated upon adsorption of water, there will be a possibility that it may become impossible to raise the temperature of the exhaust gas purification catalyst 6 to the lower limit value of the activation temperature.

For example, in cases where HC containing methane is used as the reducing agent, the diameter of an HC molecule is about 0.4 to 0.5 nm. On the other hand, the diameter of a water molecule is about 0.3 nm. In other words, if the diameter of the fine pores in the adsorbent 5 is about 0.3 nm or less, water will be able to permeate the fine pores, but HC will become unable to enter or penetrate them. Therefore, in this embodiment, K/A type zeolite with the diameter of fine pores therein being about 0.3 nm is used as the adsorbent 5.

In addition, in cases where it is assumed that the temperature of the exhaust gas becomes high, zeolite with a higher heat-resistant temperature is used. For example, NaN type zeolite has a heat-resistant temperature of 600 degree centigrade or more. However, the diameter of fine pores in the NaN type zeolite is as large as 0.74 nm. Accordingly, for example, tetraethoxysilane is caused to adhere to the fine pores of the NaN type zeolite, so that the diameter of the fine pores is made small. As a result of this, high heat resistance can be obtained, and at the same time, entry or penetration of HC can be prevented.

As described above, according to this embodiment, by making the diameter of the fine pores in the adsorbent 5 smaller than the diameter of HC molecules, and equal to or larger than the diameter of water molecules, water can be caused to be adsorbed to the adsorbent 5 while preventing the adsorption of HC. As a result, it becomes possible to supply a more amount of HC to the exhaust gas purification catalyst 6, thus making it possible to raise the temperature of the exhaust gas purification catalyst 6 in a quick manner. In addition, in the adsorbent 5, more water can be caused to be adsorbed, so more heat can be generated.

Here, note that the reducing agent can be suppressed from being adsorbed to the adsorbent 5, by supplying the reducing agent into the exhaust gas downstream of the adsorbent 5 and upstream of the exhaust gas purification catalyst 6. In other words, because the reducing agent stops flowing into the adsorbent 5, a larger amount of reducing agent can be supplied to the exhaust gas purification catalyst 6. For example, a reducing agent supply nozzle may be provided which serves to supply the reducing agent into the exhaust gas at the downstream side of the adsorbent 5 and at the upstream side of the exhaust gas purification catalyst 6.

Fourteenth Embodiment

Figure 20:
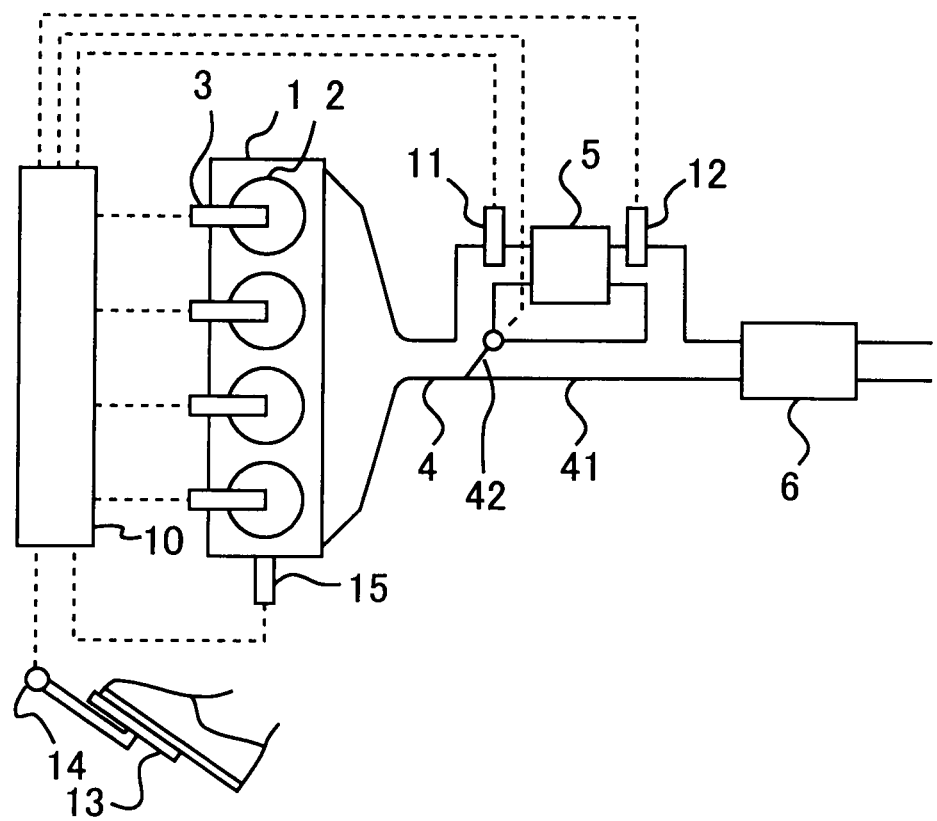
[FIG. 20] is a view showing the schematic construction of an internal combustion engine and its exhaust system to which an exhaust gas purification apparatus of an internal combustion engine according to a fourteenth embodiment of the present invention is applied.

FIG. 20 is a view that shows the schematic construction of an internal combustion engine and its exhaust system to which an exhaust gas purification apparatus of an internal combustion engine according to this embodiment of the present invention is applied.

In this embodiment, provision is made for a bypass passage 41 that connects between an exhaust passage 4 at the upstream side of an adsorbent 5 and an exhaust passage 4 which is arranged at the downstream side of the adsorbent 5 and at the upstream side of an exhaust gas purification catalyst 6. The other devices, parts, control, and so on are the same as those in the first embodiment, so an explanation thereof is omitted.

In addition, at a location of the exhaust passage 4 at the upstream side of the adsorbent 5 to which an upstream side portion of the bypass passage 41 is connected, there is arranged a changeover valve 42 for selecting either one of the adsorbent 5 and the bypass passage 41 thereby to change a flow passage. In other words, an exhaust gas is caused to flow into either one of the adsorbent 5 and the bypass passage 41 by switching the changeover valve 42.

By doing in this manner, only when it is necessary to pass the exhaust gas to the adsorbent 5, the exhaust gas can be passed to the adsorbent 5. For example, only in cases where the temperature of the exhaust gas purification catalyst 6 is wanted to be raised due to an exothermic reaction in the adsorbent 5, or only in cases where the temperature of the exhaust gas purification catalyst 6 is wanted to be dropped due to an endothermic reaction in the adsorbent 5, the exhaust gas can be caused to flow into the adsorbent 5.

Moreover, an inlet gas temperature sensor 11 for measuring the temperature of the exhaust gas flowing into the adsorbent 5 is arranged in a portion of the exhaust passage 4 which is at the upstream side of the adsorbent 5 and at the downstream side of the changeover valve 42. Also, an outlet gas temperature sensor 12 for measuring the temperature of the exhaust gas flowing out of the adsorbent 5 is arranged in a portion of the exhaust passage 4 which is at the downstream side of the adsorbent 5 and at the upstream side of a location to which a downstream side portion of the bypass passage 41 is connected.

In this embodiment, during the time when the temperature of the exhaust gas obtained by the outlet gas temperature sensor 12 is higher than the temperature of the exhaust gas obtained by the inlet gas temperature sensor 11, the exhaust gas is passed to the adsorbent 5, but not to the bypass passage 41. The term "during the time when the temperature of the exhaust gas obtained by the outlet gas temperature sensor 12 is higher than the temperature of the exhaust gas obtained by the inlet gas temperature sensor 11" means that water is adsorbed in the adsorbent 5.

In other words, during the time when the generation of heat occurs in the adsorbent 5, the temperature of the exhaust gas is raised by passing the exhaust gas to the adsorbent 5. By doing so, the temperature of the exhaust gas purification catalyst 6 can be raised.

In addition, when the water adsorbed in the adsorbent 5 begins to desorb therefrom, the temperature of the exhaust gas flowing out of the adsorbent 5 becomes lower than the temperature of the exhaust gas flowing into the adsorbent 5, so there is a possibility of decreasing the temperature of the exhaust gas purification catalyst 6. In such a case, the temperature drop of the exhaust gas purification catalyst 6 can be suppressed by passing the exhaust gas to the bypass passage 41. The supply of the reducing agent may be started at the same time as the exhaust gas is passed to the bypass passage 41. In this case, the reducing agent does not pass through the adsorbent 5, so the reducing agent is not adsorbed to the adsorbent 5.

Figure 21:
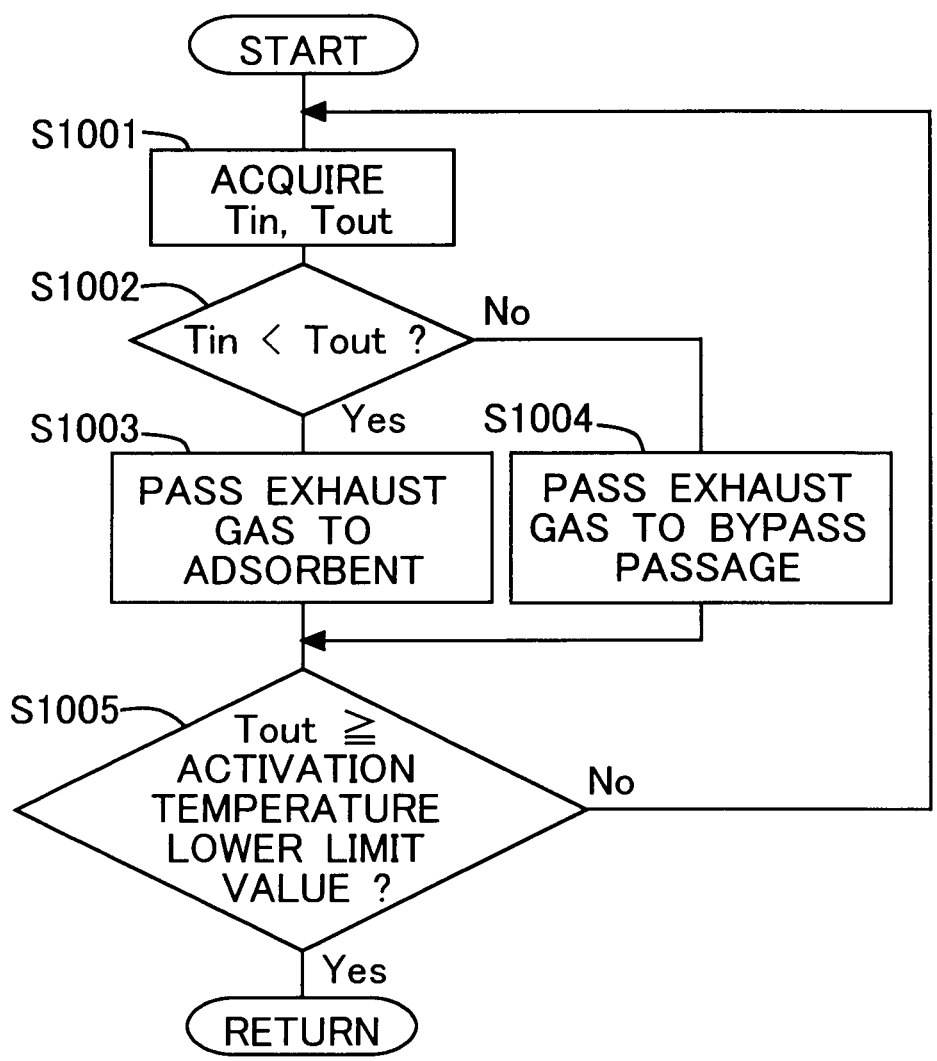
[FIG. 21] is a flow chart showing a flow for temperature raising control on an exhaust gas purification catalyst according to the fourteenth embodiment.

FIG. 21 is a flow chart that shows the flow or routine of temperature raising control on the exhaust gas purification catalyst 6 according to this first embodiment. This routine is executed at the time when a request has been made for raising the temperature of the exhaust gas purification catalyst 6.

In step S1001, the temperature Tin of the exhaust gas flowing into the adsorbent 5, and the temperature Tout of the exhaust gas flowing out of the adsorbent 5 are acquired. That is, the exhaust gas temperatures are obtained by the inlet gas temperature sensor 11 and the outlet gas temperature sensor 12, respectively.

In step S1002, it is determined whether the temperature Tout of the exhaust gas flowing out of the adsorbent 5 is higher than the temperature Tin of the exhaust gas flowing into the adsorbent 5. In other words, it is determined whether water can be adsorbed to the adsorbent 5. In cases where an affirmative determination is made in step S1002, the routine advances to step S1003, whereas in cases where a negative determination is made, the routine advances to step S1004.

In step S1003, the changeover valve 42 is controlled so as to pass the exhaust gas to the side of the adsorbent 5. In other words, because the temperature of the exhaust gas is raised by means of the adsorbent 5, the temperature of the exhaust gas is raised successively. By doing so, the temperature of the exhaust gas purification catalyst 6 can be raised in a quick manner.

In step S1004, the changeover valve 42 is controlled so as to pass the exhaust gas to the side of the bypass passage 41. In other words, because water desorbs from the adsorbent 5, the exhaust gas is passed to the side of the bypass passage 41 so as to suppress the fall of the temperature of the exhaust gas.

In step S1005, it is determined whether the temperature Tout of the exhaust gas flowing out of the adsorbent 5 is equal to or higher than the lower limit value of the activation temperature of the exhaust gas purification catalyst 6. In other words, it is determined whether the temperature rise of the exhaust gas purification catalyst 6 due to the generation of heat of the adsorbent 5 is unnecessary. In cases where an affirmative determination is made in step S1005, the routine is once ended, whereas in cases where a negative determination is made, the routine returns to step S1001. In addition, in cases where an affirmative determination is made in step S1005, the supply of the reducing agent may be started.

In this manner, the temperature rise of the exhaust gas purification catalyst 6 can be carried out in an efficient manner.

Here, note that in this embodiment, the difference (Tout−Tin) between the temperature Tout of the exhaust gas flowing out of the adsorbent 5 and the temperature Tin of the exhaust gas flowing into the adsorbent 5 is learned, and in cases where the value of this difference becomes equal to or less than a threshold, a determination may be made that the adsorbent 5 has deteriorated.

In addition in this embodiment, the upper limit temperature at which water can be adsorbed to the adsorbent 5 can be matched to the lower limit value of the activation temperature of the exhaust gas purification catalyst 6. If doing in this manner, as explained in the second embodiment, the temperature of the exhaust gas purification catalyst 6 can be raised to the activation temperature in a reliable manner, and thereafter water can be desorbed from the adsorbent 5, so it becomes possible to raise the temperature of the exhaust gas purification catalyst 6 next time, too.

Fifteenth Embodiment

In this embodiment, the temperature of the exhaust gas purification catalyst 6 is dropped by retaining the water adsorbed to the adsorbent 5 at the time of raising the temperature of the exhaust gas purification catalyst 6, and by desorbing the water from the adsorbent 5 when there is a fear that the exhaust gas purification catalyst 6 may overheat. The other devices, parts, and so on are the same as those in the fourteenth embodiment, so an explanation thereof is omitted.

Figure 22:
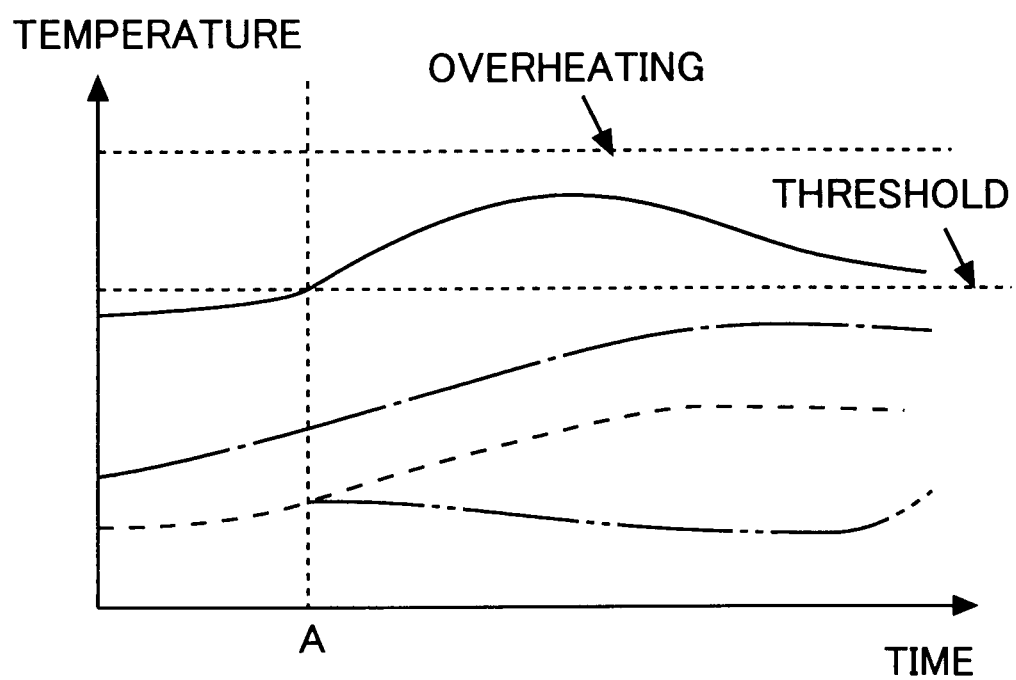
[FIG. 22] is a time chart showing the changes over time of the temperature of an exhaust gas from an internal combustion engine, the temperature of an exhaust gas flowing into an exhaust gas purification catalyst, and the temperature of the exhaust gas purification catalyst.

FIG. 22 is a time chart which shows the changes over time of the temperature of the exhaust gas from the internal combustion engine 1, the temperature of the exhaust gas flowing into the exhaust gas purification catalyst 6, and the temperature of the exhaust gas purification catalyst 6. A solid line indicates the temperature of the exhaust gas purification catalyst 6, and an alternate long and short dash line indicates the temperature of the exhaust gas from the internal combustion engine 1. A broken line indicates the temperature of the exhaust gas flowing into the exhaust gas purification catalyst 6 when the exhaust gas is passed to the bypass passage 41, and an alternate long and two short dashes line indicates the temperature of the exhaust gas flowing into the exhaust gas purification catalyst 6 when the exhaust gas is passed to the adsorbent 5.

Moreover, the temperature denoted by "overheating" indicates a temperature at which the exhaust gas purification catalyst 6 overheats. In addition, the temperature denoted by a "threshold" is a temperature at which there is a fear that the exhaust gas purification catalyst 6 may overheat, and in cases where the temperature of the exhaust gas purification catalyst 6 becomes higher than the threshold, the temperature of the exhaust gas purification catalyst 6 is decreased. The threshold is given a margin with respect to the temperature at which the exhaust gas purification catalyst 6 overheats.

In FIG. 22, at a time indicated by A, the temperature of the exhaust gas purification catalyst 6 becomes the threshold. At this time, the exhaust gas is caused to flow to the side of the adsorbent 5 by means of the changeover valve 42. As a result of this, water desorbs from the adsorbent 5, so the temperature of the exhaust gas flowing into the exhaust gas purification catalyst 6 becomes lower as compared with the case when the exhaust gas is caused to flow into the bypass passage 41. In accordance with this, the temperature of the exhaust gas purification catalyst 6 also falls. As a result, the exhaust gas purification catalyst 6 is suppressed from overheating. Here, note that the adsorbent 5 is set so that water desorbs therefrom at a temperature equal to or higher than the threshold.

Figure 23:
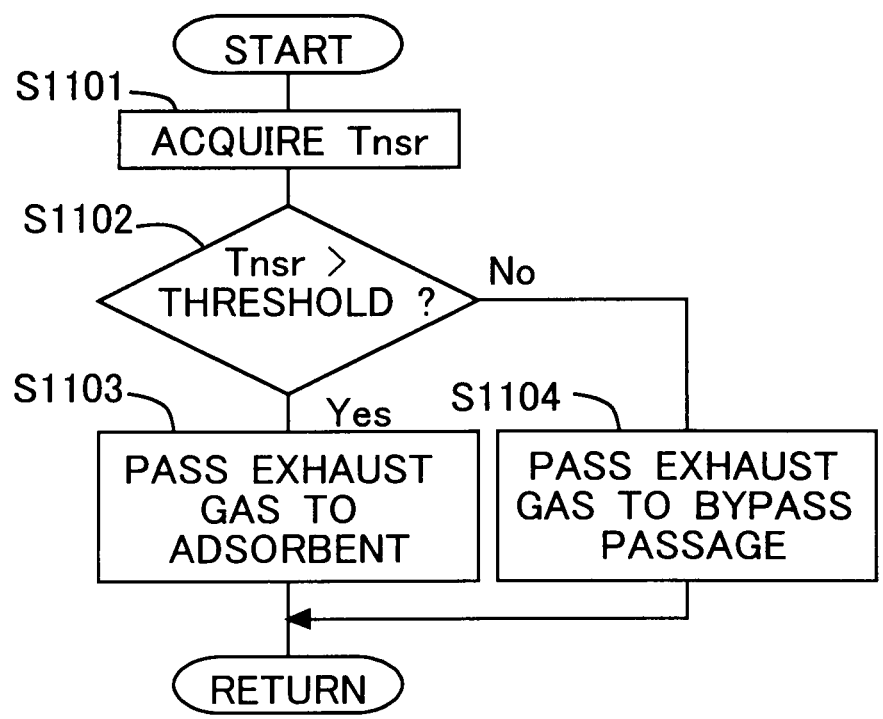
[FIG. 23] is a flow chart showing a flow for overheat suppression control on an exhaust gas purification catalyst according to a fifteenth embodiment.

FIG. 23 is a flow chart which shows a flow or routine for overheat suppression control on the exhaust gas purification catalyst 6 according to this embodiment. This routine is carried out in a repeated manner after a predetermined time after the temperature raising control of the exhaust gas purification catalyst 6 is completed. In other words, water has already been adsorbed in the adsorbent 5 at the time when this routine is carried out.

In step S1101, the temperature Tnsr of the exhaust gas purification catalyst 6 is acquired. This temperature may be estimated based on the temperature of the exhaust gas obtained by the outlet gas temperature sensor 12, or may be measured by a sensor which is directly attached to the exhaust gas purification catalyst 6. In addition, the temperature of the exhaust gas at the upstream side or downstream side of the exhaust gas purification catalyst 6 may be measured, and the temperature Tnsr of the exhaust gas purification catalyst 6 may be estimated based on the temperature thus measured.

In step S1102, it is determined whether the temperature Tnsr of the exhaust gas purification catalyst 6 is higher than a threshold. This threshold is the same as that which has been described in FIG. 22. In cases where an affirmative determination is made in step S1102, the routine advances to step S1103, whereas in cases where a negative determination is made, the routine advances to step S1104.

In step S1103, the changeover valve 42 is controlled so as to pass the exhaust gas to the side of the adsorbent 5. In other words, water is caused to desorb from the adsorbent 5, whereby the temperature of the exhaust gas purification catalyst 6 falls.

In step S1104, the changeover valve 42 is controlled so as to pass the exhaust gas to the side of the bypass passage 41. In other words, the temperature of the exhaust gas purification catalyst 6 is lower than the temperature at which there is a possibility of overheating, so the exhaust gas is caused to flow to the side of the bypass passage 41.

Thus, when there is a possibility that the exhaust gas purification catalyst 6 may overheat, the temperature of the exhaust gas purification catalyst 6 can be dropped by making use of the absorption of heat in the adsorbent 5. By doing so, the overheating of the exhaust gas purification catalyst 6 can be suppressed.

Here, note that in this embodiment, the "threshold" has been described as a temperature at which there is a possibility that the exhaust gas purification catalyst 6 may overheat, but instead of this, it may be a temperature at which there is a possibility that the temperature of the exhaust gas purification catalyst 6 may exceed the upper limit value of the purification window, or may be the upper limit value of the purification window. By doing in this manner, in cases where there is a possibility that the temperature of the exhaust gas purification catalyst 6 may exceed the upper limit value of the purification window, the exhaust gas will be passed to the side of the adsorbent 5, whereby the temperature of the exhaust gas purification catalyst 6 can be dropped.

Sixteenth Embodiment

Figure 24:
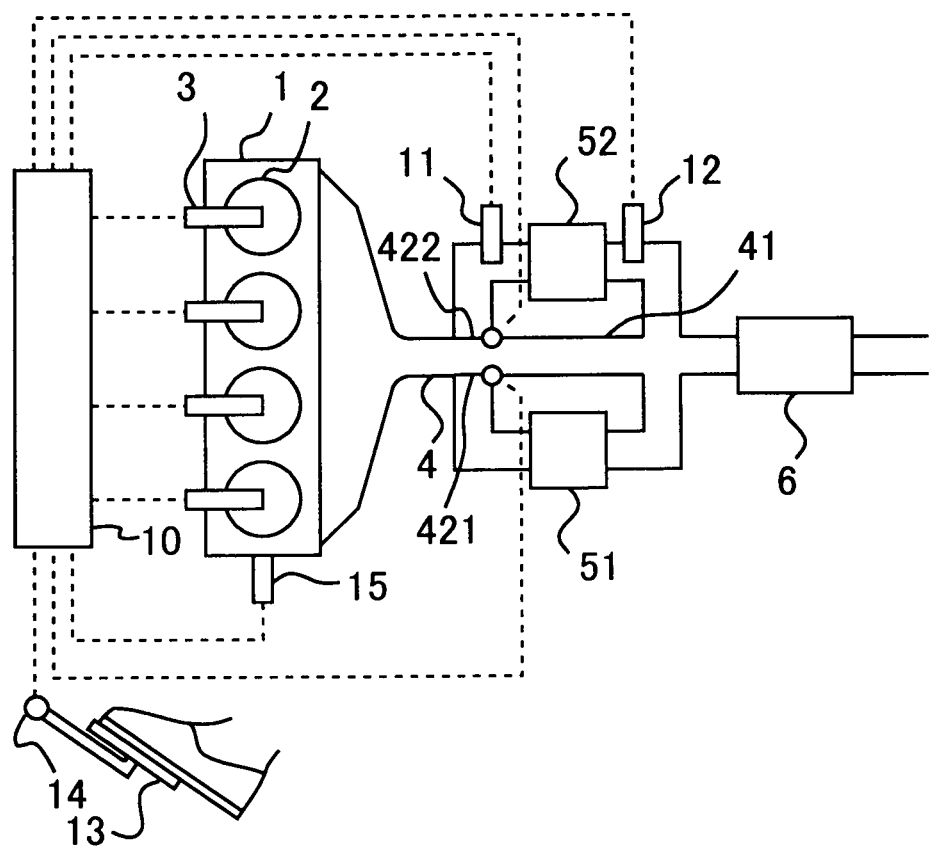
[FIG. 24] is a view showing the schematic construction of an internal combustion engine and its exhaust system to which an exhaust gas purification apparatus of an internal combustion engine according to a sixteenth embodiment of the present invention is applied.

FIG. 24 is a view that shows the schematic construction of an internal combustion engine and its exhaust system to which an exhaust gas purification apparatus of an internal combustion engine according to this embodiment of the present invention is applied.

In this embodiment, a first adsorbent 51 and a second adsorbent 52 are arranged in parallel with each other, and in addition, a bypass passage 41 is arranged which connects between a portion of an exhaust passage 4 which is at the upstream side of the first adsorbent 51 and the second adsorbent 52, and a portion of the exhaust passage 4 which is at the downstream side of the first adsorbent 51 and the second adsorbent 52 and at the upstream side of an exhaust gas purification catalyst 6.

In a portion of the exhaust passage 4 which is at the upstream side of the first adsorbent 51 and to which the bypass passage 41 is connected, there is arranged a first changeover valve 421 for selecting either one of the first adsorbent 51 and the bypass passage 41 so as to pass the exhaust gas thereto.

On the other hand, in a portion of the exhaust passage 4 which is at the upstream side of the second adsorbent 52 and to which the bypass passage 41 is connected, there is arranged a second changeover valve 422 for selecting either one of the second adsorbent 52 and the bypass passage 41 so as to pass the exhaust gas thereto.

The maximum amount of adsorption of the first adsorbent 51 becomes zero when the temperature of the first adsorbent 51 is 500 degrees centigrade, for example. Also, the maximum amount of adsorption of the second adsorbent 52 becomes zero when the temperature of the second adsorbent 52 is 200 degrees centigrade, for example. The relation of these temperatures and the maximum amounts of adsorption is the same as that of FIG. 19.

That is, an upper limit temperature at which the first adsorbent 51 can adsorb water is higher than that of the second adsorbent 52. In addition, in this embodiment, the upper limit temperature at which the second adsorbent 52 can adsorb water, and the lower limit value of the activation temperature of the exhaust gas purification catalyst 6, are set to be equal to each other. Moreover, the upper limit temperature at which the first adsorbent 51 can adsorb water, and a temperature at which there is a possibility that the exhaust gas purification catalyst 6 may overheat, are set to be equal to each other.

Then, in this embodiment, when the temperature of the exhaust gas purification catalyst 6 is lower than the lower limit value of the activation temperature, i.e., when there is a request for raising the temperature of the exhaust gas purification catalyst 6, the exhaust gas is passed to the second adsorbent 52. In addition, when the temperature of the exhaust gas purification catalyst 6 is a temperature at which there is a possibility that the exhaust gas purification catalyst 6 may overheat, i.e., when there is a request for dropping the temperature of the exhaust gas purification catalyst 6, the exhaust gas is passed to the first adsorbent 51. When the above cases do not apply, the exhaust gas is passed to the bypass passage 41. In other words, the first changeover valve 421 and the second changeover valve 422 are controlled according to the temperature of the exhaust gas purification catalyst 6.

Figure 25:
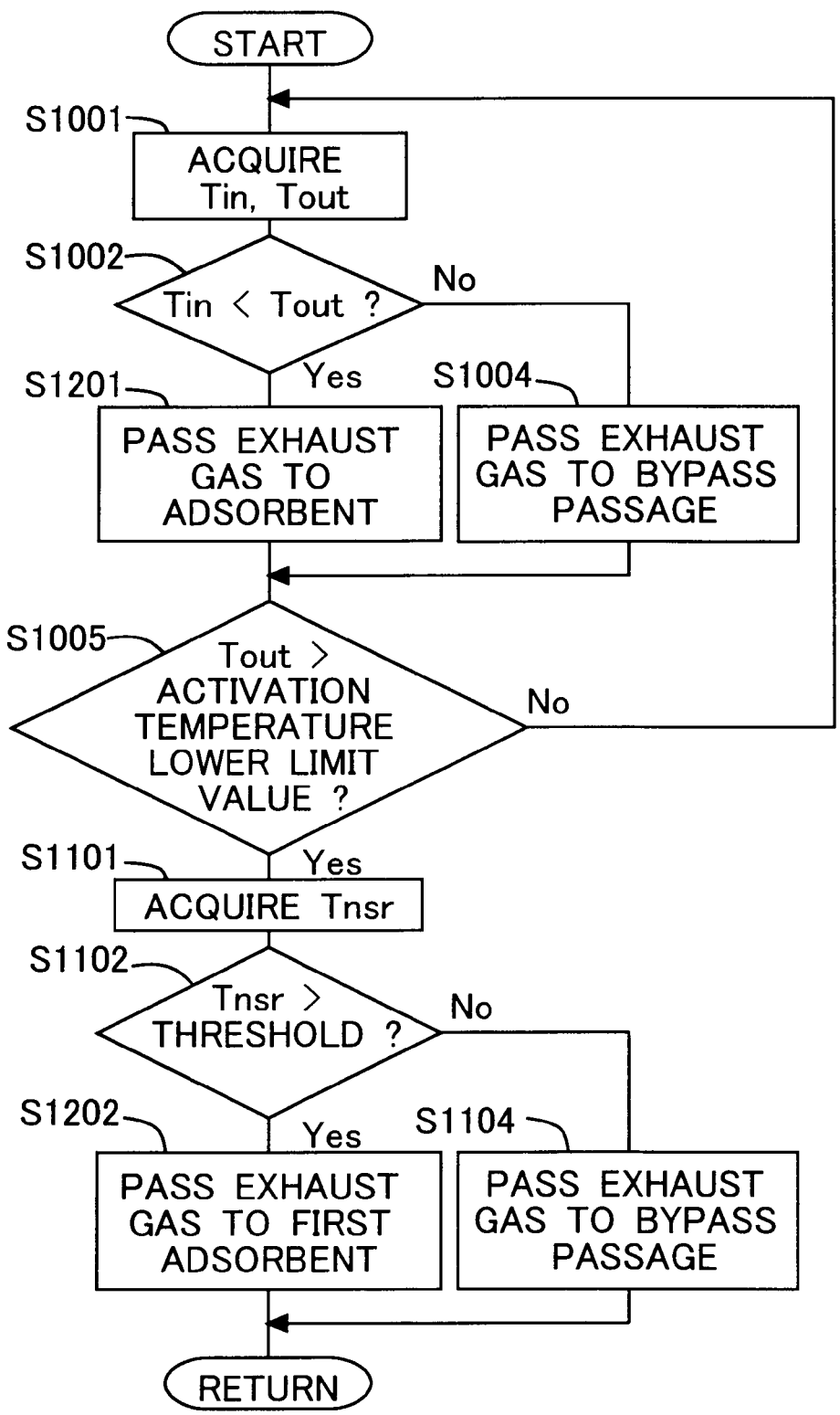
[FIG. 25] is a flow chart showing a flow for temperature control on an exhaust gas purification catalyst according to the sixteenth embodiment.

FIG. 25 is a flow chart which shows a flow or routine for temperature raising control on an exhaust gas purification catalyst 6 according to this embodiment. This routine is carried out in a repeated manner at each predetermined time interval. Here, note that for those steps in which the same processing as in the above-mentioned flow is carried out, the same symbols are attached and an explanation thereof is omitted.

In cases where an affirmative determination is made in step S1002, i.e., when heat is generated in the second adsorbent 52, the routine advances to step S1201. At this time, the generation of heat also occurs in the first adsorbent 51. On the other hand, in cases where a negative determination is made in step S1002, the routine advances to step S1004.

In step S1201, the exhaust gas is caused to flow into the first adsorbent 51 and the second adsorbent 52. By passing the exhaust gas to the first adsorbent 51 and the second adsorbent 52, water is adsorbed in the first and second adsorbents 51, 52, whereby the temperature of the exhaust gas can be raised. As a result of this, the temperature of the exhaust gas purification catalyst 6 rises. In addition, in order to desorb water from the first adsorbent 51 and to drop the temperature of the exhaust gas purification catalyst 6 when the temperature of the exhaust gas purification catalyst 6 becomes high, water has to be adsorbed in the first adsorbent 51. Therefore, water is caused to be adsorbed to the first adsorbent 51 beforehand.

In cases where an affirmative determination is made in step S1102 i.e., in cases where there is a possibility that the exhaust gas purification catalyst 6 may overheat, the routine advances to step S1202. On the other hand, in cases where a negative determination is made in step S1102, the routine advances to step S1104.

In step S1202, the exhaust gas is passed to the first adsorbent 51. At this time, the temperature of the exhaust gas flowing into the first adsorbent 51 is above the upper limit temperature at which the first adsorbent 51 can adsorb water. Therefore, when the exhaust gas is passed to the first adsorbent 51, water desorbs from the first adsorbent 51. By doing so, the temperature of the exhaust gas purification catalyst 6 can be dropped.

As described above, according to this embodiment, by the provision of the two adsorbents arranged in parallel with each other, it is possible to carry out the temperature rise and overheat suppression of the exhaust gas purification catalyst 6.

Here, note that the upper limit temperature at which the first adsorbent 51 can adsorb water may be equal to the temperature at which there is a possibility that the temperature of the exhaust gas purification catalyst 6 may exceed the upper limit temperature of the purification window, or equal to the upper limit temperature of the purification window. By doing in this manner, in cases where there is a possibility that the temperature of the exhaust gas purification catalyst 6 may exceed the upper limit temperature of the purification window, the exhaust gas will be passed to the side of the first adsorbent 51, whereby the temperature of the exhaust gas purification catalyst 6 can be dropped. As a result of this, the temperature of the exhaust gas purification catalyst 6 can be maintained within the range of the purification window.

Seventeenth Embodiment

In this embodiment, when the temperature of the exhaust gas is equal to or higher than a specified temperature after the temperature of the exhaust gas purification catalyst 6 has reached the lower limit value of the activation temperature, water is caused to desorb from the adsorbent 5. The specified temperature herein is a temperature at which water can be caused to desorb from the adsorbent 5. The other devices, parts, and so on are the same as those in the fourteenth embodiment, so an explanation thereof is omitted.

In other words, after the temperature of the exhaust gas purification catalyst 6 has reached the lower limit value of the activation temperature, water is caused to desorb from the adsorbent 5. In this manner, the adsorbent 5 can be put in a state where water is not adsorbed in the adsorbent 5, so water can be caused to be adsorbed to the adsorbent 5 at the time of the next starting of the internal combustion engine 1.

Figure 26:
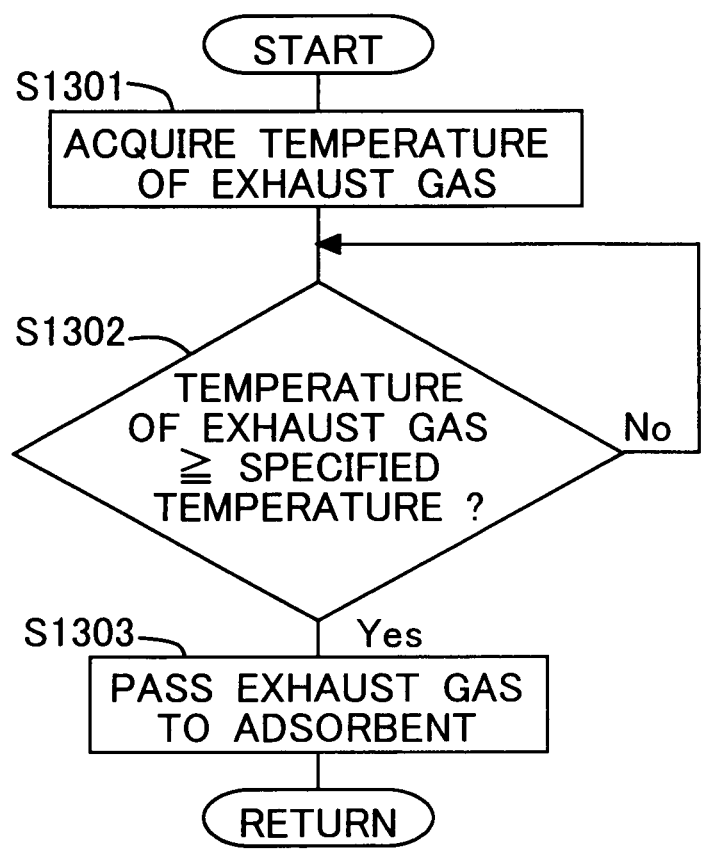
[FIG. 26] is a flow chart showing a flow for desorption control of water from an adsorbent in a seventeenth embodiment.

FIG. 26 is a flow chart which shows a flow or routine for desorption control of water from the adsorbent 5 in this embodiment. This routine is carried out in a repeated manner at each predetermined time interval after the exhaust gas purification catalyst 6 has reached its activation temperature.

In step S1301, the temperature of the exhaust gas is acquired. This temperature of the exhaust gas is obtained by the inlet gas temperature sensor 11.

In step S1302, it is determined whether the temperature of the exhaust gas acquired in step S1301 is equal to or higher than a specified temperature. This specified temperature is a temperature at which water can be caused to desorb from the adsorbent 5. Here, note that this specified temperature may be a lower limit value of the temperature at which the temperature of the exhaust gas purification catalyst 6 can maintain the purification window even if the temperature of the exhaust gas becomes lower due to the desorption of water from the adsorbent 5. This specified value has beforehand been obtained through experiments, etc. In cases where an affirmative determination is made in step S1302, the routine advances to step S1303, whereas in cases where a negative determination is made, the step S1302 is executed again.

In step S1303, the exhaust gas is passed to the adsorbent 5.

In this manner, water can be caused to desorb from the adsorbent 5, and hence, even if the internal combustion engine 1 is stopped after that, it is possible to cause water to be adsorbed to the adsorbent 5 at the time of the next cold starting of the internal combustion engine 1. In other words, it is always possible to maintain a state in which the temperature of the exhaust gas purification catalyst 6 can be raised. As a result of this, when it becomes necessary to raise the temperature of the exhaust gas purification catalyst 6, the temperature of the exhaust gas purification catalyst 6 can be raised in a quick manner.

Eighteenth Embodiment

Figure 27:
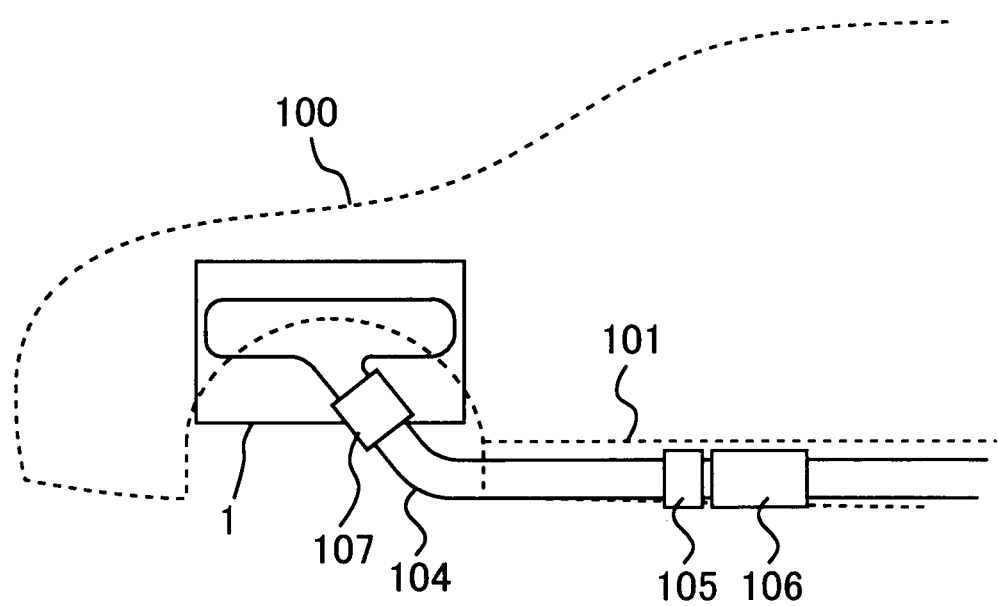
[FIG. 27] is a view showing the schematic construction of an internal combustion engine and its exhaust system to which an exhaust gas purification apparatus of an internal combustion engine according to an eighteenth embodiment of the present invention is applied.

FIG. 27 is a view that shows the schematic construction of an internal combustion engine and its exhaust system to which an exhaust gas purification apparatus of an internal combustion engine according to this embodiment of the present invention is applied. An internal combustion engine 1 shown in FIG. 27 is a four-cycle diesel engine of a water cooled type having four cylinders. This internal combustion engine 1 is installed on the front side of a vehicle 100.

In addition, an exhaust passage 104 is connected to the internal combustion engine 1. This exhaust passage 104 passes an underside (hereinafter also referred to an underfloor) of a floor 101 of the vehicle 100 to extend to the rear side of the vehicle 100. In the middle of the exhaust passage 104, there are arranged a pre-stage catalyst 107, an underfloor adsorbent 105, and an underfloor catalyst 106 in order from an upstream side (i.e., from the side of the internal combustion engine 1).

The pre-stage catalyst 107 is arranged in the exhaust passage 104 at a location from the internal combustion engine 1 to just before the underside of the floor 101 of the vehicle 100. This pre-stage catalyst 107 may be arranged, for example, in an exhaust manifold. This pre-stage catalyst 107 has a property in which its purification performance for exhaust gas changes according to temperature. A catalyst having an oxidation function, such as for example a three-way catalyst, an oxidation catalyst, an occlusion reduction type NOx catalyst, etc., can be used. In addition, these catalysts may be used in combination and arranged in series with one another. Moreover, a particulate filter may be provided at the downstream side of these catalysts, or these catalysts may be supported by a particulate filter.

For example, the occlusion reduction type NOx catalyst (hereinafter simply referred to as the NOx catalyst) has a function of occluding NOx in an incoming exhaust gas, when the temperature thereof is within the range of a purification window and when the oxygen concentration of the exhaust gas is high, and of reducing the occluded NOx when the oxygen concentration of the incoming exhaust gas is low and when a reducing agent exists. In addition, the NOx catalyst is raised in temperature up to a temperature within the range of the purification window by supplying components such as CO after the temperature of the NOx catalyst has risen to a lower limit of an activation temperature.

The underfloor adsorbent 105 is arranged at the underside of the floor 101 of the vehicle 100. The underfloor adsorbent 105 has a function to adsorb the water contained in an exhaust gas, and for example, NaN type zeolite or K/A type zeolite can be used as the underfloor adsorbent 105. Here, note that in this embodiment, the underfloor adsorbent 105 corresponds to an adsorption device in the present invention. In addition, although the underfloor adsorbent 105 in this embodiment adsorbs water, there can be used other substances which have a property to adsorb other components contained in the exhaust gas (including a component(s) supplied to the exhaust gas). Then, in this embodiment, water corresponds to a first component in the present invention.

Moreover, the underfloor catalyst 106 is also arranged below the floor 101 of the vehicle 100. This underfloor catalyst 106 need only have a property in which its purification performance for an exhaust gas changes in accordance with the temperature thereof, and at the same time have an oxidation function as well. For example, a three-way catalyst, an oxidation catalyst, and an occlusion reduction type NOx catalyst can be used. In addition, a particulate filter may be provided at the downstream side of these catalysts, or these catalysts may be supported by a particulate filter. Here, note that the underfloor adsorbent 105 is arranged at an immediately upstream side of the underfloor catalyst 106. The immediately upstream side means that other catalysts, devices, etc., do not intervene between the underfloor adsorbent 105 and the underfloor catalyst 106.

Then, in this embodiment, at the time of starting or the like of the internal combustion engine 1, catalyst temperature raising control is carried out, for example, for raising the temperature of the underfloor catalyst 106 in a quick manner. Here, water is contained in the exhaust gas, so the water is adsorbed to the underfloor adsorbent 105. At this time, an exothermic reaction occurs. Because the temperature of the exhaust gas is raised due to this exothermic reaction, the temperature of the underfloor catalyst 106 downstream of the adsorbent 105 can be caused to rise. For example, catalyst temperature raising control is executed by increasing the amount of fuel injection of the internal combustion engine 1 so that a larger amount of water can be discharged from the internal combustion engine 1.

When the temperature of the underfloor catalyst 106 rises up to the lower limit value of the activation temperature, an oxidation reaction becomes possible in the underfloor catalyst 106. For example, when CO or $H_2$ is supplied, it is oxidized in the underfloor catalyst 106, and at this time, heat is generated so that the temperature of the underfloor catalyst 106 is thereby raised. Then, if the supply of CO or $H_2$ is continued until the temperature of the underfloor catalyst 106 comes into the purification window, it becomes possible to carry out the purification of the exhaust gas in a quicker manner.

Here, note that the components such as CO, being made to react in the underfloor catalyst 106, can be caused to discharge from the internal combustion engine 1 by adjusting the load of the internal combustion engine 1. In addition, the component supplied to the underfloor catalyst 106 is hereinafter called a "reducing agent". This reducing agent may be directly supplied into the exhaust gas from the outside. Then, as the reducing agent, those substances which are difficult to be adsorbed to the underfloor adsorbent 105 are used. As a result of this, even if the reducing agent is supplied from a location upstream of the underfloor adsorbent 105, the reducing agent passes through the underfloor adsorbent 105 to arrive at the underfloor catalyst 106.

Incidentally, the underfloor adsorbent 105 generates heat by adsorbing water, but a maximum amount of adsorption of the underfloor adsorbent 105 decreases as the temperature thereof rises. As the temperature of the underfloor adsorbent 105 goes up, the maximum amount of adsorption decreases, and at the time when a certain temperature is reached, the maximum amount of adsorption becomes zero. That is, when the temperature of the underfloor adsorbent 105 reaches the certain temperature, the underfloor adsorbent 105 becomes unable to adsorb water, so the temperature of the underfloor adsorbent 105 does not rise due to the adsorption of water. Besides, because water thereafter begins to desorb from the underfloor adsorbent 105, the temperature of the underfloor adsorbent 105 falls. In other words, there is an upper limit for the temperature which is caused to rise due to the adsorption of water in the underfloor adsorbent 105. Such a temperature is hereinafter called "an upper limit temperature".

Immediately after starting of the internal combustion engine 1, the temperatures of the underfloor adsorbent 105 and the underfloor catalyst 106 become equal to the ambient temperature. Then, the temperature of the underfloor adsorbent 105 rises by the water contained in the exhaust gas being adsorbed by the underfloor adsorbent 105 as the exhaust gas passes through the underfloor adsorbent 105. As a result of this, the temperature of the exhaust gas downstream of the underfloor adsorbent 105 rises, so the temperature of the underfloor catalyst 106 rises, too.

Thereafter, when the underfloor adsorbent 105 reaches the upper limit temperature, water begins to desorb from the underfloor adsorbent 105, so the temperature of the underfloor adsorbent 105 falls due to the absorption of heat at this time. However, when the desorption of water from the underfloor adsorbent 105 is completed, and in addition the temperature of the exhaust gas flowing into the underfloor adsorbent 105 rises, the temperature of the underfloor adsorbent 105 will also begin to rise again.

Here, in this embodiment, the underfloor catalyst 106 is provided at the immediately upstream side of the underfloor adsorbent 105. The distance between the underfloor catalyst 106 and the underfloor adsorbent 105 is set to such a distance that the temperature of the underfloor catalyst 106 can be raised at a sufficient rate due to the heat generated in the underfloor adsorbent 105. They may be arranged in mutual contact with each other. By doing in this manner, heat can be supplied to the underfloor catalyst 106 from the underfloor adsorbent 105, so when the temperature of the underfloor catalyst 106 is lower than the lower limit value of the activation temperature at the time of cold starting of the internal combustion engine 1, etc., the temperature of the underfloor catalyst 106 can be raised to the lower limit value of the activation temperature in a quick manner. By doing so, the purification of the exhaust gas can be made from an early stage.

In addition, the temperature of the pre-stage catalyst 107, being intrinsically liable to rise, is quickly raised to the lower limit value of the activation temperature due to the heat of the exhaust gas. In other words, the purification of the exhaust gas is made possible at an early stage in both the pre-stage catalyst 107 and the underfloor catalyst 106.

Further, when water adsorbs to the underfloor adsorbent 105, the amount of water flowing into the underfloor catalyst 106 decreases. Here, in cases where a NOx catalyst is included in the underfloor catalyst 106, if water exists in the exhaust gas, the NOx occlusion capacity of the NOx catalyst will reduce. Against this, the occlusion capacity of the NOx catalyst can be enhanced by removing water by means of the underfloor adsorbent 105.

Moreover, in this embodiment, a monolithic catalyst can be adopted as the pre-stage catalyst 107. This monolithic catalyst is provided with a plurality of cells which are each surrounded by a wall surface parallel to the direction of flow of the exhaust gas, and the catalyst is supported by that wall surface. Inside each of the cells, there is nothing that interrupts the flow of the exhaust gas, so the exhaust gas can pass through the cells in a smooth manner. In addition, because each of the plurality of cells is arranged in parallel to the direction of flow of the exhaust gas, the amount of the thickness of the wall surface which forms each cell obstructs the flow of the exhaust gas, but the resistance to the exhaust gas as a whole is small. Such being the case, even if the exhaust gas passes through the pre-stage catalyst 107 which adopts the monolithic catalyst, the amount of water adhered to the pre-stage catalyst 107 is small. In other words, much more water passes through the pre-stage catalyst 107, so that the more water can be supplied to the underfloor adsorbent 105. As a result, more heat is generated in the underfloor adsorbent 105, so the temperature of the underfloor catalyst 106 can be raised in a quick manner.

Here, note that in this embodiment, even if the driver turns off a key switch, for example, so as to stop the internal combustion engine 1, the internal combustion engine 1 may not be stopped immediately. Then, for example, when the amount of water adsorbed in the underfloor adsorbent 105 becomes equal to or less than a specified value, the internal combustion engine 1 is stopped. By doing in this manner, it is possible to cause water to be adsorbed to the underfloor adsorbent 105 at the time of the next starting of the internal combustion engine 1. As a result, the temperature of the underfloor catalyst 106 can be caused to rise in a quick manner.

In this embodiment, the oxidation capacity of the pre-stage catalyst 107 may be made higher than the oxidation capacity of the underfloor catalyst 106. In cases where the NOx catalyst is adopted as the underfloor catalyst 106, $NO_2$ is more liable to be occluded by the NOx catalyst than NO is. Then, if the oxidation capacity of the pre-stage catalyst 107 is higher than that of the underfloor catalyst 106, NO contained in the exhaust gas is more oxidized to $NO_2$ in the pre-stage catalyst 107, so the concentration of $NO_2$ in the exhaust gas will be able to be increased. As a result, it becomes possible for more NOx to be occluded in the NOx catalyst. In other words, by enhancing the oxidation capacity of the pre-stage catalyst 107, the $NO_2$ concentration in the exhaust gas can be made higher, so the purification capacity of NOx in the NOx catalyst can be enhanced.

In this embodiment, both the pre-stage catalyst 107 and the underfloor catalyst 106 may also be the NOx catalyst. In this case, the capacities of the pre-stage catalyst 107, the underfloor adsorbent 105, and the underfloor catalyst 106 may be determined in such a manner that the underfloor catalyst 106 can reach the lower limit value of the activation temperature more quickly than the pre-stage catalyst 107 after starting of the internal combustion engine 1.

By doing in this manner, the underfloor catalyst 106 becomes able to occlude NOx more quickly than the pre-stage catalyst 107. By doing so, for example, when the reducing agent is supplied so as to reduce the NOx occluded in the pre-stage catalyst 107, NOx flowing out of the pre-stage catalyst 107 without being able to be reduced therein can be occluded by the underfloor catalyst 106. As a result of this, it is possible to suppress the NOx from being emitted into the atmospheric air.

Here, note that in this embodiment, a plurality of underfloor catalysts 106 may be provided and arranged in series or in parallel with one another. In addition, an adsorbent may be provided at an immediately upstream side of each of the underfloor catalysts 106.

Nineteenth Embodiment

Figure 28:
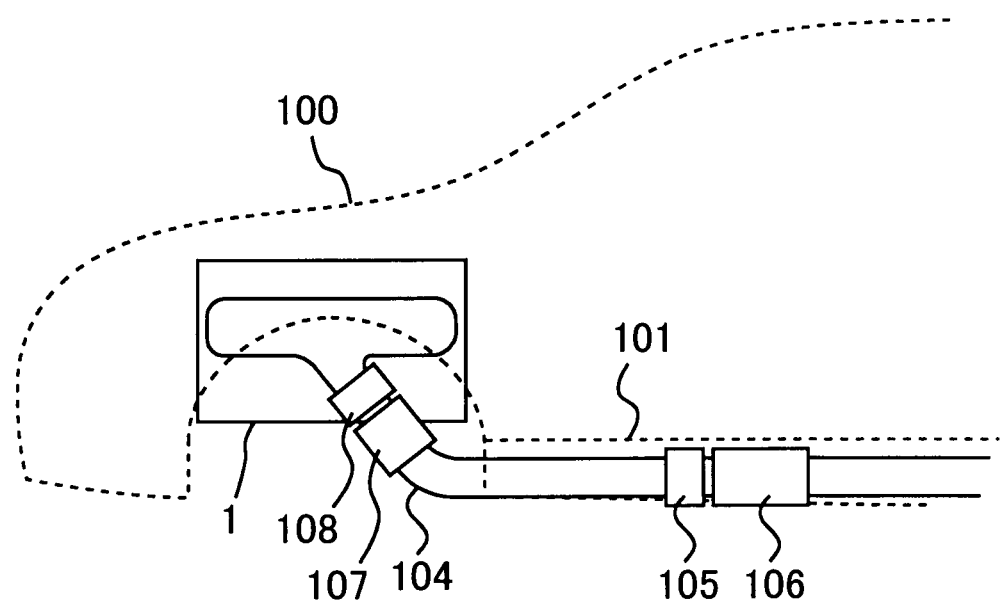
[FIG. 28] is a view showing the schematic construction of an internal combustion engine and its exhaust system to which an exhaust gas purification apparatus of an internal combustion engine according to a nineteenth embodiment of the present invention is applied.

FIG. 28 is a view that shows the schematic construction of an internal combustion engine and its exhaust system to which an exhaust gas purification apparatus of an internal combustion engine according to this embodiment of the present invention is applied. This embodiment is different from the eighteenth embodiment in that a pre-stage adsorbent 108 is provided at a location upstream of a pre-stage catalyst 107. Hereinafter, a description will be made by focusing on different points from the eighteenth embodiment.

The pre-stage adsorbent 108 is provided at an immediately upstream side of the pre-stage catalyst 107. The immediately upstream side means that other catalysts, devices, etc., do not intervene between the pre-stage adsorbent 108 and the pre-stage catalyst 107. The distance between the pre-stage catalyst 107 and the pre-stage adsorbent 108 is set to such a distance that the temperature of the pre-stage catalyst 107 can be raised at a sufficient rate due to the heat generated in the pre-stage adsorbent 108. The pre-stage adsorbent 108 and the pre-stage catalyst 107 may be in contact with each other. With such an arrangement, heat can be supplied from the pre-stage adsorbent 108 to the pre-stage catalyst 107, so when the temperature of the pre-stage catalyst 107 is lower than a lower limit value of its activation temperature at the time of cold starting of the internal combustion engine 1, etc., the temperature of the pre-stage catalyst 107 can be raised to the lower limit value of the activation temperature in a quick manner. By doing so, the purification of the exhaust gas can be made from an early stage.

This pre-stage adsorbent 108 has a function to adsorb the water contained in the exhaust gas, and for example, Na/Y type zeolite or K/A type zeolite can be used.

In this manner, by providing the adsorbents at the immediately upstream side of the pre-stage catalyst 107 and the underfloor catalyst 106, respectively, the temperatures of the individual catalysts can be caused to rise in a quick manner.

In addition, in this embodiment, too, a monolithic catalyst can be adopted as the pre-stage catalyst 107. By doing in this manner, it is possible to suppress the water desorbed from the pre-stage adsorbent 108 from adhering to the pre-stage catalyst 107, so in cases where a NOx catalyst is adopted as the pre-stage catalyst 107, it is possible to suppress the NOx occlusion capacity of the NOx catalyst from being reduced due to the water. Moreover, because the water desorbed from the pre-stage adsorbent 108 can be quickly supplied to the underfloor adsorbent 105, the temperature of the underfloor catalyst 106 can be caused to rise in a quick manner.

Then, in this embodiment, the capacities of the underfloor adsorbent 105 and the pre-stage adsorbent 108 may be determined in such a manner that the amount of water which the underfloor adsorbent 105 can adsorb is more than the amount of water which the pre-stage adsorbent 108 can adsorb.

Here, note that the underfloor catalyst 106 is more difficult to rise in temperature than the pre-stage catalyst 107. In order to compensate for this, more heat is caused to be generated in the underfloor adsorbent 105. In other words, the temperature of the underfloor catalyst 106 can be quickly raised by determining the individual capacities of the underfloor adsorbent 105 and the pre-stage adsorbent 108 in such a manner that the amount of water which the underfloor adsorbent 105 can adsorb is more than the amount of water which the pre-stage adsorbent 108 can adsorb. As a result of this, the temperatures of the pre-stage catalyst 107 and the underfloor catalyst 106 can also be raised at the same time to the lower limit value of the activation temperature.

In this embodiment, the pre-stage catalyst 107 and the underfloor adsorbent 105 are designed in such a manner that the lower limit value of the activation temperature of the pre-stage catalyst 107 and an upper limit temperature at which the underfloor adsorbent 105 can adsorb water become substantially equal to each other. By doing in this manner, the desorption of water from the underfloor adsorbent 105 begins at the same time as the temperature of the pre-stage catalyst 107 reaches the lower limit value of the activation temperature, so it becomes unnecessary to separately perform the control for desorbing water from the underfloor adsorbent 105.

Here, there exists a limitation on the amount of water which can be adsorbed by the underfloor adsorbent 105. In other words, in a state where much water is adsorbed in the underfloor adsorbent 105, even if the temperature of the underfloor catalyst 106 is to be raised, heat will not be generated in the underfloor adsorbent 105, so it becomes difficult to raise the temperature of the underfloor catalyst 106. In contrast to this, if water is caused to desorb from the underfloor adsorbent 105 when the supply of heat from the underfloor adsorbent 105 is not necessary, water will be able to be adsorbed to the underfloor adsorbent 105 at the time when the temperature of the underfloor catalyst 106 is required to be raised next time.

Then, when it becomes possible to occlude NOx in the pre-stage catalyst 107, it will be no problem even if the NOx occlusion capacity of the underfloor catalyst 106 decreases. In other words, in cases where the temperature of the pre-stage catalyst 107 rises to the lower limit value of the activation temperature, even if water is caused to desorb from the underfloor adsorbent 105 to reduce the NOx occlusion capacity of the underfloor catalyst 106, NOx can be occluded by the pre-stage catalyst 107.

Here, note that in this embodiment, a plurality of underfloor catalysts 106 may be provided and arranged in series or in parallel with one another. In addition, an adsorbent may be provided at an immediately upstream side of each of the underfloor catalysts 106.

The invention claimed is:

1. An exhaust gas purification apparatus of an internal combustion engine comprising:
    an exhaust gas purification catalyst that is arranged in an exhaust passage of the internal combustion engine for purifying an exhaust gas;
    an adsorption device that is arranged at an upstream side of said exhaust gas purification catalyst, rises in temperature up to an upper limit temperature due to heat generated by adsorption thereto of an incoming water, and falls in temperature after its temperature has reached said upper limit temperature; and
    a heat generating component supply unit that supplies a second component, which generates reaction heat in said exhaust gas purification catalyst when the temperature of said exhaust gas purification catalyst is equal to or higher than a lower limit value of its activation temperature after the temperature of said adsorption device becomes said upper limit temperature.

2. The exhaust gas purification apparatus of an internal combustion engine as set forth in claim 1,
    wherein said second component is a component which passes through said adsorption device without being adsorbed thereto, and said heat generating component supply unit supplies said second component from an upstream side of said adsorption device.

3. An exhaust gas purification apparatus of an internal combustion engine as set forth in claim 1:
    wherein said upper limit temperature is set in the vicinity of a lower limit value of the activation temperature of said exhaust gas purification catalyst.

4. The exhaust gas purification apparatus of an internal combustion engine as set forth in claim 1,
    wherein an amount of adsorption of said water in said adsorption device is decreased immediately before said internal combustion engine is stopped.

5. The exhaust gas purification apparatus of an internal combustion engine as set forth in claim 1, further comprising:
    a purification degree determination unit that determines whether the degree of purification of the exhaust gas in said exhaust gas purification catalyst becomes high by supplying said second component; and
    a prohibition unit that prohibits the supply of said second component by said heat generating component supply unit when a determination is made by said purification degree determination unit that the degree of purification of the exhaust gas in said exhaust gas purification catalyst does not become high.

6. The exhaust gas purification apparatus of an internal combustion engine as set forth in claim 1,
wherein said adsorption device is provided with a plurality of fine pores for causing said water to be adsorbed, and the diameter of said fine pores is set to be equal to or more than the diameter of said water, and smaller than the diameter of said second component.

7. The exhaust gas purification apparatus of an internal combustion engine as set forth in claim 1,
wherein a lower limit value of the activation temperature of said exhaust gas purification catalyst is set lower in an upstream part thereof including at least an upstream end of said exhaust gas purification catalyst than in a part thereof downstream of said upstream part.

8. The exhaust gas purification apparatus of an internal combustion engine as set forth in claim 1,
wherein when the temperature of said exhaust gas purification catalyst is raised by causing said water to be adsorbed in said adsorption device, the amount of said water flowing into said adsorption device is increased more than when the temperature of said exhaust gas purification catalyst is not raised.

9. The exhaust gas purification apparatus of an internal combustion engine as set forth in claim 1,
wherein when the temperature of said exhaust gas purification catalyst is not cause to rise, an amount of adsorption of said water in said adsorption device is made equal to or less than a specified value.

10. The exhaust gas purification apparatus of an internal combustion engine as set forth in claim 9, further comprising:
a temperature raising unit that raises the temperature of said adsorption device, wherein by raising the temperature of said adsorption device, said water is caused to desorb from said adsorption device thereby to decrease said amount of adsorption.

11. The exhaust gas purification apparatus of an internal combustion engine as set forth in claim 1,
wherein a comparison is made between an amount of adsorption obtained by calculation at the time when the temperature of said adsorption device becomes said upper limit temperature, and an actual amount of adsorption, whereby correction is carried out in control for raising the temperature of said exhaust gas purification catalyst.

12. The exhaust gas purification apparatus of an internal combustion engine as set forth in claim 11,
wherein a parameter used in a process of calculating said amount of adsorption is corrected.

13. The exhaust gas purification apparatus of an internal combustion engine as set forth in claim 11,
wherein an amount of said water flowing into said adsorption device is corrected.

14. The exhaust gas purification apparatus of an internal combustion engine as set forth in claim 11,
wherein a time to supply said second component is corrected.

15. The exhaust gas purification apparatus of an internal combustion engine as set forth in claim 11,
wherein a load of said internal combustion engine is corrected.

16. The exhaust gas purification apparatus of an internal combustion engine as set forth in claim 1,
wherein a temperature measurement unit is provided which measures a difference between the temperature of an exhaust gas flowing into said adsorption device and the temperature of an exhaust gas flowing out of said adsorption device, and a deterioration determination unit is further provided which estimates an amount of generated heat in said adsorption device based on the difference in temperature measured by said temperature measurement unit, and determines the degree of deterioration of said adsorption device by comparing said amount of generated heat with a threshold for said amount of generated heat.

17. The exhaust gas purification apparatus of an internal combustion engine as set forth in claim 1, further comprising:
a bypass passage that connects between a portion of said exhaust passage at an upstream side of said adsorption device and a portion of said exhaust passage at a downstream side of said adsorption device and at an upstream side of said exhaust gas purification catalyst; and
a changeover valve that passes the exhaust gas to either one of said adsorption device and said bypass passage.

18. The exhaust gas purification apparatus of an internal combustion engine as set forth in claim 1,
wherein said exhaust gas purification catalyst comprises one or more underfloor catalysts arranged in a portion of the exhaust passage of said internal combustion engine which passes under a floor of a vehicle on which said internal combustion engine is installed;
said adsorption device is arranged at an immediately upstream side of at least one of said underfloor catalysts; and
a pre-stage catalyst is provided which is arranged in a portion of said exhaust passage of said internal combustion engine upstream of that portion of said exhaust passage which passes under the floor of said vehicle.

19. An exhaust gas purification apparatus of an internal combustion engine comprising:
an exhaust gas purification catalyst that is arranged in an exhaust passage of the internal combustion engine for purifying an exhaust gas;
an adsorption device that is arranged at an upstream side of said exhaust gas purification catalyst, adsorbs incoming water up to an upper limit temperature, and desorbs said water after its temperature has reached said upper limit temperature; and
a heat generating component supply unit that supplies a second component, which generates reaction heat in said exhaust gas purification catalyst, to said exhaust gas purification catalyst when the temperature of said exhaust gas purification catalyst is equal to or higher than a lower limit value of its activation temperature after said water adsorbed in said adsorption device begins to desorb.

* * * * *